US008589332B2

(12) United States Patent
Brooks et al.

(10) Patent No.: US 8,589,332 B2
(45) Date of Patent: Nov. 19, 2013

(54) SYSTEM AND METHOD FOR ASSIGNING PIECES OF CONTENT TO TIME-SLOTS SAMPLES FOR MEASURING EFFECTS OF THE ASSIGNED CONTENT

(71) Applicant: 3M Innovative Properties Company, St. Paul, MN (US)

(72) Inventors: Brian E. Brooks, St. Paul, MN (US); Michael Kelly Canavan, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/748,754

(22) Filed: Jan. 24, 2013

(65) Prior Publication Data
US 2013/0138595 A1 May 30, 2013

Related U.S. Application Data

(63) Continuation of application No. 12/166,969, filed on Jul. 2, 2008, now Pat. No. 8,392,350.

(60) Provisional application No. 60/947,803, filed on Jul. 3, 2007.

(51) Int. Cl.
*G06N 5/00* (2006.01)
(52) U.S. Cl.
USPC .............................................. 706/52; 706/45
(58) Field of Classification Search
USPC ...................................... 706/52, 45
See application file for complete search history.

(56) References Cited

U.S. PATENT DOCUMENTS

| 5,253,331 A | 10/1993 | Lorenzen |
| 5,287,266 A | 2/1994 | Malec |
| 5,309,174 A | 5/1994 | Minkus |
| 5,474,385 A | 12/1995 | Reading |
| 5,513,342 A | 4/1996 | Leong et al. |
| 5,812,134 A | 9/1998 | Pooser |
| 6,023,714 A | 2/2000 | Hill et al. |

(Continued)

FOREIGN PATENT DOCUMENTS

| GB | 2309805 | 6/1997 |
| JP | 2001-265904 | 9/2001 |

(Continued)

OTHER PUBLICATIONS

Gaines, et al., Some Experience in Interactive System Development and Application, Proceedings IEEE 63(6) Jun. 1975, pp. 894-911.*

(Continued)

*Primary Examiner* — Wilbert L Starks
(74) *Attorney, Agent, or Firm* — X. Christina Huang

(57) ABSTRACT

Systems and methods provide for assigning pieces of content to time-slots samples for measuring effects of the assigned content. Systems and methods provide for receiving pair-wise content relatedness data that identifies each piece of content as experimental content or control content relative to other pieces of content, and algorithmically assigning experimental or control content pieces to time-slot samples using the content relatedness data, wherein additional content pieces assigned to a particular time-slot sample exclude non-identical related experimental content pieces defined relative to an experimental content piece previously assigned to the particular time-slot sample.

20 Claims, 34 Drawing Sheets

(56) References Cited

U.S. PATENT DOCUMENTS

| | | | |
|---|---|---|---|
| 6,137,483 A | 10/2000 | Kiyono | |
| 6,169,981 B1 | 1/2001 | Werbos | |
| 6,317,700 B1 | 11/2001 | Bagne | |
| 6,529,940 B1 | 3/2003 | Humble | |
| 6,604,092 B1 | 8/2003 | Stewart | |
| 6,604,094 B1 | 8/2003 | Harris | |
| 6,840,905 B2 | 1/2005 | Gotschim | |
| 6,934,415 B2 | 8/2005 | Stentiford | |
| 6,934,748 B1 | 8/2005 | Louviere | |
| 7,089,322 B1 | 8/2006 | Stallmann | |
| 7,130,461 B2 | 10/2006 | Rosenholtz | |
| 7,130,808 B1 | 10/2006 | Ranka | |
| 7,136,871 B2 | 11/2006 | Ozer | |
| 7,216,092 B1 | 5/2007 | Weber et al. | |
| 7,260,261 B2 | 8/2007 | Xie | |
| 7,308,497 B2 | 12/2007 | Louviere | |
| 7,406,434 B1 | 7/2008 | Chang | |
| 7,460,708 B2 | 12/2008 | Kayahara | |
| 2001/0018668 A1 | 8/2001 | Yanase | |
| 2002/0026478 A1 | 2/2002 | Rodgers | |
| 2002/0112035 A1 | 8/2002 | Carey | |
| 2002/0129367 A1 | 9/2002 | Devara | |
| 2002/0161779 A1 | 10/2002 | Brierley | |
| 2003/0046376 A1 | 3/2003 | Yen et al. | |
| 2003/0083822 A2 | 5/2003 | Brunner | |
| 2003/0220830 A1 | 11/2003 | Myr | |
| 2004/0015399 A1 | 1/2004 | Maggio | |
| 2004/0015401 A1 | 1/2004 | Lee et al. | |
| 2004/0075685 A1 | 4/2004 | Ohyama | |
| 2004/0088726 A1 | 5/2004 | Ma | |
| 2004/0210471 A1 | 10/2004 | Luby | |
| 2004/0260767 A1 | 12/2004 | Kedem et al. | |
| 2005/0021765 A1 | 1/2005 | Flores et al. | |
| 2005/0039206 A1 | 2/2005 | Opdycke | |
| 2005/0047647 A1 | 3/2005 | Rutishauser | |
| 2005/0055193 A1 | 3/2005 | Bondarenko | |
| 2005/0071223 A1 | 3/2005 | Jain et al. | |
| 2005/0159921 A1 | 7/2005 | Louviere | |
| 2005/0171843 A1 | 8/2005 | Brazell | |
| 2005/0195221 A1 | 9/2005 | Berger | |
| 2006/0049657 A1 | 3/2006 | Searfoss | |
| 2006/0049662 A1 | 3/2006 | Miyahara | |
| 2006/0064339 A1 | 3/2006 | Allred | |
| 2006/0070026 A1 | 3/2006 | Balinsky | |
| 2006/0179418 A1 | 8/2006 | Boyd | |
| 2006/0193536 A1 | 8/2006 | Pilu | |
| 2006/0200759 A1 | 9/2006 | Agrawala | |
| 2006/0215922 A1 | 9/2006 | Koch | |
| 2006/0271441 A1 | 11/2006 | Mueller et al. | |
| 2006/0287913 A1 | 12/2006 | Baluja | |
| 2007/0011050 A1 | 1/2007 | Klopf et al. | |
| 2007/0038516 A1 | 2/2007 | Apple et al. | |
| 2007/0073562 A1 | 3/2007 | Brice | |
| 2007/0100698 A1 | 5/2007 | Neiman | |
| 2007/0136133 A1 | 6/2007 | Li | |
| 2007/0156382 A1 | 7/2007 | Graham | |
| 2008/0060003 A1 | 3/2008 | Nocifera et al. | |
| 2008/0109727 A1 | 5/2008 | Colle et al. | |
| 2008/0230604 A1 | 9/2008 | Fong | |
| 2008/0306804 A1 | 12/2008 | Opdycke | |
| 2009/0012847 A1 | 1/2009 | Brooks | |
| 2009/0012848 A1 | 1/2009 | Brooks | |
| 2009/0030780 A1 | 1/2009 | York | |
| 2009/0158179 A1 | 6/2009 | Brooks | |
| 2009/0281896 A1 | 11/2009 | Brooks | |
| 2010/0017288 A1 | 1/2010 | Graham, II | |
| 2010/0174671 A1 | 7/2010 | Brooks | |

FOREIGN PATENT DOCUMENTS

| | | |
|---|---|---|
| JP | 2002-197403 | 7/2002 |
| JP | 2002-330415 | 11/2002 |
| JP | 2003-529116 | 9/2003 |
| JP | 2004-178276 | 6/2004 |
| JP | 2005-037563 | 2/2005 |
| KR | 10-2003-0027565 | 4/2003 |
| KR | 10-2003-0040263 | 5/2003 |
| KR | 10-2008-0089424 | 10/2008 |
| RU | 2134457 | 8/1999 |
| WO | WO 01-93083 | 12/2001 |
| WO | WO 2006/024108 | 3/2006 |
| WO | WO 2007-078897 | 7/2007 |
| WO | WO 2007-079254 | 7/2007 |
| WO | WO 2007-079256 | 7/2007 |
| WO | WO 2009-006542 | 1/2009 |
| WO | WO 2009-006545 | 1/2009 |
| WO | WO 2010-080722 | 7/2010 |

OTHER PUBLICATIONS

"Statement in Accordance with the Notice From the European Patent Office Dated Oct. 1, 2007 Concerning Business Methods", 1 page. (XP002456252).

Allison, Statistically Powerful Studies While Minimizing Financial Costs, Physiological Methods, 1997, vol. 2, No. 1, 20-33.

Arch G. Woodside, Measuring Advertising Effectiveness in Destination Marketing Strategies. Journal of Travel Research, Aug. 1990, vol. 29, No. 2, pp. 3-6.

Campbell, (1963) *Experimental and quasi-experimental designs for research*, Chicago: Rand McNally.

Etsukou Iizuka: Dictionary of Manufacturing Management, Asakura Publishing Co., Ltd, Nov. 1, 1999, first impression of the first edition, pp. 525-534.

Goldstein, "Cognitive Psychology, Connecting Mind, Research, and Everyday Experience," Thompson/Wadsworth 2005.

Itti, Short Papers, A Model of Saliency-Based Visual Attention for Rapid Scene Analysis, IEEE Transactions on Pattern Analysis and Machine Intelligence, vol. 20, No. 11, pp. 1254-1259, (1998). (XP001203933).

Itti, A Saliency-Based Search Mechanism for Overt and Covert Shifts of Visual Attention, Vision Research vol. 40, pp. 1489-1506, (2000).

Iurgel, Automatic Media Monitoring Using Stochastic Pattern Recognition Techniques, Doctoral Thesis, Munich University of Technology, 2005, pp. 1-163.

Johnson, Dr. R. Brude, "Chapter 9 Experimental Research," published Jun. 14, 2008. Retrieved Aug. 30, 2011, <http://www.southalabama.edu/coe/bset/johnson/lecture/lec9.htm>.

Koch, Shifts in Selective Visual Attention: Towards the Underlying Neural Circuitry, Human Neurobiology, vol. 4, pp. 219-227, (1985).

Krebs, A Simple Tool for Predicting the Readability of a Monitor, Proceedings of the Human Factors and Ergonomics Society, pp. 1659-1663, (2002).

Niederhoffer, et al., Linguistic Style Matching in Social Interaction, Journal of Language and Social Psychology, vol. 21, No. 4, Dec. 2002, pp. 337-360.

Royer, "Design Your Own Experiments", [online],[retrieved from the Internet on Oct. 7, 2005], <http://www.cognitive-aptitude-assessment-software.com/DesignExperiments.html>, 1 page.

Royer, "Designer Module", [online],[retrieved from the Internet on Oct. 7, 2005], <http://www.cognitive-aptitude-assessment-software.com/DesignerModule.html>, 1 page.

Royer, "Graphical Interface", [online],[retrieved from the Internet on Oct. 7, 2005], <http://www.cognitive-aptitude-assessment-software.com/Reporting/GraphicalInterface.html>, 2 pages.

Schultz, Market Research Deserves Blame for Marketing's Decline, Marketing News, Feb. 15, 2005.

Taichiro Ueda: New Data Mining Initiation Course, Data Analysis and Prediction Science, Management Consulting, Japan Small and Medium Enterprise Management Consultants Association, Jun. 1, 2001, vol. 49, No. 6, pp. 78-83.

Tolli, Motivational and Self-Regulatory Responses to Interruptions, Doctoral Thesis, The University of Akron, May 2009, pp. 1-235.

White, Implicit Feedback for Interactive Information Retrieval, Doctoral Thesis, University of Glasgow, Department of Computing Science, Oct. 2004, pp. 1-302.

* cited by examiner

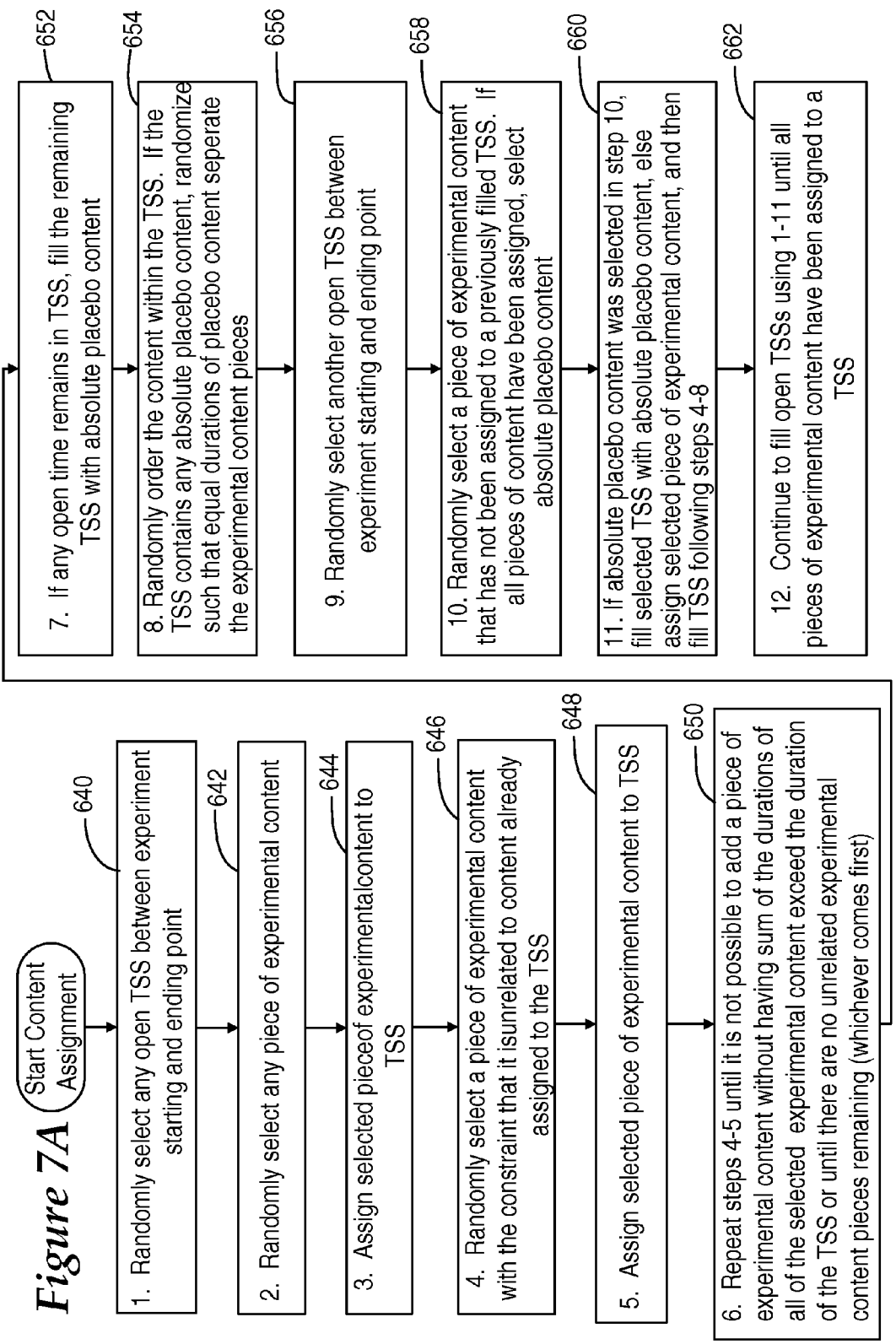

| | |
|---|---:|
| Number of conditions: | 2 |
| Variance of dependent variable: | 231886.29 |
| Minimum difference of interest: | 60 |
| Number of time slots per day: | 1 |
| Number of locations: | 50 |
| Number of days to completion: | 22.3384 |

*Figure 7C*

| | |
|---|---:|
| Number of conditions: | 2 |
| Variance of dependent variable: | 231886.29 |
| Minimum difference of interest: | 60 |
| Number of time slots per day: | 6 |
| Number of locations: | 50 |
| Number of days to completion: | 3.72306 |

*Figure 7D*

| | |
|---|---:|
| Number of conditions: | 2 |
| Variance of dependent variable: | 231886.29 |
| Minimum difference of interest: | 60 |
| Number of time slots per day: | 10 |
| Number of locations: | 50 |
| Number of days to completion: | 2.23384 |

*Figure 7E*

| | |
|---|---:|
| Number of conditions: | 2 |
| Variance of dependent variable: | 231886.29 |
| Minimum difference of interest: | 60 |
| Number of time slots per day: | 16 |
| Number of locations: | 50 |
| Number of days to completion: | 1.39615 |

*Figure 7F*

| | |
|---|---|
| Number of conditions: | 2 |
| Variance of dependent variable: | 231886.29 |
| Minimum difference of interest: | 60 |
| Number of time slots per day: | 8 |
| Number of locations: | 1 |

Number of days to completion: 139.615

*Figure 7G*

| | |
|---|---|
| Number of conditions: | 2 |
| Variance of dependent variable: | 231886.29 |
| Minimum difference of interest: | 60 |
| Number of time slots per day: | 8 |
| Number of locations: | 20 |

Number of days to completion: 6.98074

*Figure 7H*

| | |
|---|---|
| Number of conditions: | 2 |
| Variance of dependent variable: | 231886.29 |
| Minimum difference of interest: | 60 |
| Number of time slots per day: | 8 |
| Number of locations: | 100 |

Number of days to completion: 1.39615

*Figure 7I*

| | |
|---|---|
| Number of conditions: | 2 |
| Variance of dependent variable: | 231886.29 |
| Minimum difference of interest: | 60 |
| Number of time slots per day: | 8 |
| Number of locations: | 1000 |

Number of days to completion: 0.13961

*Figure 7J*

| Test Mode | Exp. Variables | Content | Schedule | Conf. Variables | Nuis. Variables | Experiment |

What is the smallest increment of time that *sales* possibly be measured?

- ◉ Hourly.
- ○ After each shift.
- ○ Daily.
- ○ Weekly.
- ○ Monthly.
- ○ Other [          ]

Enter the cost of measuring *sales* at the smallest increment of time.

$ [          ] per day

*Figure 10F*

| Test Mode | Exp. Variables | Content | Schedule | Conf. Variables | Nuis. Variables | Experiment |

What is a convenient interval for *sales* to be measured?

- ○ Hourly.
- ○ After each shift.
- ◉ Daily.
- ○ Weekly.
- ○ Monthly.
- ○ Other [          ]

Enter the cost of measuring *sales* at the convenient interval.

$ [          ] per day

*Figure 10G*

Enter the historical *sales* data based on the smallest interval of time.

| Time | Sales |
|---|---|
| 8:00 am – 9:00 am | |
| 9:00 am – 10:00 am | |
| 10:00 am – 11:00 am | |
| 11:00 am – 12 noon | |
| 12:00 noon – 1:00 pm | |
| 1:00 pm – 2:00 pm | |
| 2:00 pm – 3:00 pm | |
| 3:00 pm – 4:00 pm | |

*Figure 10J*

Enter the historical *sales* data based on the convenient interval of time.

| Time | Sales |
|---|---|
| Day 1 | |
| Day 2 | |
| Day 3 | |
| Day 4 | |
| Day 5 | |
| Day 6 | |
| Day 7 | |
| Day 8 | |

*Figure 10K*

Enter the increase in *sales* that would make the sign valuable to you.

Carry over effects
Selection bias
Testing effects
Experimental mortality

SYSTEM AND METHOD FOR ASSIGNING PIECES OF CONTENT TO TIME-SLOTS SAMPLES FOR MEASURING EFFECTS OF THE ASSIGNED CONTENT

RELATED APPLICATIONS

This application is a continuation of U.S. patent application Ser. No. 12/166,969, filed on Jul. 2, 2008, now allowed, which claims priority to U.S. Provisional Patent Application Ser. No. 60/947,803, filed on Jul. 3, 2007, the disclosure of which is incorporated by reference herein in its entirety.

FIELD OF THE INVENTION

The present invention relates to distribution of communication content and, more particularly, to distributing communication content in a manner such that the distribution pattern enables measuring of content effectiveness.

BACKGROUND

Visual information in a retail environment often takes the form of advertising content. Such content is inherently persuasive, and is typically designed to influence a viewer's attitudes, perceptions, and behaviors in order to create a positive business impact, such as increasing sales, strengthening brand awareness, or engendering consumer loyalty.

In 2002, for example, total spending on advertising content used in retail environments, commonly referred to as Point of Purchase (POP), was estimated at $17 billion in the United States and exceeded $43 billion per year globally. This level of spending has garnered increasing scrutiny among brand owner executives who are demanding greater accountability for their marketing investments.

The need for measurable performance is increasingly urgent as well, because the average tenure of a Chief Marketing Officer has decreased to an estimated 22.9 months according to industry sources. Marketing leaders thus have precious little time to measurably demonstrate results from their marketing efforts. Marketing research, a sub-set of the research industry, has historically used correlational or matched control studies to evaluate advertising content performance against objectives. However, these "best practice" marketing research methodologies do not reliably reveal causation between the marketing message and the business result, as has been widely commented on by marketing analysis experts (e.g., Don E. Schultz, *Market Research Deserves Blame for Marketing's Decline*, Marketing News, Feb. 15, 2005). Even so, marketing research spending is currently estimated at $8 billion annually in the United States alone, which includes these types of studies.

SUMMARY OF THE INVENTION

The present invention is directed to systems and methods for assigning pieces of content to time-slots samples for measuring effects of the assigned content. Methods, according to embodiments of the present invention, involve receiving pair-wise content relatedness data that identifies each piece of content as experimental content or control content. Methods further involve algorithmically assigning experimental or control content pieces to time-slot samples using the content relatedness data, wherein additional content pieces assigned to a particular time-slot sample exclude non-identical related experimental content pieces defined relative to an experimental content piece previously assigned to the particular time-slot sample.

System embodiments of the present invention include a processor and a memory coupled to the processor. The memory is configured to store pair-wise content relatedness data that identifies each piece of content as experimental content or control content. The processor is configured to execute program instructions for assigning experimental or control content pieces to time-slot samples using the content relatedness data, wherein additional content pieces assigned to a particular time-slot sample exclude non-identical related experimental content pieces defined relative to an experimental content piece previously assigned to the particular time-slot sample.

Embodiments are directed to a computer-readable storage medium having instructions stored thereon which are executable by a processor. The instructions are executable for performing processes involving receiving pair-wise content relatedness data that identifies each piece of content as experimental content or control content. The instructions are executable for performing further processes involving algorithmically assigning experimental or control content pieces to time-slot samples using the content relatedness data, wherein additional content pieces assigned to a particular time-slot sample exclude non-identical related experimental content pieces defined relative to an experimental content piece previously assigned to the particular time-slot sample.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 7A illustrates processes of an algorithm that assigns content to time-slot samples in accordance with embodiments of the present invention, where the individual pieces of content are shorter than the time-slot samples;

FIGS. 7C-7F show the dramatic impact of the number of time-slot samples per day on the duration of time to complete an experiment implemented in accordance with embodiments of the present invention;

FIGS. 7G-7J show the dramatic impact of the number of locations on the duration of time to complete an experiment implemented in accordance with embodiments of the present invention;

Figure 1A:
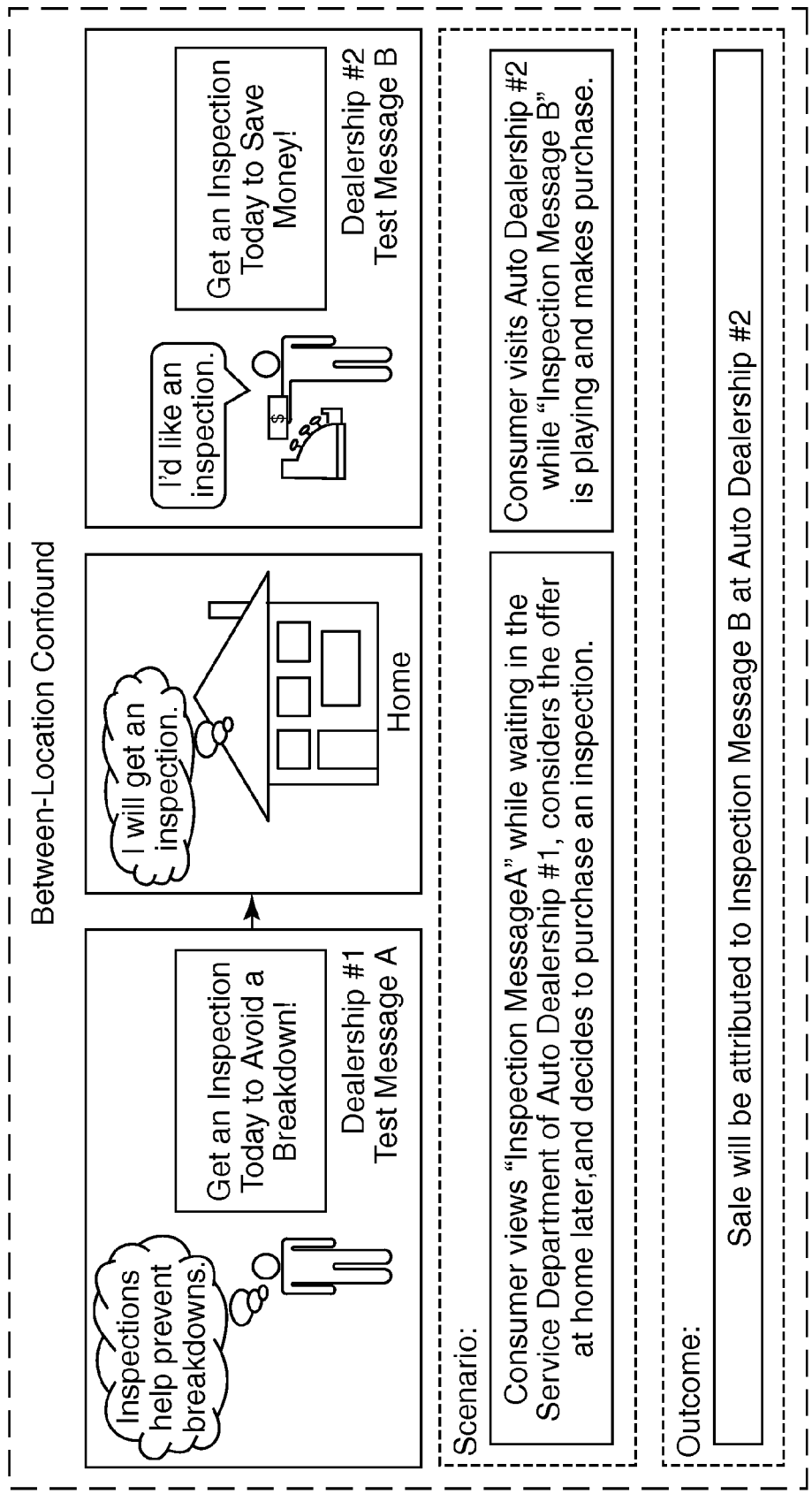
FIGS. 1A and 1B are illustrations that facilitate an understanding of between-location confounds and within-location confounds, respectively, in the context of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

The business world's demand for more data-driven marketing effectiveness has increased significantly in recent years due to the vast amounts of money spent on communication and the present inability to accurately understand the cause and effect relationship between content being communicated and its effectiveness on the recipient. Even if some degree of causality could be revealed using conventional marketing research techniques, the results of the research are typically not available until well after a marketing campaign has been completed. As such, these research results do not provide actionable intelligence when it would have the greatest value, i.e., while there is still an opportunity to make adjustments and maximize the results of the campaign. These and other circumstances have heightened the importance of marketing research to help identify communication concepts, validate these concepts and, after being produced and distributed, to measure and evaluate their effectiveness, within a useful time frame.

There are two major classes of research: experimental and non-experimental. The present disclosure is generally directed to systems and methods for conducting "true"

experimental research and to sub-systems and sub-processes of such systems and methods that have stand-alone utility and usefulness. However, while systems and processes of the present invention described herein find particular usefulness when used as part of a true experiment, many of the systems, processes, and methodologies described herein find usefulness and value outside the context of a true experiment.

For example, various aspects (e.g., sub-systems and sub-processes) of the systems and processes described as part of a true experiment may be implemented in quasi experiments, correlational studies, or other forms of non-experimental research. Implementing various system aspects and methodologies described herein can significantly improve the efficiency and accuracy of non-true experimental systems and methodologies. It is therefore to be understood that the processes, methodologies, systems, and devices described herein are not limited to use only within the context of true experimental research, but may be used advantageously in other forms of research, such as non- or quasi-experimental research and correlational studies.

Experiments are typically conducted to determine empirically if there are relationships between two or more variables, and typically begin with the formation of one or more hypotheses positing that there is a relationship between one or more independent variables and one or more dependent variables. For example, a researcher at a pharmaceutical company might formulate a hypothesis that the amount of a new drug that patients take will be related to the blood pressure of patients. Various types of experiments may be distinguished by the manner and degree to which they are able to reduce or eliminate the effects of confounding variables. Confounding variables are factors that could vary systematically with the levels of the independent variable. Only "true experiments," however, can empirically determine causation, which is why the Food and Drug Administration requires that "true experiments" be used to provide data regarding the effectiveness of new drugs, for example.

Independent variables are the variables defined or manipulated by the experimenter during an experiment, the amount and/or frequency of a drug administered to patients, for example. Dependent variables are the variables posited to be predicted by the value of the independent variable, such as the blood pressure of patients. The experimenter then conducts an experiment to determine if there is indeed a relationship between the independent and dependent variables, such as if the amount of a drug patients receive is related to the blood pressure of patients in a pharmaceutical experiment.

Confounding variables may also influence the dependent variable. These confounding variables are not of primary interest in the experiment, yet can influence the dependent variables and therefore obscure an accurate cause and effect relationship between the independent and dependant variables. The experimenter is trying to understand the causal relationships between the independent and dependent variables, however, these confounding variables can render the results of an experiment uninterpretable. Some examples of confounding variables include Hawthorne effects, order effects, carryover effects such as between-location confounds and within-location confounds, demand characteristics, and/or any other factor that could vary systematically with the levels of the independent variables, e.g., such as the body mass of a test subjects in the pharmaceutical experiment discussed above.

Confounding variables make it difficult or impossible to know which factor (variable) caused any observed change in the dependent variable(s). The existence of confounding variables that are not properly controlled during the experiment renders it difficult or impossible to make statistical inferences about causal relationships between the independent and dependent variables.

Various types of experiments may be distinguished by the manner and degree to which they are able to reduce or eliminate the effects of confounding variables. The only research methodology that reliably reveals causality is true experiments. The term "true experiment" denotes an experiment in which the following three characteristics must exist:

1. There are at least two levels of an independent variable.
2. Samples are randomly assigned to levels of the independent variable. That is, each sample in the experiment is equally likely to be assigned to levels of the independent variable.
3. There is some method of controlling for, or eliminating, confounds.

Experiments that lack any of the above three characteristics are not true experiments, and are often referred to as quasi-experiments or correlational designs. Only true experiments allow statistical inferences to be drawn regarding the causal relationships between independent and dependent variables. Quasi-experiments and correlational designs may allow relationships between independent and dependent variables to be established, but it is not possible to determine whether those relationships are causal. Various types of experimental designs (including true experiments) have been described, for example, in Campbell, D. T., & Stanley, J. C., *Experimental and Quasi-Experimental Designs for Research*, Rand McNally, (1963).

Quasi-experiments and correlational designs suffer from what are known as the "third variable problem" and the "directionality problem." The third variable problem is that the results of the experiment might have been caused by some other variable that was not controlled or randomized. A famous example of the third variable problem is the finding that there is a large positive correlation between drowning and ice-cream sales. However, it is almost certainly the case that some other variable than ice-cream (e.g., ambient temperature, which causes people to buy ice-cream and causes people to go swimming) explains the correlation.

Market researchers are confronted with enormous numbers of third variables that could, and often do, explain the findings of their correlational studies. The directionality problem is that it could be variable A that caused the change in variable B or it could be the case that variable B caused the change in variable A. A hotly debated example of the directionality problem is the large correlation between watching violent media and aggressive behavior. The directionality problem is one of the barriers to knowing if violent media causes aggressive behavior. It could be that watching violent media causes aggressive behavior or it could be that having tendencies towards aggressive behavior causes people to enjoy watching violent media. An example of the directionality problem in marketing research is that it could be the case that interacting with promotional media causes purchasing behavior or that the intent to purchase causes the interaction with the promotional media.

Correlational studies are commonly used by even the most sophisticated marketers, as evidenced by the descriptions herein of Internet analytics. Correlational studies compare, for example, point-of-sale (POS) data during the same time period in which the specific advertising content was played on digital signs. This approach fails to take into account many factors that could have also influenced the business result, such as competitive promotions or changing economic conditions taking place within the test period. As such, just like any correlational approach, this method cannot determine causation.

Matched control studies, another commonly used approach, identify a certain number of test stores that use digital signage, and a carefully chosen set of "matched" control stores that are similar in many ways, but that do not use digital signage. Sales during the same time period are then compared. Matched control studies have the same limitations as correlational studies because it is impossible to know if the test and control stores are identical before the signage is installed and to know if some event other than the signage system and content caused any observed differences between the stores. That is, events and conditions at test stores and control stores often differ radically and are essentially ignored. The only way to overcome this limitation using a matched control methodology is to randomly assign a very large number of stores to test and control conditions, which is typically considered unfeasible. Furthermore, if a decision to roll-out a digital signage network is made using these data, the no-signage control group is lost, making further measurement and optimization of the effectiveness of the digital signage system impossible.

The Internet has seemingly established itself as offering the "gold standard" of measurable marketing communication because it provides a "closed loop" in which a marketing message can be distributed, and a consumer's response can be observed and tracked. Most often, the response takes the form of a mouse click or a series of mouse clicks, or a duration of time spent on a web page, or some other metric that is tracked by a plethora of monitoring services that use "cookies" set on an individual's computer, that track their online behaviors.

Extremely sophisticated analytical capabilities have been developed by several prominent Internet media companies and by specialized Internet-focused marketing analytics firms. These capabilities include algorithmic distribution of myriad message versions combined with so called "real-time" tracking of user responses revealing correlations between message versions and performance metrics, such as click-through rates. Significant effort continues to be focused on enhancing and expanding these capabilities, and its value has been validated by the marketplace, as evidenced by recent high-profile, multi-billion dollar acquisitions.

While the Internet-style measurement approach is technically complex, it is conceptually simple. When a person views Internet content on some form of display device, the person's responses are almost exclusively limited to reacting using that same device. As such, the Internet's closed loop is extremely straightforward.

In experimental terms, individual users are the samples, and the various versions of web pages correspond to the independent variables. Mouse-clicks are the response, and click-data correspond to the dependent variable. The dependent variable data are actually generated by clicking on the independent variables, and as such, the very act of collecting dependent variable data necessarily connects the dependent variable data with the independent variables.

There is typically an extremely detailed physical record, enabled by cookies, that identifies a user and tracks his or her Internet click paths, noting which levels of the independent variables to which users were exposed. Importantly, it is rare for confounding variables to exist between the dependent variable and the independent variables.

Delivering content on displays within physical environments is rife with potential for confounds that do not exist within the Internet domain. In a physical environment, although people are generating dependent variable data (e.g., point-of sale or POS logs, satisfaction survey responses, sensor events), it is difficult to connect the dependent variable data to the levels of the independent variables (e.g., content on displays) to which they might have been exposed. Consumers wander through stores and may or may not notice the displays or the content playing on them. Moreover, the content played may change while the consumer is within viewing range, thus exposing them to multiple levels of the independent variable. Furthermore, many other variables might influence dependent variable data, ranging from more-or-less predictable variables, such as changing hotel occupancy rates or seasonal temperature variances, to the unpredictable, such as competitive marketing promotions and road construction.

Two types of confounds within the physical environment present extremely difficult measurement-related challenges: Between-location confounds and within-location confounds, also referred to as between-location and within-location carryover effects. It is possible to have both within- and between-location carryover effects. Within-location carryover effects occur when viewers who were present during one experimental condition (e.g., while control content is displayed) are still present during a different experimental condition (e.g., when experimental content is displayed). Between-location carryover effects occur when viewers at one location act on the content at a different location.

The following example facilitates an understanding of between-location confounds, a depiction of which is shown in FIG. 1A. Consider a circumstance in which a consumer visits an automobile dealership located near her workplace and views a message on a display promoting automobile inspections. The consumer does not purchase an inspection before leaving the dealership (i.e., she does not respond to the message). While driving home that night, the consumer considers the inspection message, and decides to stop at a different dealership location near her home, and purchases an inspection. But, the second dealership has been playing a different version of the message on its display. In this instance, the inspection sale will be attributed to the wrong message.

Figure 1B:
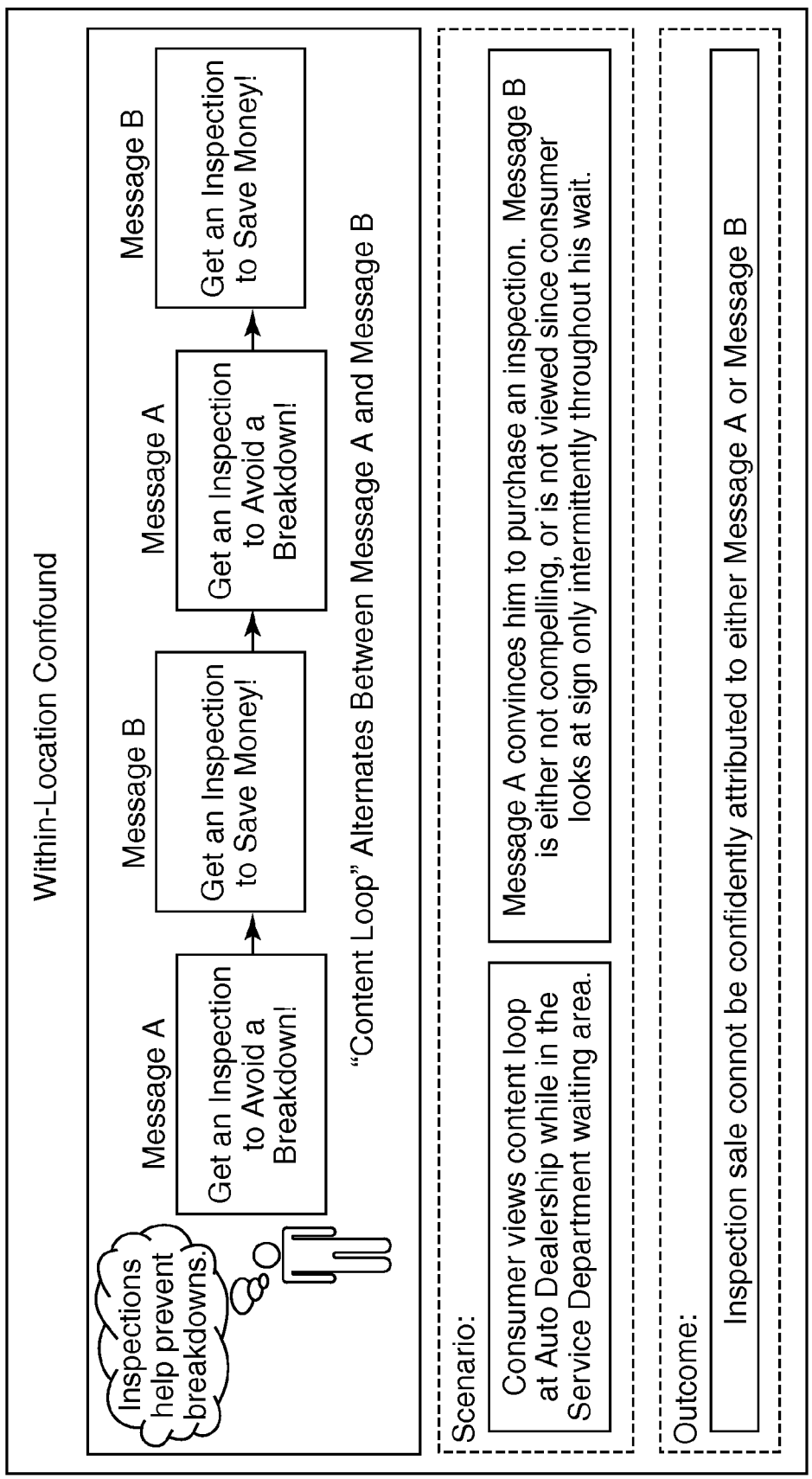

The following example facilitates an understanding of within-location confounds, a depiction of which is shown in FIG. 1B. Consider a circumstance in which a consumer visiting an automobile dealership views a message on a display promoting vehicle inspections by suggesting that the consumer can avoid a breakdown in the future. Yet, while the consumer considers this promotional offer, a different inspection-related message about saving money is played on the same display, which she may or may not view. The consumer decides to purchase an inspection based upon the original "avoid a breakdown" message but makes the purchase while the "saving money" message plays. In this instance, it is impossible to know to which message the purchase should be attributed.

These issues cause brand owner executives to question the veracity of results obtained using traditional marketing research techniques. A claimed increase in sales of 10% may appear promising, but brand owners executives are still reluctant to roll-out a digital signage network based upon these data. For example, savvy executives are presently unable to determine with certainty whether advertising content "A" was solely responsible for business result "B" or whether maximum value from a digital signage network can be obtained if a rolled out was initiated. As discussed above, Internet analytics typically do not have the properties of a true experiment, and thus often rely on non-experimental correlational techniques such as multivariate regression analysis or artificial neural networks. It is understood, however, that some Internet experiments may be designed to include features of true experiments.

The present invention relates to methods and systems that provide for determining the existence of, and measuring the strength of, cause-and-effect relationships between content being communicated and its effectiveness on recipients. The present invention is directed to methods and systems that facilitate distribution of communication content and assessment of the effectiveness of distributed communication content. Methods and systems of the present invention are directed to aspects of distributing communication content in a manner such that the distribution pattern enables measuring of content effectiveness. Methods and systems of the present invention provide for systematic control of the pattern (i.e., timing and location) at which communication content is distributed in order to control for and/or eliminate confounds.

Communication content may take many forms, including visual or aural, or any form that can impact or be detected by the human sensory system (e.g., the five senses of the human sensory system, including tactile or touch, taste, and smell, in addition to vision and hearing). Communication content may be static, dynamic or a combination thereof.

Distributing communication content may be effected in many ways, including electronically, optically, audio broadcasting, or graphically or pictorially via static or dynamic images, for example. Communication content may be distributed to and within a variety of physical environments, including retail stores, banks, hotels, airports, roadways, railways, and other public or private spaces. Communication content may be presented via stationary or mobile structures, devices, and systems.

According to embodiments of the present invention, a computer-implemented system and method provide for generating time-slot samples, each of which is assigned a clock time. Each time-slot sample has a specified time duration referred to as a time-slot sample duration, to which content may be assigned, and a data collection period for measuring effects of the assigned content. The data collection period of a time-slot sample is a period of time during which dependent variable data is collected. According to other embodiments, a computer-implemented system and method provide for assigning pieces of content to time-slot samples for displaying on displays for measuring effects of the assigned content pieces.

System and methods of the present invention are further directed to the distribution of communication content and to assessing effectiveness of such content consistent with constraints of a true experiment. Embodiments of the present invention are directed to providing, for use in a computer-implemented process, rules for displaying communication content consistent with constraints of a true experiment. The rules, which may be time based or event driven, preferably control or eliminate confounds, such as carryover effects. The communication content is displayed according to the rules. Data relating to effectiveness of the communication content is collected, and the effectiveness of the communication content is evaluated based on the collected data.

Embodiments of the present invention are directed to algorithmically distributing content across one or more displays such that the distribution pattern meets the constraints of a true experiment for measuring the effects of the content. Conducting true experiments on communication content distribution networks, such as digital signage networks or the Internet, provides for determining the existence of, and measuring the strength of, cause-and-effect relationships between communication content and measures of business success (e.g., sales, sensor events, survey data, etc.).

Embodiments of the present invention employ algorithms to automatically schedule and present signage content such that the content presentation pattern precisely corresponds to the experimental design. The output of the algorithms may be used as the basis for parsing the dependent variable data to correspond to the experimental conditions.

While digital signage networks, for example, present many challenges, such networks also offer ideal conditions for experiments than other media, such as broadcast or cable television, radio, and print. With regard to television and radio, for example, advertisers cannot control which televisions play their commercials (i.e., manipulate independent variables), and they cannot measure the direct effect of the commercial on product sales (i.e., measure effects of the independent variable on the dependent variable). Since most marketing research methodologies have evolved from these media models, market researchers appear to have overlooked the possibility of conducting true experiments.

Digital signage networks, by way of further example, allow for precise scheduling of advertising content (i.e., the ability to precisely manipulate independent variables). And, because displays are typically near the product or otherwise in an environment in which changes in behavior can be measured, it is possible to measure behavioral changes that arise from the content (i.e., it is possible to measure effects of the independent variable on the dependent variable). Also, data used to evaluate success against objectives are typically already collected in a form that can be readily used within the experiment.

According to methodologies of the present invention, the independent variable is preferably digital signage content and the dependent variable may be any measure with business implications (e.g., sales data, sensor data, survey data). Using systems and methods of the present invention, it is possible to systematically control the pattern (i.e., timing and location) at which digital signage content is distributed across the digital signage network in order to control for and eliminate confounds.

Systems and methodologies of the present invention implemented for use in digital signage networks provide for high internal and external validity. Internal validity refers to the level of confidence in an experiment for accurately characterizing causal relationships between variables. Laboratory conducted experiments typically have high internal validity because they offer the experimenter a degree of control over variables that is typically not possible in the "real-world." External validity refers to the confidence that the direction and strength of any causal relationship between variables will hold outside of the laboratory, i.e., in the real world. Brand managers, for example, are keenly aware of the problem of managing internal and external validity. For example, brand managers often ponder whether a preference or behavior pattern measures in a focus group will exist in the aisles of stores.

Traditionally, there is a trade off between internal and external validity, which is known by researches as "the paradox of internal validity." However, methodologies of the present invention offer outstanding internal and external validity. Because it is possible to randomize the presentation of content across the digital signage network, it is possible to ensure that literally no other factors systematically vary with the levels of the independent variable (thus, ensuring that the level of statistical significance or alpha perfectly represents the probability that any results represent causation). Furthermore, because the experiment is actually conducted in the real world using measures that are already being collected (e.g., sales data) as the dependent variable, the external validity is almost perfect.

In contrast to correlational designs and quasi-experiments, methodologies of the present invention simultaneously and dramatically increase the speed at which data can be used to answer business critical questions while also dramatically increasing the confidence in the data. For example, collecting sufficient data to know with a confidence level of alpha (usually set at 0.05) that content A is more effective than content B using a digital display network with 800 displays may take only a few hours. Using matched control or correlational studies, the data might take months to collect, and the confidence in the results would likely be low. It is noted that even the best designed correlational study can only be properly analyzed well after the data have been collected. This is because of the statistical need to compile a list of factors (i.e., confounds) that systematically varied during the study (e.g., weather, economic conditions) in order to try to mathematically control for these variables in the correlational model, which typically uses multiple regression. Each attempt to estimate the effect of the variable contains potential for error, and that error potential is cumulative.

In the context of various embodiments of the present invention, the independent variables correspond to the properties of the content, such as a strategic message or even an executional element like a dominant color or use of a photographic image. There are always at least two levels of the independent variable: either both are experimental content or one level is experimental and one is control content. Experimental content is the content that is hypothesized to have an impact on the dependent variable (analogues to the drug or drugs being tested in a clinical drug trial experiment). Control content is any content that would not be expected to impact the dependent variable (analogous to a placebo pill in a clinical drug trial experiment). Manipulating the independent variables involves assigning either experimental or control content to be presented on signs at different times and different locations. The different levels of the independent variables are randomly assigned (with constraints, as described below) to the different signs and different locations. The dependent variables can be any variable that would be posited to be impacted by the content (e.g., sales data, sensor data measuring pre-purchase behavior).

Confounding variables, as discussed above, may influence the dependent variable and therefore obscure an accurate cause and effect relationship between the independent and dependant variables. If the experiment is double-blind, for example, and given proper randomization, there are only two categories of possible confounds; carryover effects (e.g., between- and within-location confounds), which are described above, and content confounds.

Content confounds occur when more than one version of experimental content for the same dependent variable is played during the same time-slot during which measurement of the dependent variable is being measured. Such instances render it impossible to know which content underlies any observed change in the dependent variable. These types of confounds may be eliminated by ensuring that, within a given time-slot, only experimental and/or only control content is presented.

As previously discussed, carryover effects occur when it is possible for a viewer to observe content during one time-slot corresponding to an experimental condition and act on the content during a time-slot associated with a different experimental condition. Again, such instances render it impossible to know which content underlies any observed change in the dependent variable. Within-location carryover effects occur when viewers who were present during one experimental condition (e.g., while control content is displayed) are still present during a different experimental condition (e.g., when experimental content is displayed). Within-location confounds may be controlled by ensuring that the time-slot samples to which content can be assigned are sufficiently long to ensure that during some of the time-slot samples (e.g., half of the time-slot sample), the vast majority of the viewers (e.g., 95%) present at the viewing location were not present during the previous time-slot sample. In this case, data are preferably only recorded during the portion of the time-slot sample in which the vast majority of viewers who would have been present during the previous time-slot sample would have left the location.

An alternative approach, as discussed below, involves using most or all of the data recorded during the time-slot sample, but weighting the data more heavily toward the end portion of the time-slot sample as compared to the beginning portion of the time-slot sample. Furthermore, any still existing within-location carryover effects (e.g., those that would arise from the 5% or fewer consumers that would have been exposed to both versions of test content) may be eliminated by counterbalancing the order at which content is presented (e.g., ensuring that content B follows content A as often across the experiment as content A follows content B).

Between-location carryover effects occur when viewers at one location act on the content at a different location. Between-location carryover effects may be eliminated by ensuring that locations within plausible traveling distance of each other are constrained in the content they play such that it is not possible to leave one location while one experimental condition is in force and go to a nearby location and act in ways that affect the dependent variable(s) while other experimental content is in force.

Two types of blocking may be employed for different reasons; blocking by optimization factors and blocking by noise variables. Optimization factors are those factors at the signage location that might have implications for the effectiveness of the content. Such factors include signage location, ambient lighting, socioeconomic status of viewers, dayparts, and the like. Blocking by these factors allows for factorial analyses to measure interactions between content and optimization factors (e.g., measuring whether content A is more effective in the morning whereas content B is more effective in the evening). Blocking by noise variables can be used to increase statistical power by eliminating variability associated with factors that impact the dependent variable that are predictable but that are of no interest with respect to the experiment.

It is noted that, given proper randomization, it is impossible for any factor outside of the experiment (e.g., change in demand, road construction, other advertising efforts) to vary systematically with the level of the independent variable. In a double-blind experiment, neither the subjects (in this case, customers) nor the researches know who belongs to the control group and the experimental group. Only after all the data are recorded, and in some cases analyzed, do the researches learn which individuals are in each respective group. Performing an experiment in double-blind fashion represents one way to lessen the influence of the prejudices and unintentional physical cues on the results (the placebo effect, observer bias, and experimenter's bias).

Advantageous aspects of the present invention according to various embodiments are readily appreciated when considering problems and limitations associated with conventional manual approaches to designing true experiments or sub-processes of same that have constraints of a true experiment. While data produced by a true experiment are capable of eliminating the effects of confounds, the complexity of manually designing and conducting a true experiment that appropriately controls or eliminates confounding variables is a barrier to widespread acceptance of their use in the marketplace.

A first problem associated with conventional approaches involves designing the precise content distribution pattern such that it conforms to an experimental design that limits scalability. Designing and conducting true experiments is complex enough with one, two or even five variables, requiring a highly trained statistician to block, counterbalance, randomize, and appropriately deal with all confounds. As such, conventional approaches are not very scalable because as the number and complexity of the experiments conducted grows, additional statistical and experimental design experts are needed.

A second problem associated with conventional approaches involves scheduling the content to play at precise times corresponding to the experimental design on digital signage software, which is prohibitively time-consuming when attempted manually. Networks typically include hundreds or even thousands of digital displays (e.g., the WAL-MART TV network consists of 125,000 LCD displays). Consumers, commonly characterized as part of specific target audience sub-segments, visit stores within sub-sets of the day called dayparts, for example. Scheduling content across a digital signage network and across these sub-segments and dayparts is already a time-consuming activity. For example, it is nearly a full-time job to manage the scheduling of digital signage content for a 300-400 sign network in which many of the signs play exactly the same content at exactly the same time.

However, to conduct true experiments across a digital signage network, a statistician must precisely schedule advertising content according to blocking, counterbalancing, and otherwise control for all variables via randomization. Scheduling the digital signage content using current content management software often takes up to twenty minutes for a single sign. As such, manually scheduling individual pieces of digital signage content such that they are played in the precise pattern corresponding to the experimental design, across a large network of signs would be prohibitively time-consuming, if not impossible, using conventional techniques.

A third problem associated with conventional approaches involves connecting the dependent variable data to the experimental conditions, which is time-consuming. Presently, after the experiment is executed, a statistician must request data from the finance department, for example, in very specific detail, and match the data points with the precise content that was played across the network. These and other problems and limitations associated with conventional approaches are overcome by distributing communication content and assessing effectiveness of such content in accordance with the present invention.

Provided hereinbelow are examples directed to distribution of communication content and assessing the effectiveness of such content in a manner consistent with constraints of a true experiment. These examples are provided for illustrative purposes only, and do not limit the scope or application of the disclosed principles. Rather, a wide variety of media and communication distribution architectures and methodologies are contemplated, including those involving print media, cellular or wireless communication devices, Internet accessed content and devices, including fixed and portable (e.g., handheld) devices, in-store and outdoor (e.g., electronic billboard) display systems. A wide variety of content that can be communicated over such architectures and devices is also contemplated, including advertising content, teaching content, and way finding content, for example.

Although the automated experimental design methodologies described herein are generally focused on digital signage applications, it is understood that such methodologies may be applied to numerous marketing communication tactics, including webpage design, Internet advertising, point-of-purchase printed marketing, and direct marketing, among others. For example, Internet analytics methods or web-based automated experimentation systems, such as the systems disclosed in U.S. Pat. Nos. 6,934,748 and 7,130,808 which are incorporated herein by reference, may be modified in accordance with the present invention to provide for implementing true experimental design or sub-processes that have constraints of a true experiment.

Aspects of the present invention may be incorporated in automated content distribution systems and methods that are not directed to experimentally measuring the effects of the distributed content, but involve distributing content based on other constraints, such as fulfilling contract obligations. An example of such a system and method is disclosed in U.S. Patent Publication No. 2006/0287913, which is incorporated herein by reference. In such systems and methods, content distribution may be performed while simultaneously measuring the effectiveness of the distributed content in accordance with the present invention.

The following non-limiting examples of systems and methodologies illustrate various embodiments of the present invention. Some of the examples are directed to systems and algorithms that facilitate measuring the effectiveness of communication content consistent with constraints of a true experiment. Some of the examples are directed to systems and algorithms that facilitate control of the pattern at which communication content is distributed in order to control for and eliminate (or significantly reduce) confounds. Some of the examples are directed to systems and algorithms that may be implemented to facilitate non-experimental analyses of content effectiveness, such as in quasi-experimental analyses and correlational studies.

Figure 2A:
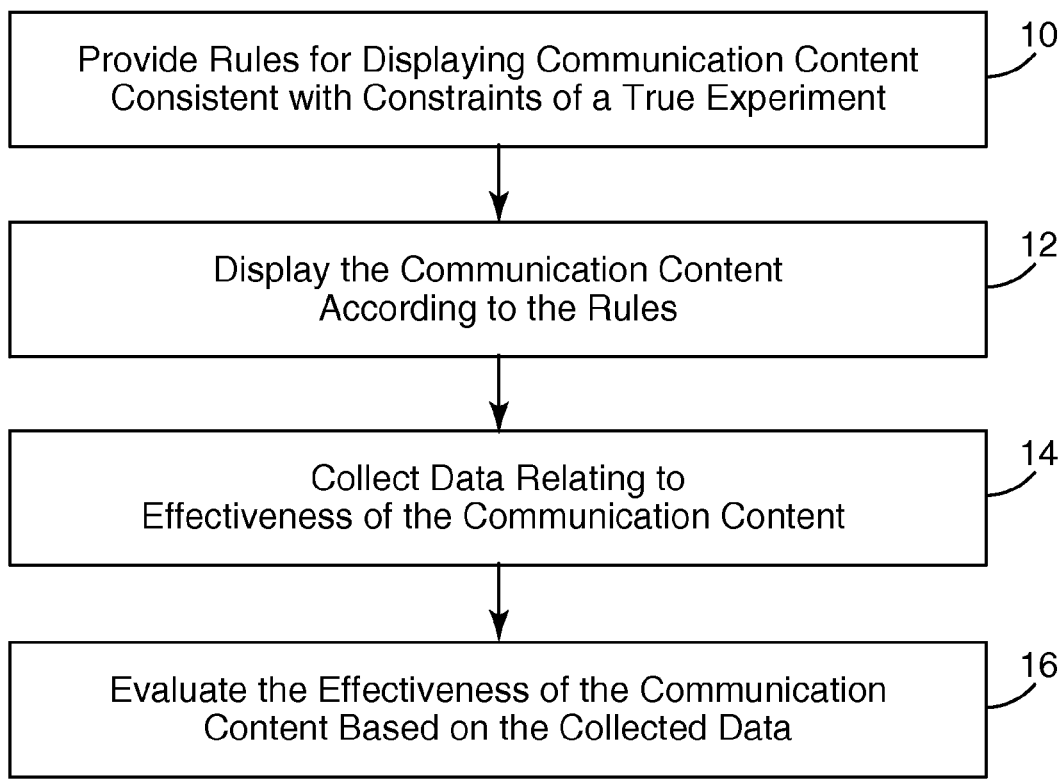
FIG. 2A is a diagram that illustrates processes implemented by computer assistance for distributing communication content and assessing effectiveness of such content in accordance with embodiments of the present invention.

Various embodiments of the present invention provide for automatic parsing of the dependent variable data to correspond to the experimental conditions. FIG. 2A illustrates embodiments that involve the provision 10 of rules for displaying communication content consistent with constraints of a true experiment. In some embodiments, provision 10 of these rules involves creation of such rules consistent with constraints of a true experiment. In other embodiments, previously created rules are provided to a system that provides for displaying communication content consistent with constraints of a true experiment. As is further shown in FIG. 2A, the communication content is displayed 12 according to the rules. Data relating to the effectiveness of the communication content is collected 14, and the effectiveness of the communication content is evaluated 16 based on the collected data.

Figure 2B:
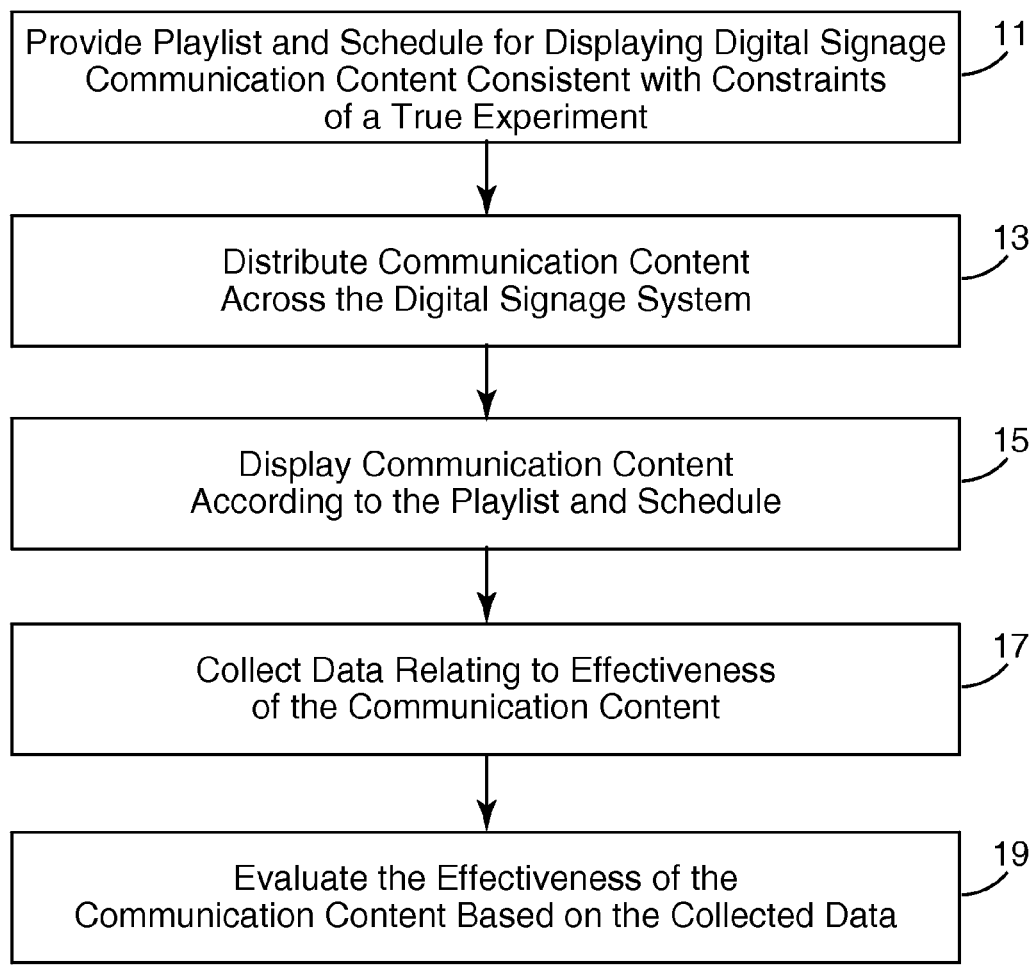
FIG. 2B is a diagram that illustrates processes implemented by computer assistance for distributing communication content and assessing effectiveness of such content in accordance with embodiments of the present invention.

FIG. 2B is illustrative of embodiments directed more particularly to automatic scheduling and presentation of digital signage content. According to FIG. 2B, a playlist and schedule for displaying communication content consistent with constraints of a true experiment are provided 11. A playlist refers to the order of individual pieces of content, and a schedule dictates playback of pieces of content, such as those defined by a playlist.

In some embodiments, provision 11 of the playlist and schedule involves creation of the playlist and schedule consistent with constraints of a true experiment. In other embodiments, a previously created playlist and schedule are provided to a system that provides for displaying communication content consistent with constraints of a true experiment. The communication content is distributed 13 across a digital signage system. The communication content is displayed 15 on displays of the digital signage system according to the playlist and schedule. Data relating to the effectiveness of the communication content is collected 17, and the effectiveness of the communication content is evaluated 19 based on the collected data.

It is to be understood that one or multiple processing devices (e.g., PCs, mini-computers, network processors, network servers, etc.) may be used to perform one, some, or all of the processes shown in FIGS. 2A-2B and in other Figures of this disclosure. For example, a first processor or set of processors may be used in the creation of playlists and schedules. A second processor or set of processors may be used to distribute content at one location or across a digital signage system. A third processor(s) may be used to display content according to the playlists and schedule, while a fourth processor(s) may be used to collect data relating to content effectiveness. A fifth processor(s) may be used to evaluate the effectiveness of content based on the collected data. In some embodiments, these processes and other processes discussed herein can be implemented by one or more processors that may be networked so as to effect communication between some or all of these processors.

In other embodiments, some or each of such processes may be implemented by processor(s) that are not networked or otherwise linked to effect communication therebetween. For example, a first processor(s) may be configured to execute a set of program instructions to implement playlist and schedule creation, while a second processor(s) may be configured to execute a set of program instructions for distributing content to one or a number of display devices. Unless otherwise indicated, the term processor or computer (and their variations) as used herein and in the claims contemplates a single processor, multiple processors of which some or all may be communicatively coupled, disparate processors (single of sub-networks) that are not communicatively coupled together, and other configurations of processing resources.

Figure 3:
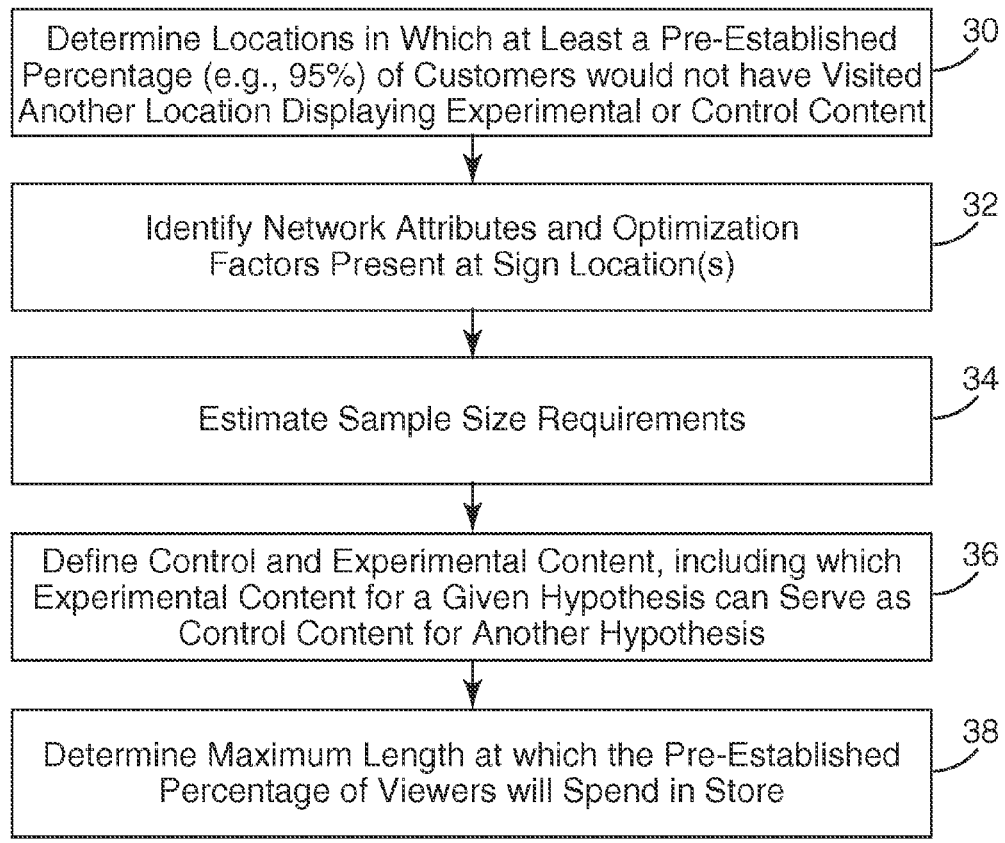
FIG. 3 illustrates processes involving network setup and data gathering in connection with algorithmically scheduling and presenting communication content consistent with constraints of a true experiment in accordance with embodiments of the present invention.

FIGS. 3 and 4 illustrate processes related to algorithmically scheduling and presenting communication content consistent with constraints of a true experiment in accordance with embodiments of the present invention. FIG. 3 shows various processes involving network setup and data gathering in connection with algorithmically scheduling and presenting communication content in accordance with embodiments of the present invention.

According to the illustrative example shown in FIG. 3, setting up the digital signage network setup involves determining display locations that facilitate control, reduction, or elimination of confounds, such as carryover effects. For example, setting up the network may involve determining locations 30 in which at least a predetermined percentage (e.g., 95%) of customers would not have visited another location displaying experimental or control content. It is not critical that a value of 95% is chosen. However, it is understood that the greater the value chosen, the less likely it is that the result could underestimate the precise amount of the return on investment from the content. The value of 95% is simply large enough that, with proper counterbalancing, the impact of carryover effects would be almost nonexistent.

It is important to ensure that the vast majority of viewers will not have an opportunity to see the message at one site and act upon it at another site that is playing different control or experimental content. Instances of this happening would be instances of carryover effects, which can confound the results of the experiment. For example, if one were conducting experiments on displays in automobile dealerships, one would need to know which dealerships are close enough in proximity to each other such that a viewer could see content in one dealership and purchase vehicle in another dealership partaking in the experiment. This can be accomplished as part of the digital signage network setup. For example, the software could prompt the installer to select all of the locations across the network at which viewers could plausibly visit after leaving their dealership (e.g., other dealerships in the same geographic region).

Network attributes and optimization factors present at sign locations are preferably identified 32 at part of the digital signage network setup. Such factors may include characteristics of each site that predictably impact the value of the dependent variables at the locations (e.g., store size, socio-economic class, other advertising efforts, daypart differences in the typical number of viewers at the location). These factors then become blocking factors in the experiment.

There are two categories of blocking factors. One category includes those factors in which the experiment would test for interactions, and that would have implications for strategic decisions about what content to display (e.g., content A might be more effective at low Socio-Economic Status (SES) dealerships whereas content B might be more effective at high SES dealership). The other category of blocking factors are those that do not have obvious implications for which content to show, but that should nonetheless be blocked against in order to increase the statistical power of the experiment. Again, these factors can be specified during the software installation process and updated thereafter.

Network setup also includes estimating sample size requirements for the experiment 34. Ideally, a statistical power analysis is preferably used to calculate how much data is needed to find statistically significant results of at least some minimum magnitude that is of business interest.

Control and experimental content are defined 36 as part of the network setup. Control content (i.e., the placebo) can be any message that is neither intended nor likely to influence the desired behavior, such as local weather or news, or messages about a product or service that is unrelated to the dependent variable. Experimental content is the content that is hypothesized to cause a change in the dependent variable. It is noted that, under some circumstances, experimental content for one hypothesis can serve as control content for a different hypothesis.

Data regarding the maximum duration that the vast majority of viewers spend at the site conducting their business is acquired 38 and used to control for carryover effects. A carryover effect occurs when a viewer sees experimental content at one time and then acts on the content when control content is playing (or vice versa), as previously discussed. Such instances can be easily eliminated by ensuring that within a block of time or time-slot sample, only experimental content or only control content is displayed, and ensuring that the block of time or time-slot sample is sufficiently long that anyone exposed to the previous block of content would not be present at the time data collection begins while the current block of content is being played.

Figure 4A:
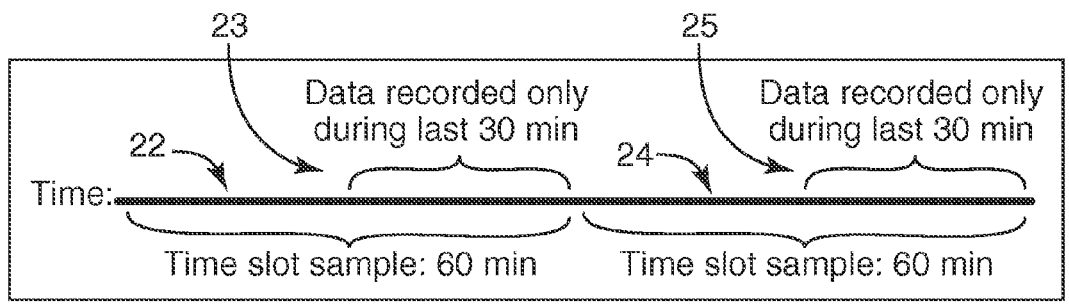
FIG. 4A illustrates processes for controlling location carryover effects in connection with distributing communication content and assessing effectiveness of such content in accordance with embodiments of the present invention.

FIG. 4A illustrates processes for controlling (e.g., reducing or eliminating) location carryover effects in connection with distributing communication content and assessing effectiveness of such content in accordance with embodiments of the present invention. FIG. 4A illustrates how within-location carryover effects are controlled if the maximum duration at which 95% of customers would spend at the signage location is 30 minutes. In this illustrative example, the time-slot sample 22, 24 during which content is played is double the maximum duration at which 95% of customers spend at the location.

Figure 4B:
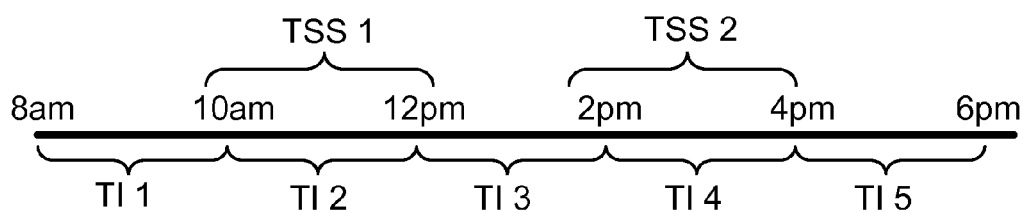
FIG. 4B illustrates processes for controlling location carryover effects in connection with distributing communication content and assessing effectiveness of such content in accordance with other embodiments of the present invention.

Data recording does not begin until 95% of the customers who were present during the previous time-slot sample would have left the signage location. In this example, data are only recorded during the last 30 minute portion 23, 25 of the time-slot sample 22, 24. It is noted that the time interval for each location is preferably represented by the smallest unit of time across which dependent variable data can be measured. For example, sales data collected in some point-of-sale systems is provided in units of seconds, whereas other systems report sales only across units of hours. FIG. 4B illustrates processes for controlling location carryover effects in connection with distributing communication content and assessing effectiveness of such content in accordance with other embodiments of the present invention. Aspects of FIG. 4B are discussed hereinbelow.

Figure 5:
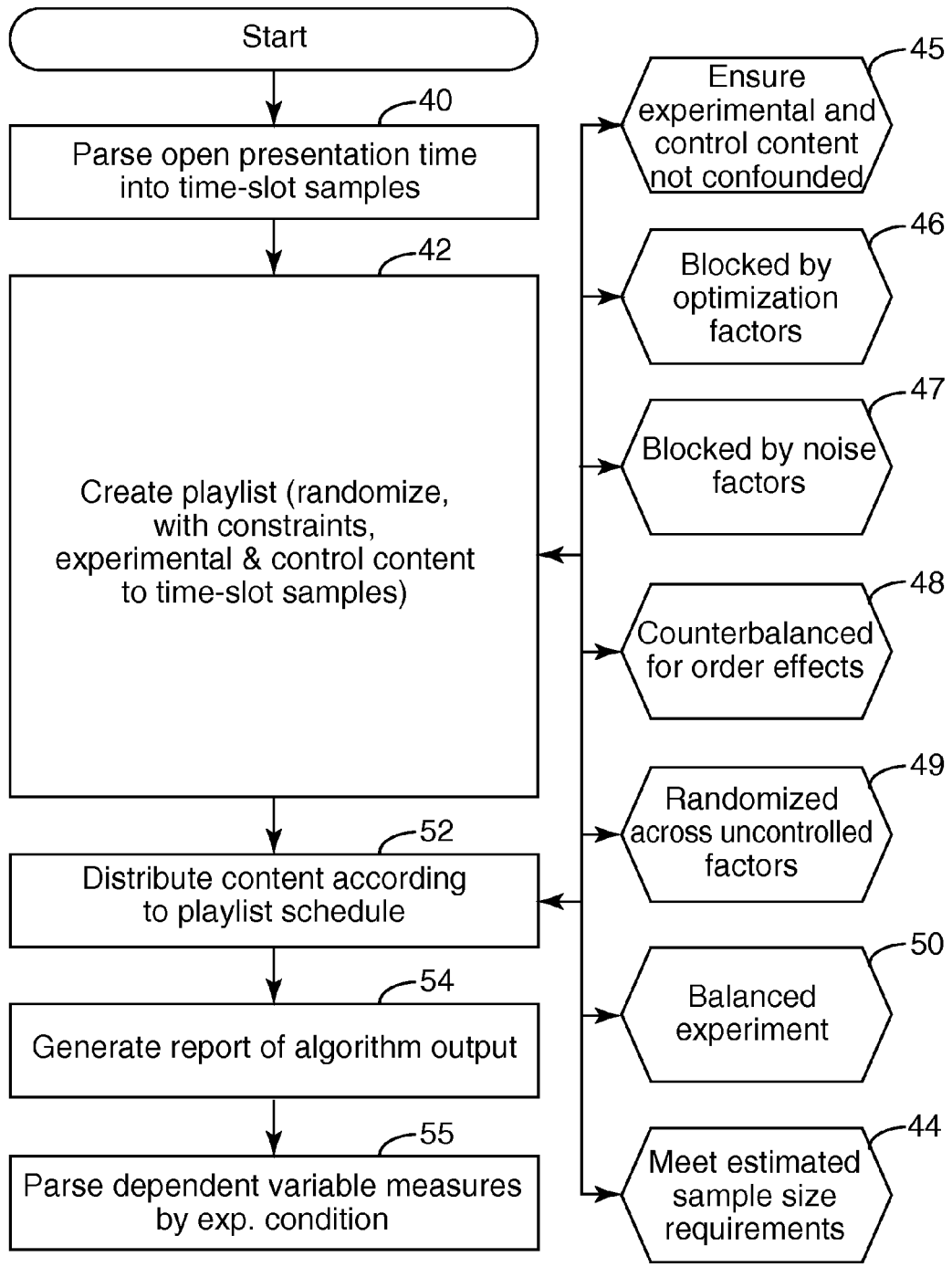
FIG. 5 illustrates processes for algorithmically scheduling and presenting communication content consistent with constraints of a true experiment in accordance with embodiments of the present invention.

FIG. 5 illustrates processes for algorithmically scheduling and presenting communication content consistent with constraints of a true experiment in accordance with embodiments of the present invention. The processes shown in FIG. 5 illustrate various actions of an experimental design and execution process of the present invention. FIG. 5 is intended to illustrate a comprehensive system that incorporates numerous features that facilitate scheduling and presenting communication content consistent with constraints of a true experiment. It is understood that all of the features shown in FIG. 5 need not be incorporated in a system and methodology of the present invention. Selected feature(s) shown in FIG. 5 may be utilized in stand-alone applications or combined with other features to provide useful systems and methods in accordance with embodiments of the invention. FIGS. 6A-7B, for example, illustrate various useful combinations of the features shown in FIG. 5. Many combinations of the features shown in FIG. 5 may be implemented in non-experimental systems, such as quasi-experimental systems and those that employ correlational or regression analyses or artificial neural networks.

Many of the processes shown in FIGS. 5-7B have inputs that are typically received from other processes, systems (e.g., POS systems), sensors (e.g., presence sensors), or from a user, among others. These inputs include the following: duration data for each piece of content that is being tested for effectiveness (CD); duration of interest (DI) after which the content is viewed not to be of interest if the content caused a change in the behavioral or transactional data being measured; pair-wise content relatedness data (CR) (i.e., is content A expected to differentially impact the same behavioral or transactional data as content B?); pair-wise location relatedness (LR) (i.e., the likelihood that viewers can be exposed to content at location A and behave at location B within the above stated duration of interest); optimization factors present at sign location (OF); estimated sample-size requirements, which may be optional, for how many time-slot samples are required for each piece of content, by optimization factors (SS); maximum duration that a certain percentage of target viewers (e.g., 95%) spend at the sites where displays are located (viewer visit duration or VVD); time intervals (TI) for data collection/aggregation for data streams of interest that target viewers can affect during visit to the site (TI); blocking factors (i.e., the most powerful factors that are predictive of dependent variable data but that are not per se of interest for optimizing content); absolute placebo content; and experimental content.

Viewer visit duration is an important parameter that represents the maximum time that a specified percentage of viewers spend at a location. VVD is typically calculated from individual VVDs for many viewers, understanding that there will be a distribution of individual VVDs depending on a large number of factors that influence the time an individual spends at a location. Precision of VVD depends on the size of the location. A small location, e.g., a small store, would have well-defined opportunities for seeing the content and then acting on the content within a few minutes.

Viewer visit duration may be determined in a variety of ways, such as by estimating the VVD based on an expected VVD. Determining the VVD may be based on one or more factors, including, for example, transactional data, prior sales data, sensor data (e.g., proximity or presence sensor data), and observational data. Other approaches for determining the VVD are discussed in illustrative examples provided hereinbelow.

It is understood that some "viewers" will never see (or comprehend) displayed content, but may nonetheless purchase an advertised item (generalized to the behavior being measured). Other viewers will see the content and not buy, and other viewers will both see and buy an advertised item. In this regard, methods of the invention are directed to revealing the difference between measured behavior as a function of content (experimental vs. control) being displayed. It is noted that this behavior difference being measured will also be a function of display location (e.g., in an obscure corner where few will see it vs. a very conspicuous position where all will see it). If the display is seen by few/none, then the most compelling content (FREE Flat Screen TVs Today!!!) will result in virtually no difference for measured behavior (picking up the free TVs).

Location is an important term that refers to the physical space within which the viewer can be both exposed to levels of independent variables (e.g., in the form of digital signage content) and cause a change in dependent variable data (often dependent variable data will consist of point-of-sale or sensor data) corresponding to the independent variables. Often, the location in a retail environment is the physical space owned by the retailer. However, there are some circumstances when the location will be a subset of the space owned by the retailer. For example, consider the case of a hotel lobby having a display nearby the check-in desk, where an experiment is testing the relative effectiveness of two pieces of digital signage content designed to increase the probability that guests will upgrade to a nonstandard room. In this case, the location would be the hotel lobby area (and not the entire hotel) because viewers could only be exposed to the content within the hotel lobby, and it is very unlikely that viewers would upgrade to a nonstandard room other than during their first visit to the hotel lobby. As such, this is a controlled physical space allowing for precise VVDs.

In the case of a city having a single outdoor display and multiple retail establishments where consumer behavior is measured (e.g., by purchasing an advertised product presented on the city's single outdoor display), for example, VVD becomes much less precise. Shopping mall environments typically fall somewhere between a controlled location allowing for precise VVDs and the exemplary city scenario discussed above. By way of contrast, it is noted that the most controlled situation is a location represented by a person sitting at a computer display, responding to (i.e., behaviorally acting on) content by way of mouse clicks and/or keystrokes.

As was discussed previously, carryover effects occur when the effects of one level of an independent variable persist when attempting to measure the effects of another level of the same independent variable. The solution to controlling for or eliminating carryover effects provided by embodiments of the present invention is to ensure that sufficient time has passed between (1) changing levels of independent variables; and (2) collecting data after changing levels of an independent variable.

One way to ensure that carryover effects are eliminated in the context of digital signage content is to wait very long periods between changes of levels of independent variables and/or wait very long periods between changing levels of an independent variable and collecting dependent variable data. For example, one could only show one level of an independent variable (e.g., "avoid a breakdown" as in the examples show in FIGS. 1A and 1B) for a week or more at a time. Then, by collecting data during the entire week, it would be unlikely that many of the data points collected during the week would be impacted by a different level of the independent variable (e.g., "save money" in this example). However, such an approach severely limits the number of instances across time that levels of independent variables can be changed.

Those skilled in the art will appreciate that the speed with which conclusions can be generated from experiments is directly related to the number of instances across time that independent variables can be manipulated. Embodiments of the present invention advantageously provide for use of VVD and TI as inputs to determine how often changes in the levels of an independent variable occur, thus allowing one to control for or eliminate carryover effects while changing independent variable levels as frequently as possible.

Referring again to FIG. 5, a schedule is parsed 40 into time-slot samples. Parsing the schedule is essential for eliminating carryover effects. Parsing typically involves algorithmically parsing the schedule such that time-slot samples can be assigned to the schedule or schedules which dictate playback of the content.

Creation 42 of a playlist involves algorithmically assigning content to time-slot samples such that the content distribution pattern (i.e., timing and location at which content is played) meets the constraints of the experiment. This may be accomplished, for example, by ensuring experimental and control content is not confounded 45, randomly assigning content to time-slot samples with specific constraints that ensure blocking 46 by network optimization factors (i.e., factors that are being studied), blocked 47 by other factors that can be controlled and predicted but that are otherwise not of interest in the study (i.e., noise factors), counterbalancing 48 for order effects, randomizing 49 across uncontrolled factors, ensuring that the design is balanced 50 such that there is roughly an equal number of time-slot samples across blocks, and meeting 44 established sample size requirements.

The content is distributed 52 according to the playlist schedule. Ideally, this process 52 and associated algorithms are embedded within content management software, so that the content can be automatically distributed according to the created playlist schedule. A report of the algorithmic processes discussed above is preferably generated 54. The report preferably identifies what content was presented, and when and where the content was presented. The report may also indicate what dependent variable data to code, and any optimization, noise, and blocking factors were present or used. Other data pertinent to processes or performance impacting the algorithms may also be included on the generated report. It is understood that these and other data/information is recorded so that a report of the algorithmic processes may be generated. The report preferably specifies which dependent variable to code within each time-slot sample, and which dependent variable data to use or discard due to possible contamination by carryover effects or other confounds.

Dependent variable measures are parsed 55 by experimental condition, which may use data of the generated report. For example, dependent variable data (e.g., POS sales data) is preferably time and location stamped, such that this data can be automatically parsed according to the experimental conditions for analysis.

Figure 6A:
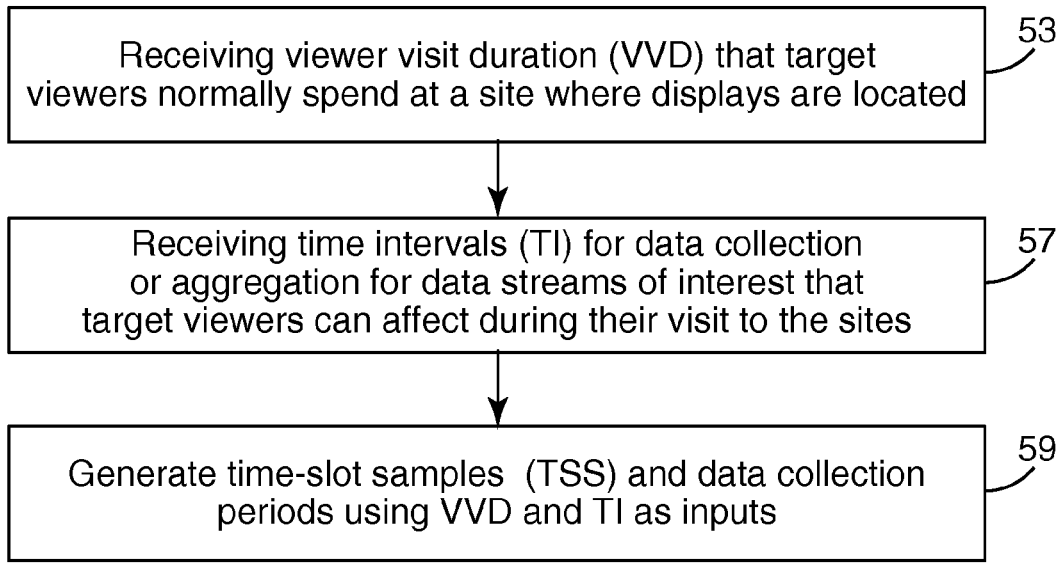
FIG. 6A illustrates various processes involving generation of time-slot samples in accordance with embodiments of the present invention.

FIG. 6A illustrates various processes involving generation of time-slot samples in accordance with embodiments of the present invention. According to FIG. 6A, viewer visit duration that target viewers normally spend at a site where displays are located is received 53. Time intervals for data collection or aggregation for data streams of interest that target viewers can affect during their visit to the sites are received 57. Using viewer visit duration and the time intervals, a number of time-slot samples needed to measure effects of content assigned to the time-slot samples are determined 59, and a data collection period associated with each of the time-slot samples is determined.

Embodiments of the present invention, as exemplified by the processes shown in FIG. 6A, generate "samples," referred to herein as time-slot samples, to which content can be assigned for measuring the effects of the assigned content. These "samples," and the methodologies that generate such samples, have significant value and represent an end product that can be utilized by a purchaser of these samples to test the effectiveness of content.

By way of analogy, the research industry requires samples for conducting experimentation. These samples are often difficult and expensive to produce. Examples of typical samples are qualified biological cells (e.g., cells that have been determined to have a specific genetic disorder, such as cancer cells) that are appropriate for use in biological research, respondents to political polls where the respondents have been carefully selected based on characteristics, and panels that have been qualified to represent consumer segments. The time-slot samples (TSSs) generated in accordance with the present invention represent qualified "samples" in the sense that the TSSs present valid opportunities to distribute levels of an independent variable and allow for accurately measuring the effects of the independent variable. These TSSs are valuable because they can be sold to media companies in an analogous way as human respondents or cancer cell lines.

Figure 6B:
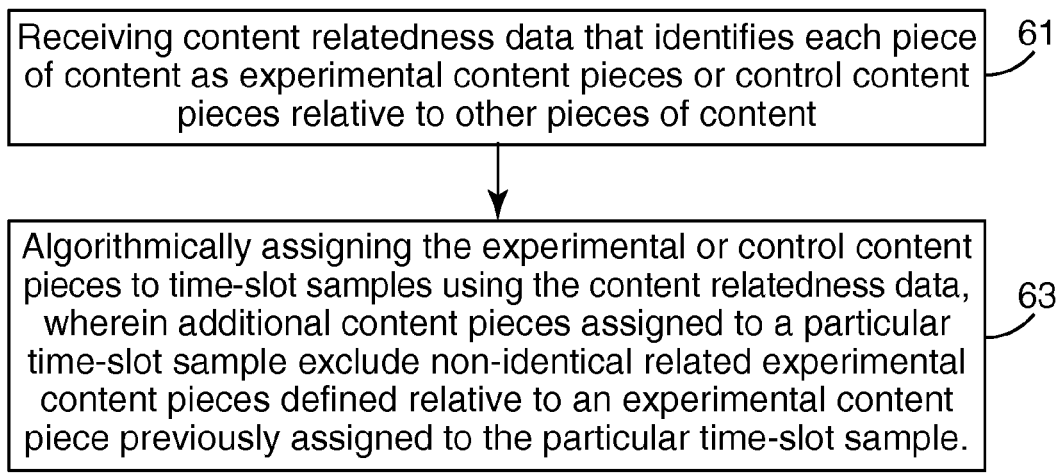
FIG. 6B illustrates various processes involving assigning content to time-slot samples in accordance with embodiments of the present invention.

FIG. 6B illustrates various processes involving assigning content to time-slot samples in accordance with embodiments of the present invention. According to FIG. 6B, content relatedness data that identifies each piece of content as an experimental content piece or a control content piece relative to other pieces of content is received 61. The processes of FIG. 6B further involve algorithmically assigning 63 the experimental or control content pieces to time-slot samples using the content relatedness data. The content pieces assigned to a particular time-slot sample exclude non-identical experimental content pieces relative to an experimental content piece previously assigned to the particular time-slot sample.

The processes shown in FIG. 6B, in one sense, describe a technique or tool (e.g., software) that can be used to increase the speed and accuracy of conducting experiments on the effectiveness of content. A technique or tool implemented in accordance with FIG. 6B represent a valuable end product that provides utility to one that wishes to conduct experiments on the effectiveness of content. By way of analogy, and in the context of the biological research domain, tools are developed and used to increase the speed and accuracy of conducting experiments on, for example, cancer cells and for decreasing the cost of conducting such experiments. For example, genetic sequencing tools have been developed to automatically control the steps of genetic sequencing. In a similar fashion, tools and techniques implemented in accordance with FIG. 6B may be used to increase the speed and accuracy of conducting experiments on the effectiveness of content, and to decrease the cost of conducting such experiments.

Figure 6C:
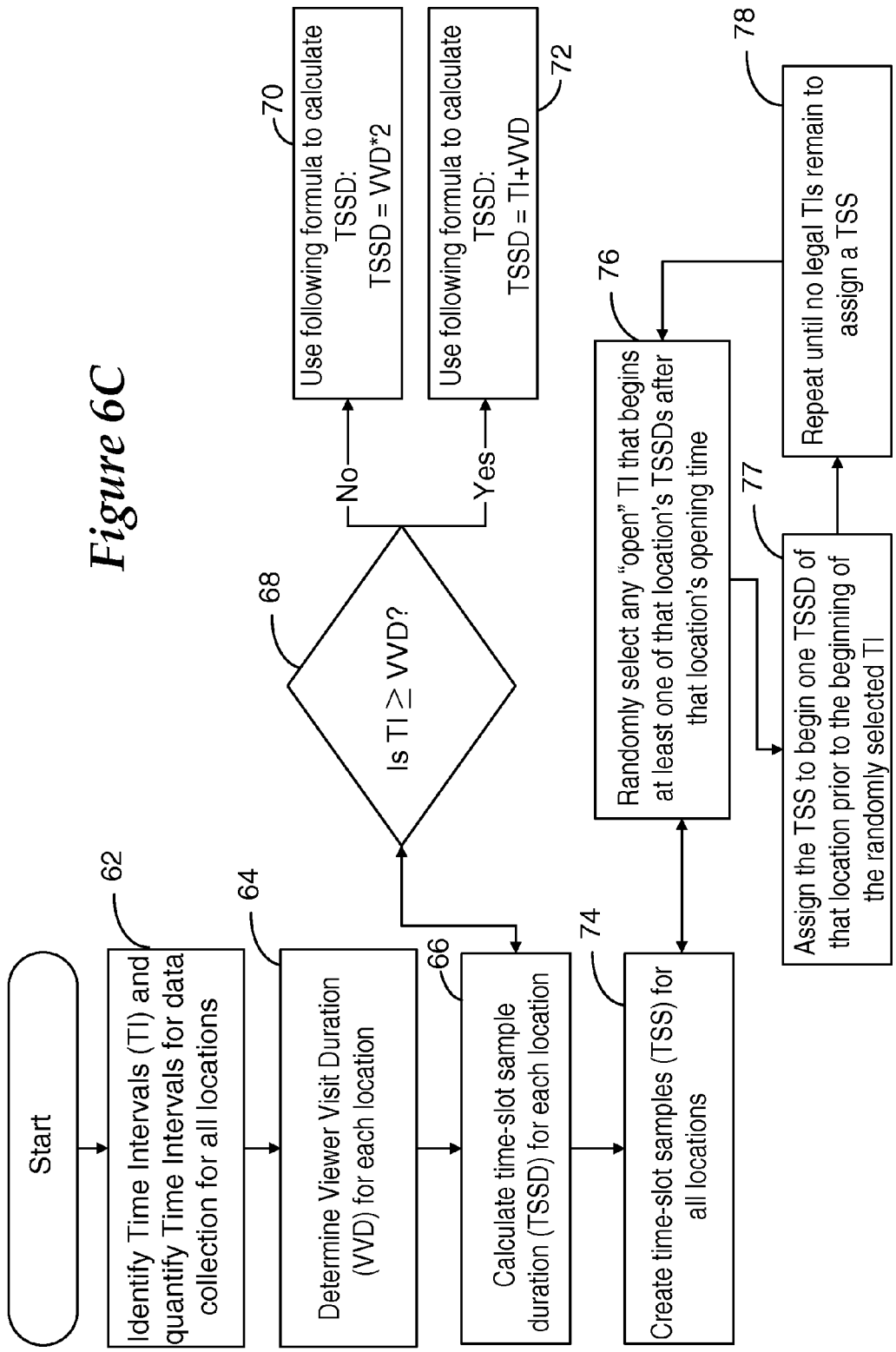
FIG. 6C illustrates an embodiment of an algorithm that may be used for parsing a schedule into time-slot samples using a complete randomization process in accordance with embodiments of the present invention.

FIG. 6C illustrates an embodiment of an algorithm that may be used for parsing a schedule into time-slot samples using a complete randomization process in accordance with embodiments of the present invention. According to FIG. 6C, the duration of time intervals (TI) for each display location is identified and quantified 62. The viewer visit duration (VVD) for each location is determined 64. As discussed previously, a TI represents the smallest unit of time across which dependent variable data can be measured, and VVD is the maximum amount of time that a predetermined percentage (e.g., 95%) of the viewers spend at the location during any one visit.

Time-slot sample duration (TSSD) is determined 66 for each display location. Time-slot sample duration is a specific duration of time that a time-slot sample lasts. During a TSSD, different experimental and control content is played, preferably in a manner such that there is no overlap that would produce confounds. According to one approach, and as indicated at blocks 68, 70, and 72 of FIG. 6C, time-slot sample duration may be computed as follows:

Is TI≥VVD

If No, then $TSSD=VVD*2$

If Yes, then $TSSD=TI+VVD$        [1]

It is noted that if the TI is not equal to nor greater than the VVD (e.g., TI is 1 second) in Formula [1] above, then half of the duration of the time-slot sample duration will include viewers that were not present for content from the previous time-slot sample. Importantly, only data collected during this second half (i.e., the data collection period of the TSSD in this example) is included in the analysis, and in conjunction with counterbalancing, this eliminates carryover effects.

If, in Formula [1] above, the TI is equal to or greater than the VVD (e.g., TI is 6 minutes, VVD is 5 minutes), then adding these durations together before logging dependent measures will ensure that data from viewers exposed to the prior content are not included in the data for the content being played during a particular time-slot sample. Again, this eliminates carryover effects. Time-slot samples (TSS) may then be created 74 for all locations. Once the duration of the time-slot samples has been determined, the system algorithmically assigns time-slot samples to the schedules.

In cases where TI is equal to or greater than the VVD and TSSD=TI+VVD, and as illustrated in FIG. 4B, an appropriate (e.g., optimal) data collection period may be defined where TSS begins one VVD before the beginning of TI and runs until the end of TI. The data collection period, in this case, runs the entire duration of TI. It is noted that, in this situation, all that one can be certain of is that something was purchased during the TI.

In the illustrative example shown in FIG. 4B, it is assumed that a VVD=15 minutes at a retail establishment, and the best the establishment's POS system can do is to isolate purchases to 2-hour periods (therefore, TI=2 hours, at 8 AM-10 AM, 10 AM-12 PM, 12 PM-2 PM, etc.). So, if $TI_2$ runs from 10 AM-12 PM, as is shown in FIG. 4B, then $TSS_1$ (when content is shown) begins at 9:45 AM and runs until 12 PM. Clean data can be collected from 10 AM-12 PM. Because of the establishment's POS system constraints, it is not possible to determine if something was purchased at a specific time or time segment, such as 12:01 PM or 1:59 PM, since TI=2 hours and, therefore, the data is an aggregate of all purchases between 12 PM and 2 PM. The complexity in this scenario is that the next TSS is not scheduled to start until 3:45 PM, because if the TSS started at 1:45 PM, then the last 15 minutes of the TI would be confounded by new content. The result of this is a 2 hour "dead period."

This "dead period" may be reduced or eliminated for experiments where lightly confounded data is acceptable. If, for example, VVD is quite short as compared to TI (e.g., 5 minute VVD and 2 hour TI), then it is accepted that 5 minutes out of 2 hours may be partially contaminated with confounded data. As VVD approaches TI, however, this becomes less satisfactory.

For many experiments, it is generally desirable to control within-location confounds by ensuring that the time-slot samples to which content can be assigned are sufficiently long to ensure that during some of the time-slot samples (e.g., half of the time-slot sample), the vast majority of the viewers (e.g., 95%) present at the viewing location were not present during the previous time-slot sample. In this case, data are preferably only recorded during the portion of the time-slot sample in which the vast majority of viewers who would have been present during the previous time-slot sample would have left the location. An alternative approach, as discussed below, involves using most or all of the data recorded during the time-slot sample, but weighting the data more heavily toward the end portion of the time-slot sample as compared to the beginning portion of the time-slot sample.

According to an alternative approach, constraints for controlling within-location confounds are effectively relaxed, such as by collecting data during some or all of the first half-portion of the time-slot samples, in addition to collecting data during the second half-portion of the time-slot samples. In many scenarios, the possible introduction of within-location confounds (carryover effects) that may occur as a result of relaxing constraints for controlling within-location confounds can be tolerated and meaningful results obtained.

An advantage realized by relaxing constraints for controlling within-location confounds concerns shortening of the time-slot sample duration, which results in an increased number of time-slot samples that can be used in a given experiment. Increasing the number to time-slot samples provides for an increase in the volume of data collection for an experiment when compared to the same experiment designed with more stringent constraints for controlling within-location confounds. Shortening of the time-slot sample duration can also provide for a decrease in the amount of time required to complete an experiment.

To enhance control of possible introduction of within-location confounds that may result from relaxing confound control constraints, it may be useful to implement a weighting scheme by which data collected during earlier portions of the time-slot samples are given less weight than data collected during later portions of the time-slot samples. For example, the data collected during the first half of the time-slot samples may be weighted less than that collected during the second half. A number of different weighting schemes may be employed, such as those that employ a linear function, an exponential function, a step-wise function, or other desired function or weighting methodology.

By way of simple example, data collected during the first half of the time-slot samples may be weighed in a linear fashion, such as by increasing the weighting percentage of the data linearly beginning with about a 5% weighting factor at the beginning of the time-slot samples and ending at about a 50% weighting factor at the mid-point of the time-slot samples. The weighting factor may be increase rapidly (e.g., as in the case of a step function) from the mid-point to the end of the time-slot samples, such as to 100% at the mid-point and continuing at 100% for the remaining portion of the time-slot samples.

According to another approach, the duration of the time-slot samples may be optimized based on the shape of the distribution of the viewer visit duration. For example, if VVD is strongly positively skewed, one could use a shorter time-slot sample than if the VVD distribution is strongly negatively skewed.

A randomization process ensues, by which time intervals are subject to random selection 76. The algorithm randomly selects any "open" time interval that begins at least one of a particular location's TSSDs after that location's opening time. The term "open" time interval refers to a time interval that does not already have a time-slot sample associated with it.

A time-slot sample is assigned 77 to begin one TSSD of that location prior to the beginning of the randomly selected TI. This process 76, 77, 78 continues until no legal TIs remain to assign a TSS. It is noted that time-slot samples are selected with the following constraint: time-slot samples subsumed by previously selected time-slot samples are excluded (e.g., if content is already being played from 9:01-9:20, the system does not choose 9:01-9:20 for candidate slots).

Figure 6D:
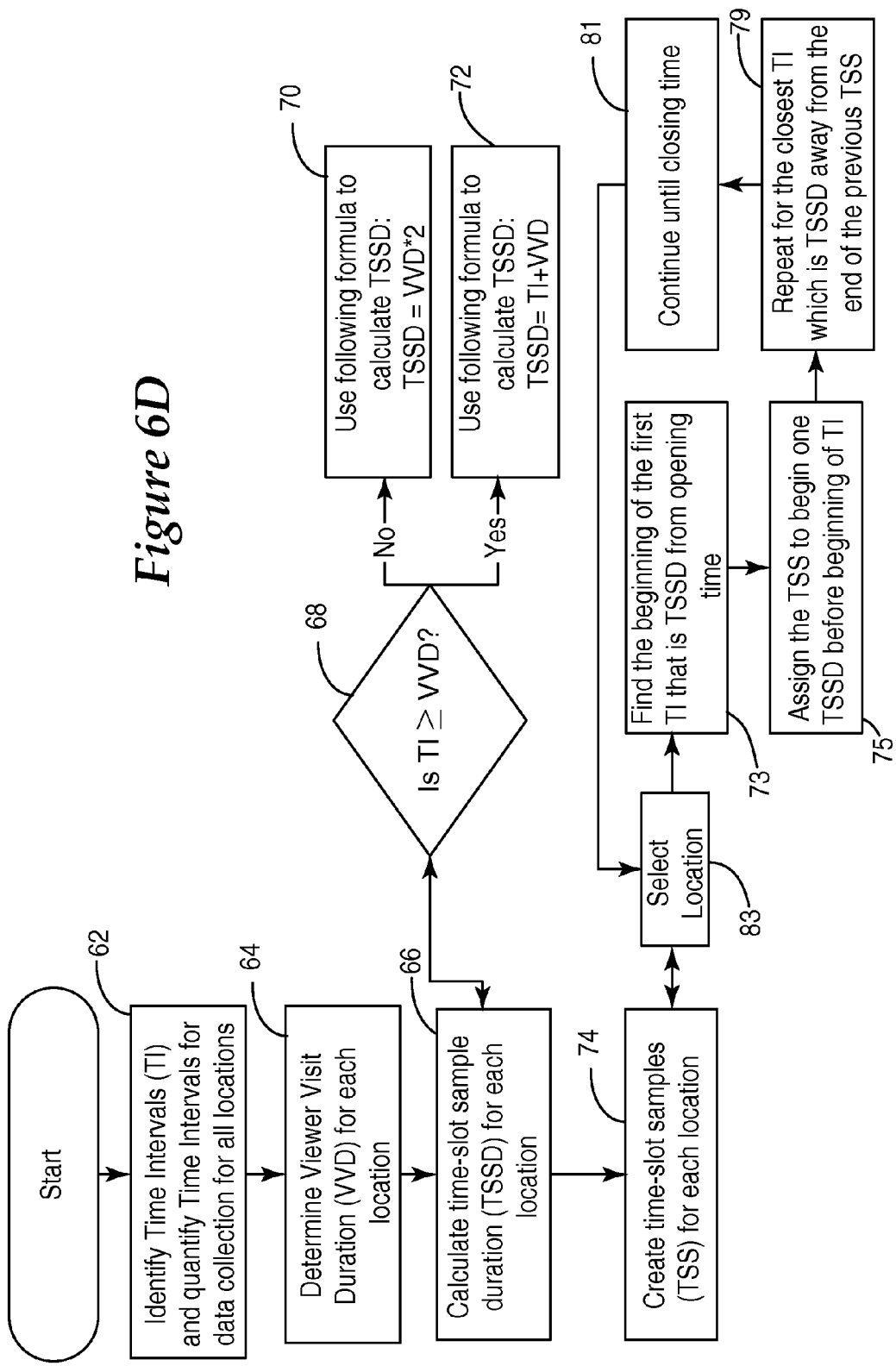
FIG. 6D illustrates an embodiment of an algorithm that may be used for parsing a schedule into sequentially generated time-slot samples in accordance with embodiments of the present invention.

FIG. 6D illustrates an embodiment of an algorithm that may be used for parsing a schedule into sequentially generated time-slot samples in accordance with embodiments of the present invention. Processes 62-72 of FIG. 6D are the same as the corresponding processes of FIG. 6D. Processes 76, 77, and 78 of FIG. 6C are illustrative of a complete random time-slot sample generation methodology. Processes 83, 73, 75, 79, and 81 of FIG. 6D are illustrative of a sequential time-slot sample generation methodology.

According to the sequential time-slot sample generation methodology of FIG. 6D, creating time-slot samples for each location 74 involves selecting 83 a location at which content is to be presented. The beginning of the first TI that is TSSD from the location's opening time is found 73. A TSS is assigned 75 to begin one TSSD before the beginning of the TI. This process 73, 75 is repeated 79 for the closest TI which is TSSD away from the end of the previous TSSD until the closing time is reached 81. This TSS creation process 74 is repeated for each selected location 83. Generating time-slot samples in a sequential manner as shown in FIG. 6D generally results in achieving greater efficiency of TI utilization.

It is noted that a benefit to using a sequential time-slot sample generation approach of FIG. 6D is that it would tend to lead to the generation of a larger number of time-slot samples as compared to the completely randomized method shown in FIG. 6C. For example, using a completely randomized method, if a time-slot sample were 4 hours in duration, and if the location is only open for 9 hours per day, it would be possible for the TSS to be randomly assigned to begin at hour 3 of the 9 hour day and end at hour 7. As such, there would be no more time-slot samples available to be generated at that location that day, because there is an insufficient time interval to accommodate another 4 hour time-slot sample. Using a sequential method, however, the first TSS could begin one VVD after opening the store, for example, during the first hour the store is open if the VVD was 20 minutes, and the TSS could continue until the fourth hour, leaving another 5 hours to accommodate another TSS.

Embodiments of the present invention provide the ability to quickly conduct experiments to measure the effects of content on viewer behavior and business results. As with any experiment, there are a specific number of samples required to complete the experiment. The specific number of samples varies for each experiment based on a number of factors such as dependent variable variability, number of experimental conditions, and effect sizes. In the context of embodiments of the present invention, a "sample" in an experiment consists of a time-slot sample. Thus, maximizing the number of time-slot samples per unit time (which is accomplished by minimizing time-slot sample durations while still controlling for or eliminating carryover effects) minimizes the amount of time required to obtain the required sample size for a given experiment, and by extent, minimizes the amount of time needed to complete an experiment. Minimizing the time to complete experiments is valuable because the results from experiments can be used to improve content effectiveness and content distribution patterns to help achieve business objectives, e.g., increasing sales.

In addition to the benefit of quickly determining and deploying effective content, rapid implementation of experiments allow quick and accurate testing for interactions between content factors such as display location factors (e.g., urban vs. suburban) and daypart factors (e.g., morning vs. evening), thus enabling increased revenue from targeting content efficiently. If the duration of the time-slot sample exceeds the duration of the daypart factor, the ability to isolate the interaction between content and dayparts is greatly decreased. However, if the time-slot sample duration is significantly shorter than the daypart factor being tested in the experiment, it is possible to use repeated measures designs, which can dramatically reduce the amount of data required to test for such interactions.

As shown in FIGS. 6C and 6D, time-slot sample durations are determined by using VVD or VVD plus TI. Although VVD is a statistical average for many viewers and situations, many business contexts (e.g., retail establishments) will have VVDs determined to be in the range of a few minutes to a few hours, and TIs of the same order of magnitude. Using these data as inputs results in typical TSSDs also ranging from a few minutes to a few hours, thus allowing multiple time-slot samples to be tested each day or half-day, while still methodologically (rather than statistically) controlling for carryover effects, thus preserving a high quality of data.

In an exemplary situation, a VVD for a retail establishment is 15 minutes, with a similar TI. As shown in FIG. 6C, this will translate to a TSSD of 30 minutes. If the establishment is open between 9 am and 9 pm, 24 time-slot samples could be tested, or two samples per hour. Using variations in VVD for different types of retail establishments may result in TSSDs as short as 5 or 10 minutes, or longer than 30 minutes.

Although VVDs corresponding to actual average viewer visit durations are preferred, VVD may be considered a parameter that is tailored for the particular conditions and/or constraints of a location where content of an experiment is presented. VVD is typically established in an empirical manner, using knowledge about physical conditions and/or constraints of a given location where an experiment is to be conducted, such as size and viewer traffic patterns, and general viewer behavior within the given location.

There may be times when artificial VVDs are used to calculate TSSD, either because of experimental considerations or because of physical constraints, e.g. the practical inability to quickly change non-digital signage at a location. In these cases, it may be expedient to set artificial VVDs of several hours, one day, or even longer, with the penalties of slower results and higher opportunity costs. It is noted that artificial VVDs shorter than actual VVDs may introduce within-location carryover effects. However, introduction of such within-location carryover effects in the case of artificially shorter VVDs may be acceptable in many cases, particularly those cases where the trajectory of the data provides an adequate result for a given experiment (e.g., a binary result [yes/no] that content A was more effective than content B by a specified minimum difference of interest, notwithstanding potential inaccuracies that may have minimally impacted the result due to the potential introduction of within-location carryover effects).

Another means of quickly generating results needed to evaluate content effectiveness is the ability to use multiple locations on a network, each having a display capable of showing content. Each location can be producing time-slot samples needed to fulfill the quantity of data to validate a hypothesis. In general, the rate of data generation scales with the number of locations, e.g., ten locations working in concert can generate about ten times the samples as a single location. This arrangement leads to the added possibility of learning about interactions between content effectiveness and display locations.

The methodology disclosed in this application also allows the ability to simultaneously test multiple independent variables during the same time-slot samples, providing that the content associated with the different independent variables is unrelated. This is because experimental content for one independent variable can be control content for another independent variable. Using this technique further increases the speed of experimentation as it is possible to simultaneously conduct experiments addressing multiple business objectives, thus liberating display time to achieve business goals.

FIGS. 7C-7J are illustrative examples that demonstrably show how methodologies of the present invention enable rapid implementation of experiments to measure the effects of content on viewer behavior and business results. The data of FIGS. 7C-7J reflect the number of days to complete an experiment implemented in accordance with embodiments of the present invention in view of variations of certain parameters that influence the speed at which an experiment is conducted. These parameters, as are shown in 7C-7J, include: the number of conditions (e.g., content A being compared to content B or control content); the variance of the dependent variable (i.e., how much variability in the data to be measured); the minimum difference of interest (i.e., the minimum difference in the results of the experiment above which the results are of interest and below which the results are not of interest); number of time-slot samples per day; and number of locations (i.e., the physical space within which the viewer can be both exposed to levels of independent variables and cause a change in dependent variable data corresponding to the independent variables).

FIGS. 7C-7F show the impact of the number of time-slot samples per day on the duration of time (given in days) to complete an experiment. In each of FIGS. 7C-7F, values for the number of conditions, variance of the dependent variable, minimum difference of interest, and number of locations are the same. The number of time-slot samples per day is shown varied, beginning with 1 (FIG. 7C), and increasing to 6 (FIG. 7D), 10 (FIG. 7E), and 16 (FIG. 7F), respectively. FIGS. 7C-7F vividly demonstrate a substantial decrease in the time to complete the experiment that is achieved by increasing the number of time-slot samples per day (e.g., a reduction from 22.3 days using 1 TSS per day to 1.4 days using 16 TSS per day).

FIGS. 7G-7J show the impact of the number of locations on the duration of time (given in days) to complete an experiment. In FIGS. 7G-7J, values for the number of conditions, variance of the dependent variable, minimum difference of interest, and number of time-slot samples are the same. The number of locations is shown varied, beginning with 1 (FIG. 7G), and increasing to 20 (FIG. 7H), 100 (FIG. 7I), and 1000 (FIG. 7J), respectively. FIGS. 7G-7J demonstrate a striking reduction in the time to complete the experiment that is achieved by increasing the number of locations used for conducting the experiment (e.g., a reduction from 139.6 days using 1 location to 0.14 days using 1000 locations).

Figure 6E:
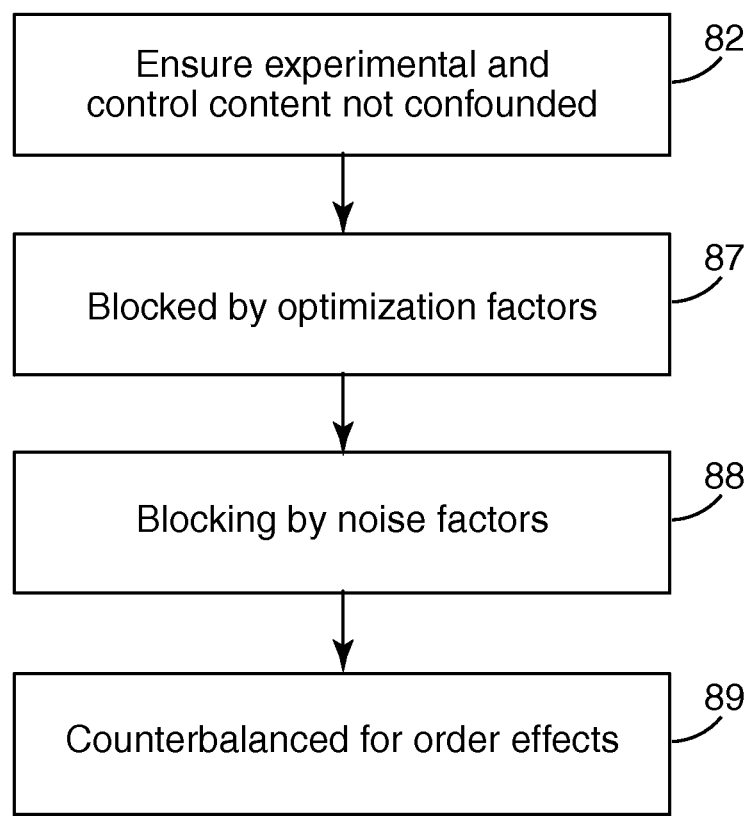
FIG. 6E illustrates processes of an algorithm that may be employed to create an experimental design playlist in accordance with embodiments of the present invention.

FIG. 6E illustrates processes of an algorithm that may be employed to create an experimental design playlist in accordance with embodiments of the present invention. The algorithm shown in FIG. 6E involves ensuring that experimental and control content is not confounded 82. According to the approach illustrated in FIG. 6E, each piece of experimental content is randomly assigned to a time-slot sample. This process ensures that two pieces of content that are being compared with one another with respect to impact on the dependent variable are never played within the same time-slot sample.

The process of random assignment is repeated with the constraint that only control content is assigned to the same time-slot sample as any piece of experimental content. This ensures that there are no location confounds. It is noted that it is valid to assign experimental content for one hypothesis to a time-slot sample that already contains experimental content for another hypothesis, provided that the content can serve as a control for the experimental content for the other hypothesis. That is, one can run two experiments at once provided that the hypotheses are orthogonal.

The algorithm of FIG. 6E may further involve blocking by optimization factors 87. This allows for factorial analyses to measure interactions between content and optimization factors. The algorithm shown in FIG. 6E may also involve blocking by noise factors 88 in order to increase statistical power. These processes preferably continue to assign content to time-slot samples until main effect and interaction effect sample size requirements are satisfied and the design is balanced. The algorithm may further provide for counterbalancing 89 for order effects. Within each time-slot sample, the order in which individual pieces of content are displayed is counterbalanced using known techniques (e.g., Latin Squaring).

Figure 6F:
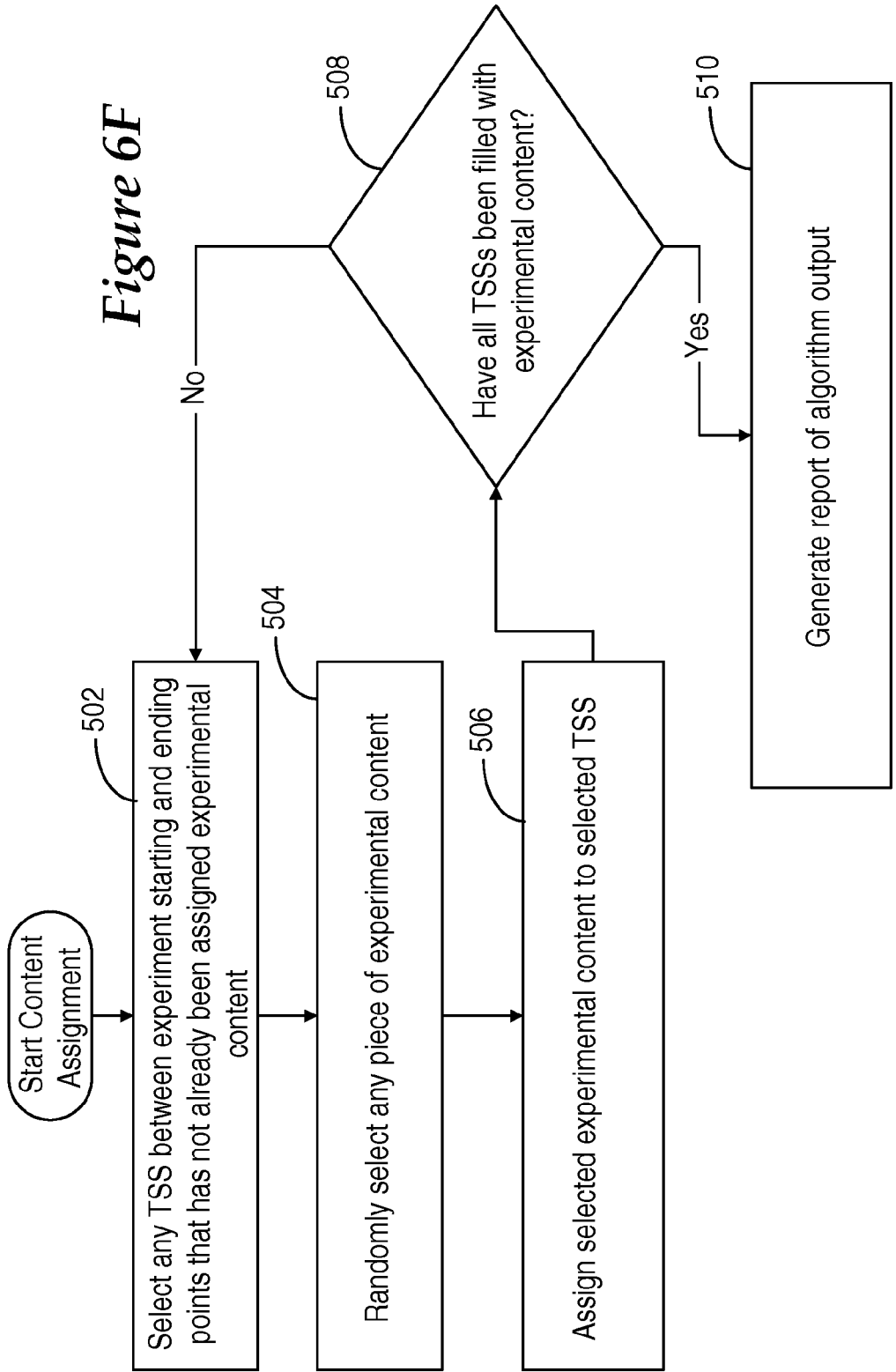
FIG. 6F illustrates processes of an algorithm that assigns content to time-slot samples for testing the relative effectiveness of the content in accordance with embodiments of the present invention.

FIG. 6F illustrates processes of an algorithm that assigns content to time-slot samples for testing the relative effectiveness of the content in accordance with embodiments of the present invention. The algorithm shown in FIG. 6F involves selecting 502 any time-slot sample between the experiment's staring and ending points that has not already been assigned experimental content. The algorithm further involves randomly selecting 504 any piece of experimental content and assigning 506 the selected experimental content to play during the entire duration of the selected TSS.

The processes shown in blocks 502, 504, and 506 are repeated 508 until all time-slot samples are filled with experimental content. A report of the algorithm's output may be generated 510. The report may contain various information, such as that previously described with reference to FIG. 5. It is noted that if the time-slot samples are tagged with attributes, this will allow for hypotheses to be generated based on any interactions that are found between the content assigned to time-slot samples and the attributes of the time-slot samples and enable exploratory data analysis.

Figure 6G:
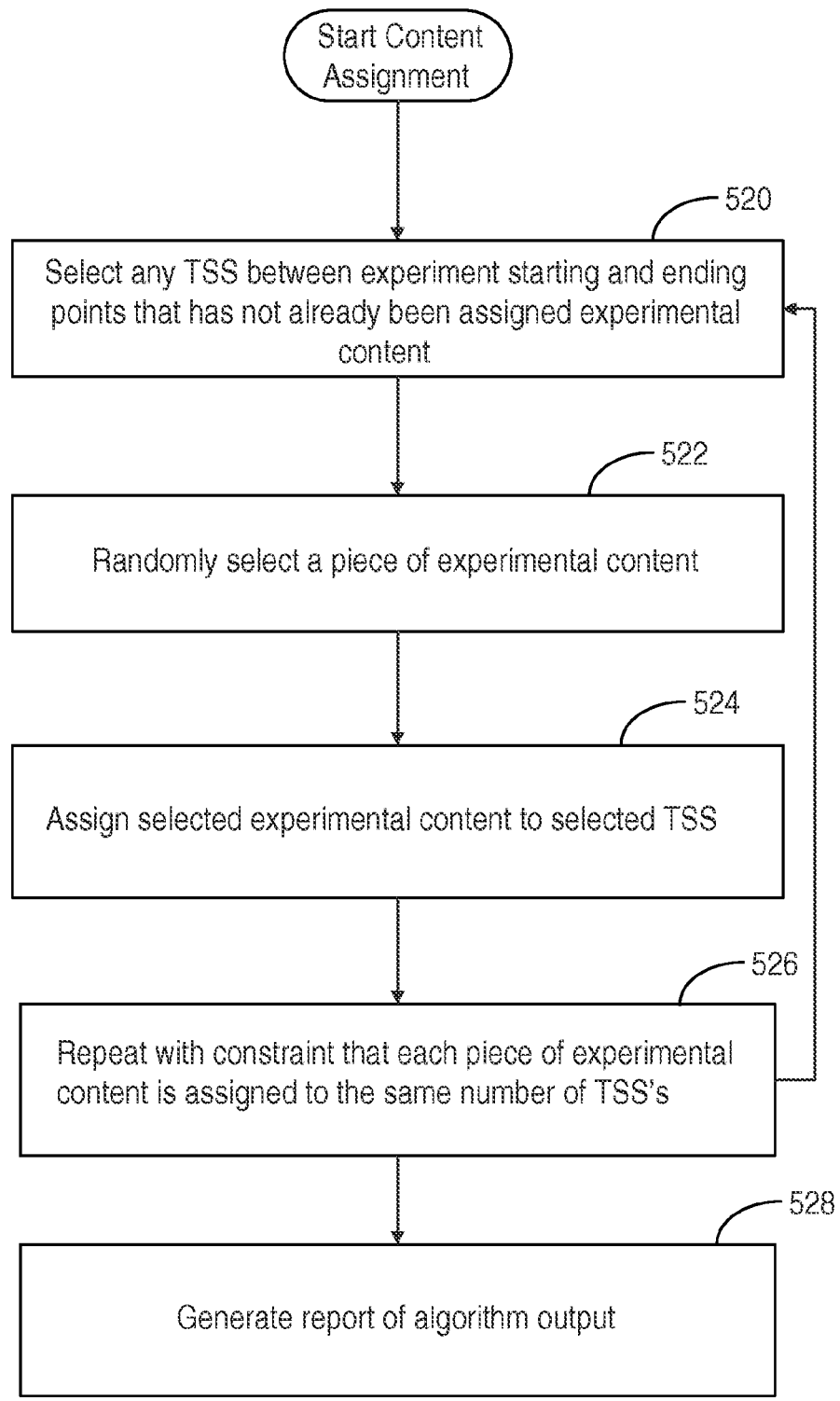
FIG. 6G illustrates processes of an algorithm that assigns content to time-slot samples using a constrained randomization process in accordance with embodiments of the present invention, such that each piece of experimental content is assigned to the same number of time-slot samples.

Under many experimental circumstances, it is desirable to have each level of the independent variable (or variables) assigned to the same number of samples. FIG. 6G illustrates processes of an algorithm that assigns content to time-slot samples using a constrained randomization process in accordance with embodiments of the present invention such that each piece of experimental content is assigned to the same number of time-slot samples. The algorithm shown in FIG. 6G involves selecting 520 any time-slot sample between the experiment's staring and ending points that has not already been assigned experimental content. The algorithm further involves randomly selecting 522 any piece of experimental content and assigning 524 the selected experimental content to the selected TSS.

The processes shown in blocks 520, 522, and 524 are repeated 526 with the constraint that each piece of experimental content is assigned 526 to the same number of time-share samples. A report of the algorithm's output may be generated 528, as discussed previously.

Figure 6H:
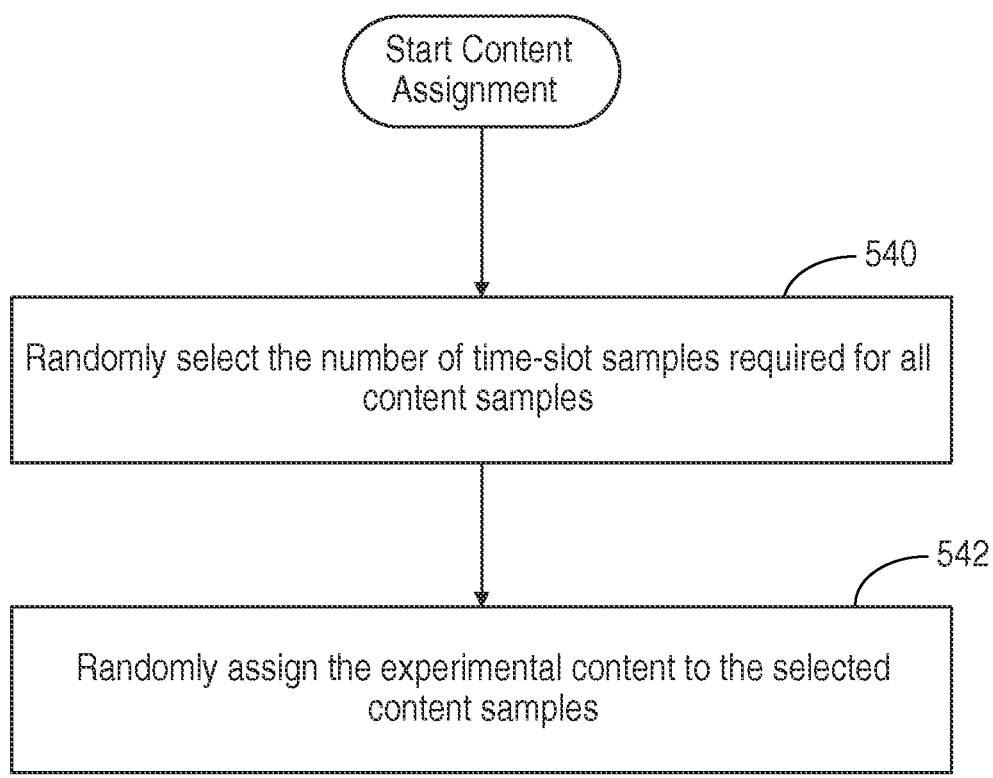
FIG. 6H illustrates processes of an algorithm that takes as input sample size requirements and assigns content to time-slot samples using a constrained randomization process in accordance with embodiments of the present invention to ensure sample size requirements are met.

Under some experimental circumstances, the experiment might have been designed manually or using off-the-shelf statistical software, or using, for example, an expert system as described hereinbelow, in which case the sample size requirements for various experimental and control content would have been specified. FIG. 6H illustrates processes of an algorithm that takes as input such sample size requirements and assigns content to time-slot samples using a constrained randomization process in accordance with embodiments of the present invention to ensure sample size requirements are met. The algorithm shown in FIG. 6H involves randomly selecting 540 the number of time-slot samples required for all content samples. The algorithm further involves randomly assigning 542 experimental content to the selected content samples. It is noted that the remaining time-slot samples that were not required because sample size requirements have been met may be filled with content that is optimized for business results, rather than for testing any hypothesis.

Figure 6I:
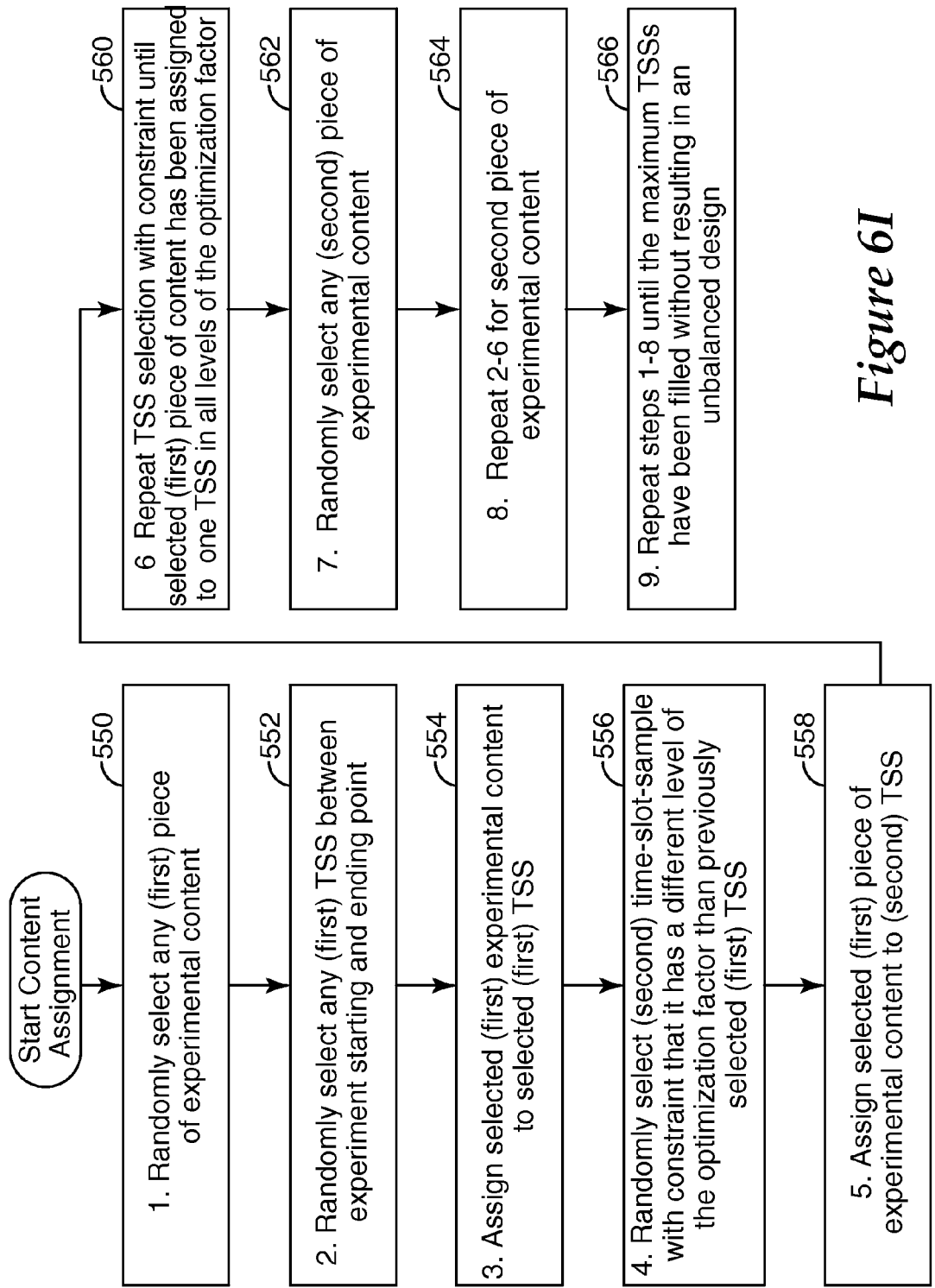
FIG. 6I illustrates processes of an algorithm that assigns content to time-slot samples using a complete randomization process but with the addition of optimization factor constraints in accordance with embodiments of the present invention.

FIG. 6I illustrates processes of an algorithm that assigns content to time-slot samples using a complete randomization process but with the addition of optimization factor constraints in accordance with embodiments of the present invention. The optimization factor constraint can be added to the equal sample size or to the predetermined sample-size processes in an analogous fashion. It is noted that each content sample would preferably have metadata identifying the optimization factors with which it is associated, and the time-slot samples would also have metadata identifying which optimization factors are associated with the time-slot sample.

The algorithm shown in FIG. 6I involves randomly selecting 550 any (first) piece of experimental content, and randomly selecting 552 any (first) time-slot sample between experiment starting and ending points. The randomly selected (first) piece of experimental content is assigned 554 to the selected (first) time-slot sample.

The algorithm of FIG. 6I involves randomly selecting 556 another (second) time-slot sample with the constraint that it has a different level of optimization factor than a previously selected (first) time-slot sample. The selected (first) piece of experimental content is assigned 558 to this (second) selected time-slot sample. The above-described TSS selection processes are repeated 560 until the selected (first) piece of content has been assigned to one TSS in all levels of the optimization factor.

The algorithm of FIG. 6I further involves randomly selecting 562 any (second) piece of experimental content, and repeating 564 processes 552-560 for this next (second) piece of experimental content. The processes of blocks 550-564 are repeated 566 until the maximum number of time-slot samples have been filled without resulting in an unbalanced design (i.e., until there are fewer time-slot samples than the number of optimization factors multiplied by the number of pieces of experimental content.

Figure 6J:
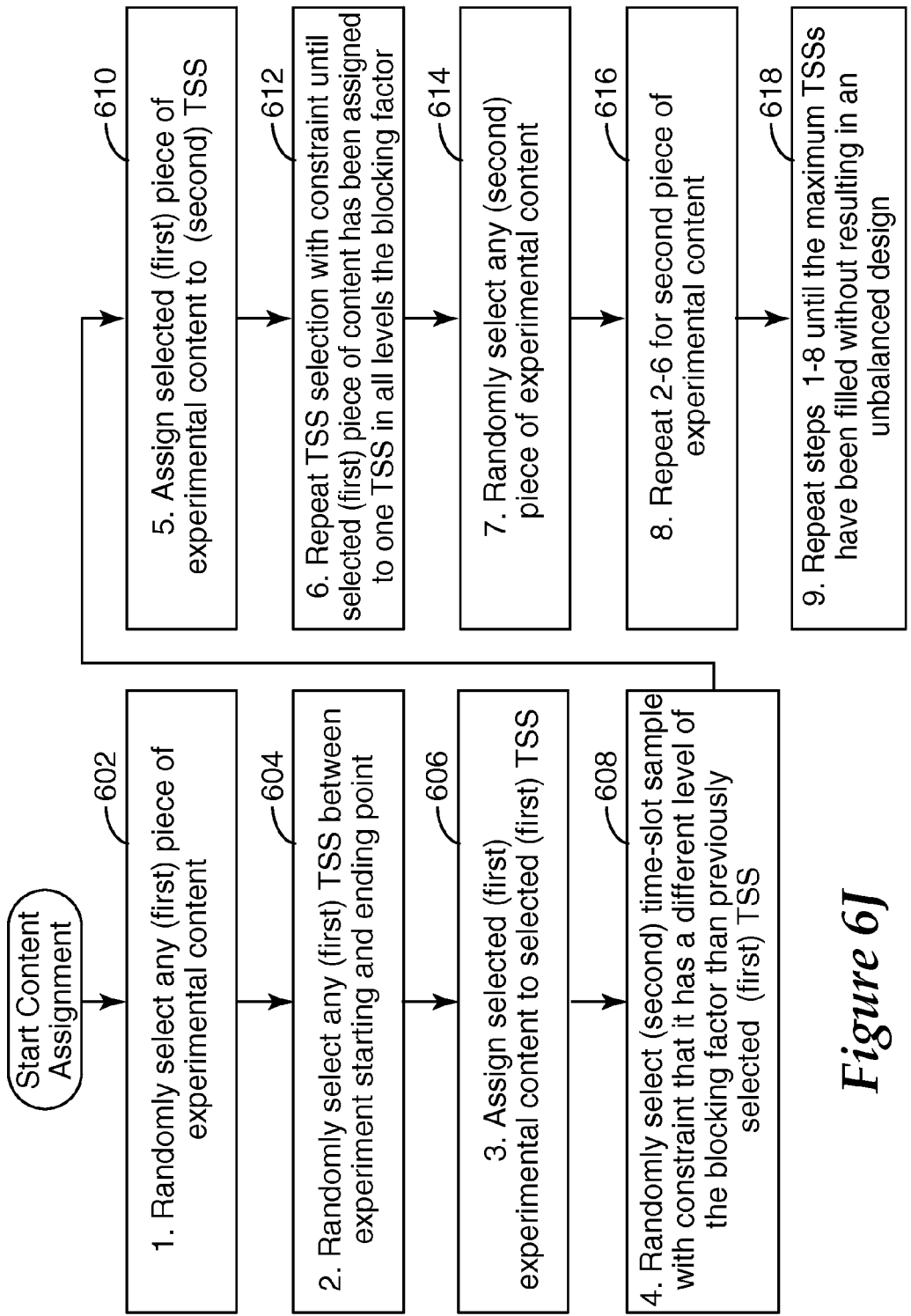
FIG. 6J illustrates processes of an algorithm that assigns content to time-slot samples using a complete randomization process but with the addition of blocking factor constraints in accordance with embodiments of the present invention.

FIG. 6J illustrates processes of an algorithm that assigns content to time-slot samples using a complete randomization process but with the addition of blocking factor constraints in accordance with embodiments of the present invention. The blocking factor constraint can be added to the equal sample size or to the predetermined sample-size processes in an analogous fashion. It is noted that each content sample would preferably have metadata identifying the blocking factors with which it is associated, and the time-slot samples would also have metadata identifying which blocking factors are associated with the time-slot sample.

The algorithm shown in FIG. 6J involves randomly selecting 602 any (first) piece of experimental content, and randomly selecting 604 any (first) time-slot sample between experiment starting and ending points. The randomly selected (first) piece of experimental content is assigned 606 to the selected (first) time-slot sample.

The algorithm of FIG. 6J involves randomly selecting 608 another (second) time-slot sample with the constraint that it has a different level of blocking factor than a previously selected (first) time-slot sample. The selected (first) piece of experimental content is assigned 610 to this (second) selected time-slot sample. The above-described TSS selection processes are repeated 612 until the selected (first) piece of content has been assigned to one TSS in all levels of the blocking factor.

The algorithm of FIG. 6J further involves randomly selecting 614 any (second) piece of experimental content, and repeating 616 processes 604-612 for this next (second) piece of experimental content. The processes of blocks 602-616 are repeated 618 until the maximum number of time-slot samples have been filled without resulting in an unbalanced design (i.e., until there are fewer time-slot samples than the number of blocking factors multiplied by the number of pieces of experimental content).

FIG. 7A illustrates processes of an algorithm that assigns content to time-slot samples in accordance with embodiments of the present invention. The embodiment shown in FIG. 7A is directed to algorithm that assigns content to time-slot samples where the individual pieces of content are shorter than the time-slot samples. The algorithm of FIG. 7A ensures that there are no content confounds and allows the same time-slot samples to be used to test multiple hypotheses (i.e., allows unrelated independent variables to be tested within the same time-slot samples). This is analogous to being able to test multiple drugs on the same patients, which saves time and money. For example, in a drug testing scenario, one can test a topical analgesic cream on the same patient who is being used to test a halitosis cure. That is, the topical analgesic cream should not impact halitosis and the halitosis cure should not impact a skin condition. However, one would not want to test a treatment for halitosis on the same patients who are being used for testing a new toothpaste, for example.

The algorithm shown in FIG. 7A involves randomly selecting 640 any open time-slot sample between experiment starting and ending points. A piece of experimental content is randomly selected 642, and the selected piece of experimental content is assigned 644 to the selected TSS. The algorithm of FIG. 7A further involves randomly selecting 646 a piece of experimental content with the constrain that it is unrelated to content already assigned to the TSS. The selected piece of experimental content is assigned 648 to the selected TSS. The processes of blocks 646 and 648 are repeated until it is not possible to add a piece of experimental content without having the sum of the durations of all of the selected experimental content exceed the duration of the TSS or until there are no unrelated experimental content pieces remaining, whichever comes first.

If any open time remains in the selected TSS, the remaining open time of the TSS is filled 652 with absolute placebo content. The algorithm of FIG. 7A also involves randomly ordering 654 the content within the TSS. If the TSS contains any absolute placebo content, randomization ensues such that equal durations of the placebo content separate the experimental content pieces.

Another open TSS is randomly selected 656 between the experiment starting and ending points. A piece of experimental content that has not been assigned to a previously filled TSS is randomly selected 658. If all pieces of content have been assigned, absolute placebo content is selected. If absolute placebo content was selected in block 658, the selected TSS is filled 660 with absolute placebo content, otherwise the selected piece of experimental content is assigned to the selected TSS, and this TSS is filled in accordance with the processes of blocks 646-654. Open TSSs continue to be filled according to the processes of blocks 640-660 until all pieces of experimental content have been assigned to a TSS.

Figure 7B:
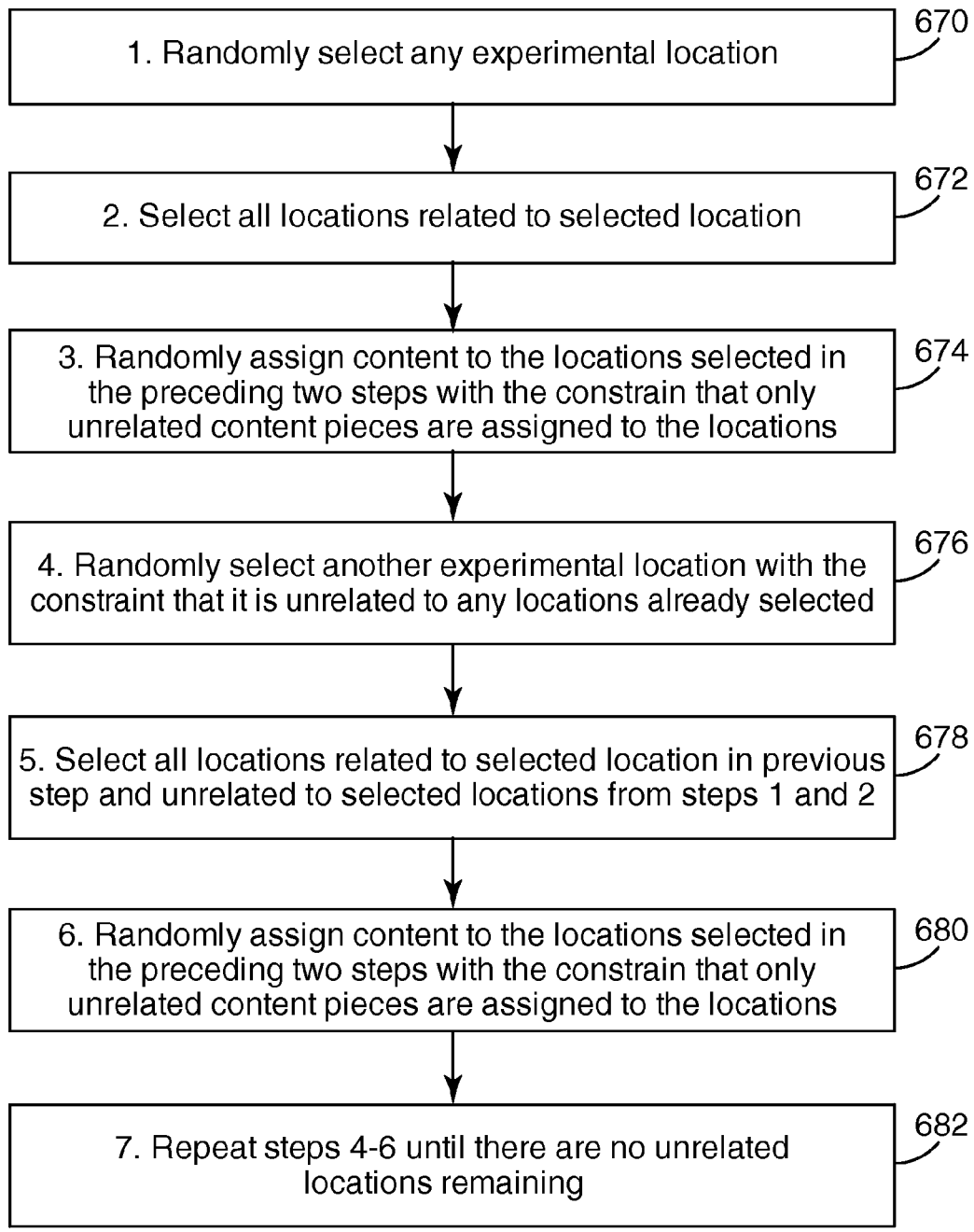
FIG. 7B illustrates processes of an algorithm that assigns content to time-slot samples in accordance with embodiments of the present invention, the algorithm ensuring that there are no location confounds during a duration of interest.

FIG. 7B illustrates processes of an algorithm that assigns content to time-slot samples in accordance with embodiments of the present invention. The embodiment shown in FIG. 7B is directed to algorithm that ensures that there are no location confounds during the duration of interest, after which the content is viewed not to be of interest if the content caused a change in the behavioral or transactional data being measured. That is, the algorithm of FIG. 7B ensures that a viewer could not be exposed to one level of an independent variable and act on it at a different location that is testing a different level of the independent variable during the duration of interest.

A potential drawback of using all experimental locations in such a way as to eliminate all location confounds is that any location that is used in this fashion is not able to be exposed to multiple levels of the same independent variable. As such, it would be difficult to measure how combinations of different levels of an independent variable would interact with one another within the same location. It may be desirable, under some circumstances, to first select a pre-determined number of locations to be assigned experimental content for complete within-location testing effects and then run this algorithm to use the remaining locations for testing without between-location confounds. That is, for example, one could use FIG. 6H to meet a pre-determined sample size for within-location factors, and then use FIG. 7B to measure the effects of content across locations.

The algorithm shown in FIG. 7B involves randomly selecting 670 any experimental location, and selecting 672 all locations related to the selected location. Content is randomly assigned 674 to the locations selected in the preceding two blocks 670, 672 with the constraint that only unrelated content pieces are assigned to the locations. Another experimental location is randomly selected 676 with the constraint that it is unrelated to any locations already selected. All locations related to the location selected in the previous block, 676, and unrelated to selected locations for blocks 670 and 672 are selected 678. Content is randomly assigned 680 to the locations selected in the preceding two blocks 676, 678 with the constraint that only unrelated content pieces are assigned to these locations. The processes of blocks 676-680 are repeated until there are no unrelated locations remaining.

EXAMPLE #1

The following example illustrates a method for assessing effectiveness of communication content implemented in accordance with the present invention. In this illustrative example, it is the objective of a major automaker to increase sales of parts and labor within its service departments. The automaker's marketing team is in agreement that a valuable "upselling" strategy to achieve these goals is to increase sales of auto inspections among customers that have scheduled appointments. However, the team members' opinions differ regarding what marketing communication messages will be most effective overall, and among various customer sub-segments.

Regarding customer sub-segments, the team knows that specific segments visit their service departments at distinctly different times each day, also referred to as dayparts. For example, professional males visit during early morning hours, and so called stay-at-home moms, visit more often mid-morning through mid-afternoon.

The team speculates as to which strategic and which execution combination might be more effective with the two audiences. Historically, these opinions are formed over the years by experience, intuition, and occasionally correlational studies, but the arguments remain subjective.

The team's first disagreement is over which message, at a strategic communication level, is likely to be more effective overall; messages about enhancing safety (avoiding breakdowns), or messages about saving money. For example, there is disagreement over whether a message showing a car and its owner stranded on the roadside will work as well or better than a message showing a car owner driving by that stranded motorist because they were smart and performed the preventative maintenance.

The team's next disagreement is at an executional, or tactical, level; for example, might a female or a male actor shown in either message be more compelling among the various customer sub-segments. Finally, there are 800 dealerships, and each want to "localize" their advertising messages to some degree, which might be expressed by offering a locally-determined price or a discount at a nearby community shop for purchasing the inspection.

Applying methodologies in accordance with the present invention involve identifying and classifying the following variables: dependent variable is sales in dollars (parts and labor) per unit of time. Independent variables include: message strategy: enhancing safety or saving money; message execution: female or male actors; distribution daypart: early morning or mid-morning through mid-afternoon; and local offer customization: number of dealerships (i.e., 800 in this example). It is noted that an experiment that investigates all of these factors would have 9,600 conditions (2×2×2×800), presenting an insurmountable challenge for manual execution, but a trivial challenge for an automated approach of the present invention.

Network setup and storing of initial data involves the following tasks: (1) Each participating dealership identifies any other dealerships that customers might visit after leaving their dealership, even a small chance. These data are input into the system to control for carryover effects between locations; (2) Dealership size is identified as an optimization factor for further blocking; (3) Sample size requirements are calculated; (4) Control and experimental content is defined. For example, the control content (i.e., the placebo) in this example is the local weather. The experimental content is: a) a female saving money; b) a male saving money; c) a female shown stranded on the side of the road; d) a male shown stranded by the side of the road; and (5) Viewer Visit Duration: it is determined that approximately 95% of consumers visit the service department for 1 hour or less.

Experimental design and execution processes involve the following operations. First, a schedule is parsed into time-slot samples. Since sales data are time-stamped by the minute, the schedules at all of the dealerships are parsed into 2 hour time-slot samples. Second, an experimental design playlist is created. The experimental content (i.e., the four versions of content a-d above) and the control content (i.e., local weather) are randomly assigned to time-slot samples such that the content distribution pattern (i.e., timing and location at which content is played) meets the constraints of the experiment. That is, the experimental and control content are randomly assigned to slots with specific constraints that ensure blocking daypart and locations.

Third, content is distributed according to playlist. The content is distributed across the network of displays to participating dealership service departments as specified by the previous step. Fourth, dependent variable measures are parsed by experimental condition. Time and location stamped dependent variable data (e.g., POS sales data) are provided to the system, which automatically parses the data according to the experimental conditions for analysis.

An evaluation of the effectiveness of the communication content is facilitated by a review of collected data. The results of this experiment are as follows: By the morning of the first day of the experiment, the automotive company has found a statistically reliable result that inspection requests increase by 25% when the versions of experimental content are played relative to when the control (i.e., weather) content is played. By the end of the first day, there is a statistically significant main effect whereby female actors are more effective during the morning daypart, but male actors are more effective during the mid-day daypart. The strategy of saving money versus avoiding a breakdown is not reliable, but there appears to be interactions by dealership whereby some dealerships show better results with saving money and others with avoiding a breakdown. The experiment continues for another week, and statistically reliable results at individual dealerships are being discovered. These dealerships then only play the combinations of content factors, by daypart, that are maximally effective at their dealerships.

EXAMPLE #2

Using the methodologies disclosed herein, a "real-world" experiment was conducted to measure the effects of digital signage content on customer behavior in a hotel. The experiment measured the impact of digital signage content on increasing room upgrades at one hotel property. Specifically, this was intended to increase the number of guests who, at check-in, change their reservations from a standard room to a premium room. Three different pieces of experimental content (each 20 seconds in duration) were created to increase room-upgrades (one that showed imagery of a larger room, another that showed imagery of extra amenities in the room, and another emphasizing that the viewer deserves extra indulgence and reward). The high-level method steps are shown in FIG. 5, which this Example follows.

1. Parse Open Presentation Times into Time-slot Samples:

Time-slot samples were created using the methods shown in FIG. 6D, using viewer visit durations (VVDs) that customers spend checking in and time intervals (TIs) for data collection. The hotel staff knows that greater than 95% of guests are checked in within 5 minutes of entering the hotel lobby. As such, VVD=5 min.

TIs were determined by examining the hotel point-of-sale (POS) logs. The POS system creates time-stamps down to the second, but the accuracy of server clocks on the POS system drift during the day. To compensate for this lack of accuracy in real-time time-stamping, it was determined that if TI was set at 25 min, POS transactions would be bucketed to an accuracy greater than 99% of the time. As such, TI=25 min. Had the server clocks been accurate to the second, TI would have been much shorter, e.g., as small as 1 second.

To determine TSSD and TSS, the algorithm shown in FIG. 6D was used, which takes as input VVD and TI. Since TI (25 min) is ≥VVD (5 min), per Formula [1] above, TSSD=TI+VVD, therefore, TSSD=30 min.

Continuing with the algorithm shown in FIG. 6D, time-slot samples were created for the experiment. In this example, historical data relating to room upgrades from the POS logs were used to conduct a statistical power analysis to estimate the number of 30 min time-slot samples that were needed to find a statistically reliable effect of displaying room-upgrade content vs. control content, with alpha set at 0.05 and beta set at 0.8, and an effect size of at least 20%. It was determined that a minimum of approximately 700 time-slot samples would be needed. Since 18 days were provided for the experiment, it was determined that 864 time-slot samples would be used. The experiment was designed to begin on Day 1 at midnight. As such, to achieve the goal of 864 time-slot samples, the experiment was designed to end on midnight on Day 18.

Individual time-slot samples were created. Since the hotel lobby never closes, the first TI that is TSSD from opening time is 12:30 am on Day 1. As such, the beginning of the first time-slot sample was midnight on Day 1. The next TI that is one TSSD away from the end of the previous TSSD is 1:00 am on Day 1. Accordingly, the next time-slot sample was assigned to begin at 12:30 (one TSSD from the end of the previous TSS). This process continued until the end of the scheduled experiment, midnight on Day 18. Table 1 below shows the first 12 time-slot samples for the experiment starting at midnight on Day 1.

TABLE 1

| Time Slot Sample | Time Slot Sample beginning time | Time Slot Sample ending time |
| --- | --- | --- |
| Time-slot sample 1 | 0:00:00 | 0:30:00 |
| Time-slot sample 2 | 0:30:00 | 1:00:00 |
| Time-slot sample 3 | 1:00:00 | 1:30:00 |
| Time-slot sample 4 | 1:30:00 | 2:00:00 |
| Time-slot sample 5 | 2:00:00 | 2:30:00 |
| Time-slot sample 6 | 2:30:00 | 3:00:00 |
| Time-slot sample 7 | 3:00:00 | 3:30:00 |
| Time-slot sample 8 | 3:30:00 | 4:00:00 |
| Time-slot sample 9 | 4:00:00 | 4:30:00 |
| Time-slot sample 10 | 4:30:00 | 5:00:00 |
| Time-slot sample 11 | 5:00:00 | 5:30:00 |
| Time-slot sample 12 | 5:30:00 | 6:00:00 |

2. Create Playlist (Randomize, with Constraints, Experimental & Control Content to Time-slot Samples):

The next step in the process was to fill the 30 minute time-slot samples with individual 20 second units of experimental and control content within the constraints selected for the experiment. The control content had no relationship to room upgrades, for example content relating to on-site facilities or leisure activities. Constraints shown on the right side of FIG. 5 are selected as appropriate for the situation. In this illustrative example, the following constraints were selected:

1. Ensure experimental and control content is not confounded: For any given time-slot sample, only one version of experimental content could be assigned to the time-slot sample.

2. Blocked by noise factors: Time-slot samples were blocked such that for any 4 hour period, there were an equal number time-slot samples having experimental content and having only control content and there were an equal number of time-slot samples having each version of experimental content.

3. Randomized across uncontrolled factors: The order of time-slot samples was randomized within a block, with the constraint that there were never two sequential time-slot samples testing the same experimental condition. Furthermore, the order of content within a time-slot was randomized.

4. Balanced experiment: Across the entire experiment (i.e., from Day 1 to Day 18), an equal number of time-slot samples were filled with control content and experimental content. Also, there were an equal number of time-slot samples showing each version of experimental content.

The constraint relating to "blocked by optimization factors" was not used because there were no optimization factors being tested. The constraint to "counterbalanced for order effects" was not used because the effects of order on the outcome were not being tested. The constraint of "meet estimated sample size requirements" was already addressed in the above description of experimental duration.

Table 2 below shows two exemplary blocks of time-slot samples that meet the constraints discussed above.

TABLE 2

| Block | Time-slot start | Time-slot end | Experimental Condition |
|---|---|---|---|
| Block 1 | 13:30:00 | 14:00:00 | Upgrade.0 |
|  | 14:00:00 | 14:30:00 | Upgrade.2 |
|  | 14:30:00 | 15:00:00 | Upgrade.0 |
|  | 15:00:00 | 15:30:00 | Upgrade.3 |
|  | 15:30:00 | 16:00:00 | Upgrade.1 |
|  | 16:00:00 | 16:30:00 | Upgrade.0 |
| Block 2 | 16:30:00 | 17:00:00 | Upgrade.0 |
|  | 17:00:00 | 17:30:00 | Upgrade.3 |
|  | 17:30:00 | 18:00:00 | Upgrade.0 |
|  | 18:00:00 | 18:30:00 | Upgrade.2 |
|  | 18:30:00 | 19:00:00 | Upgrade.0 |
|  | 19:00:00 | 19:30:00 | Upgrade.1 |

3. Distribute Content According to Playlist Schedule:

The content was shown on a digital display using 3M™ Digital Signage Software-Network Edition located near the front desk in the hotel lobby.

4. Generate Report of Algorithm Output

A report was generated in the form of a data file having beginning and ending times for the time-slot samples and experimental conditions (i.e., content) corresponding with those time-slot samples.

5. Parse Dependent Variable Measures by Experimental Condition

Time-stamped point of sale data (i.e., dependent variable measures) for room-upgrades were automatically collected by the hotel POS system during the experiment. In that system, transactions relating to room upgrades are time-stamped and clearly labeled. The POS data were parsed and associated with their corresponding time-slot samples and content. Table 3 below illustrates an example of how the data were parsed and associated with individual time-slot samples for analysis.

TABLE 3

| Block | Time-slot start | Time-slot end | Experimental Condition | Number of room-upgrades |
|---|---|---|---|---|
| Block 1 | 13:30:00 | 14:00:00 | Upgrade.0 | 0 |
|  | 14:00:00 | 14:30:00 | Upgrade.2 | 2 |
|  | 14:30:00 | 15:00:00 | Upgrade.0 | 1 |
|  | 15:00:00 | 15:30:00 | Upgrade.3 | 1 |
|  | 15:30:00 | 16:00:00 | Upgrade.1 | 1 |
|  | 16:00:00 | 16:30:00 | Upgrade.0 | 0 |
| Block 2 | 16:30:00 | 17:00:00 | Upgrade.0 | 0 |
|  | 17:00:00 | 17:30:00 | Upgrade.3 | 1 |
|  | 17:30:00 | 18:00:00 | Upgrade.0 | 2 |
|  | 18:00:00 | 18:30:00 | Upgrade.2 | 3 |
|  | 18:30:00 | 19:00:00 | Upgrade.0 | 0 |
|  | 19:00:00 | 19:30:00 | Upgrade.1 | 0 |

The data were then subjected to a repeated measures ANOVA, which found a statistically reliable main effect whereby the mean number of upgrades was greater during the time-slot samples in which upgrade content was presented than in the time-slot samples in which there was no upgrade content presented (e.g., results of the experiment made it statistically evident that content "A" was more effective at achieving the desired business goal than content "B" (with a confidence level of alpha <0.05)).

Those skilled in the art will appreciate the difficulty of generating any reliable conclusions from the above-described "real-world" experiment if the method of dividing time into time-slot samples based on viewer visit duration and time intervals for data collection is not used. For example, Table 4 below shows content that has been scheduled randomly (e.g., as in the case of known quasi experiments and correlational studies). Note that it is almost impossible to know which piece of content, if any, to associate with the upgrade.

TABLE 4

| Content Changes | Content | Time-stamped upgrade |
|---|---|---|
| 13:30:00 | leisure activity 3 |  |
| 13:30:20 | Upgrade.0 |  |
| 13:30:40 | Upgrade.0 |  |
| 13:31:00 | leisure activity 2 |  |
| 13:31:20 | Upgrade.0 |  |
| 13:31:40 | leisure activity 3 |  |
| 13:32:00 | leisure activity 2 |  |
| 13:32:20 | Upgrade.0 |  |
| 13:32:40 | leisure activity 2 |  |
| 13:33:00 | Upgrade.1 |  |
| 13:33:20 | Upgrade.2 | 13:33:31 |
| 13:33:40 | Upgrade.0 |  |
| 13:34:00 | leisure activity 1 |  |
| 13:34:20 | leisure activity 1 |  |
| 13:34:40 | Upgrade.0 |  |
| 13:35:00 | Upgrade.3 |  |
| 13:36:20 | leisure activity 3 |  |
| 13:36:40 | Upgrade.1 |  |
| 13:36:00 | Upgrade.3 |  |
| 13:36:20 | leisure activity 1 | 13:36:22 |
| 13:36:40 | leisure activity 1 |  |
| 13:37:00 | leisure activity 2 |  |
| 13:37:20 | Upgrade.2 |  |
| 13:37:40 | leisure activity 3 |  |

A guest could have seen any of the versions of upgrade content, as they were all shown within seconds of when the upgrade occurred, or the guest might not have seen any of the versions of content (i.e., they might not have even looked at the sign). Furthermore, since the POS time drifts, there is a low level of confidence that the upgrade actually occurred on or close to the times indicated by the POS system, which is not the time recorded by the digital signage system due to asynchronicity between system clock times as discussed above. Given massive amounts of data, it might be possible to use complex analytic techniques (such as Principal Component Analysis) to uncover a systematic pattern. However, those skilled in the art understand that such an approach might take years, if possible at all.

It is precisely the issue of "time to complete the experiment" discussed above that leads researchers to use one of the following methodologies, each of which is either very time consuming, costly, or has very low internal or external validity.

a. Customer intercepts: Customers are simply asked whether they did or did not get upgrades, whether they saw upgrade content, and whether the content impacted their behavior. Customer intercepts are labor intensive, and thus expensive. Furthermore, a large amount of research indicates the data acquired using customer intercepts are not reliable (low internal and external validity).

b. Only attempt the research using massive digital signage networks. A documented experiment conducted using known quasi experimental techniques for 740 location, for example, took 2 months to complete.

c. Use a matched control methodology, whereby different hotels are assigned to show different versions of upgrade content at different locations. This approach is problematic because it requires a large number of locations, takes a substantial amount of time, and cannot be used to optimize for a specific location.

The examples provided hereinabove illustrate the power of an automated, computer-assisted method of distributing communication content and assessing effectiveness of communication content in a manner consistent with constraints of a true experiment. Those skilled in the art will appreciate that the above-described illustrative examples represent a subset of many possible scenarios that can benefit from systems and processes implemented in accordance with the present invention. The experimental design processes described herein may be modified to accommodate a wide variety of applications and system deployments.

Further, additional features may be included to enhance experimental design processes of the present invention. For example, experiments may be changed during the course of data collection based on continuous or incremental monitoring of data. For example, a designed experiment may be implemented to test five compounds to reduce blood pressure in a sample of 600 test subjects. As data are generated, it may sometimes be advantageous to reallocate samples to conditions based upon factors such as effect sizes, updated statistical power analyses conducted on the experimental data, the costs associated with data collection or other factors.

Methods for adjusting experiments based on these and other factors are well-characterized and known to those skilled in the art (see, e.g., Power & Money: *Designing Statistically Powerful Studies While Minimizing Financial Costs*, D. Allison and R. Allison, Physiological Methods, 1997, Vol. 2, No. 1, 20-33). Such adjustments to live experiments provides a significant opportunity for increasing efficiency, allowing one to arrive at conclusions more quickly. And, since conclusions are typically related to business results, there exists an opportunity cost of not reallocating.

When experimental data are collected and show that a specific content piece, or a like-grouping of content pieces, perform well and other pieces or groupings do not perform well, there is an opportunity to "promote" the strong performers and "demote" the weak performers. Demoting may involve eliminating the weak performers from further experimentation, which frees up the time-slot samples in which they resided to either a) increase instantiations of the existing strong test content, b) insert newly developed versions of the test content based on the interim results to explore nuanced elements of those messages, or c) to simply insert non-test content with the objective of increasing sales, satisfaction, etc.

Typically, samples are identified and it is determined which samples will receive specific levels of the independent variable long before the experiment commences. For example, in a hotel, one may wish to test the relative effectiveness of two content versions during the weekday morning daypart. Typically, it would be determined prior to the beginning of the experiment which blocks of time within the daypart will receive the different versions of content.

However, some experimental questions cannot be addressed because the experimenter cannot predict when a sample condition will manifest itself. For example, one may wish to understand which of two messages promoting hotel room upgrades is more effective within specific outdoor temperature bands, yet one cannot predict when the temperatures will fall within those bands. In this case, it would be predetermined that content version A will play when the temperature reaches the agreed band the first time, and content version B will be randomly assigned to play the second time the temperature reaches the agreed band.

Additionally, such a "trigger" will initiate the new time-slot sample. The duration of the new time-slot sample would be calculated by adding any time remaining in the current TI to the duration of the time-slot sample as it would have been calculated in FIG. 6C.

Another example of a "trigger event" initiating the sample time-slot samples might occur in a Do-It-Yourself store at which power tools are commonly on display for consumers to interact with as they consider which tool they will purchase. In this instance, the time-slot sample could be initiated when the consumer picks up a drill, for example, which would be captured by a motion sensor. The sensor event would trigger Content A to play and be randomly assigned with this newly started time-slot sample, and dependent variable data, e.g., POS data, would be collected corresponding to the new time-slot sample. When the time-slot sample concludes, Content B would be randomly assigned and corresponding POS data would be collected. This alternate sequence would repeat through the end of the business day.

Although experiments are typically conducted such that allocation of samples to conditions is determined before the opportunity to assign the sample to the condition, another feedback opportunity exists related to results associated with unanticipated conditions, which reveal strong or weak performance and suggest new hypotheses for exploration. An example might be when specific content developed to promote upgraded rooms within a hotel performs well when the outside temperature exceeds 95 degrees. The 95+ degree condition was not anticipated, and therefore was not specifically addressed within the original experimental design. Yet, once these data are produced, the system could modify its content allocation method to accommodate this newly determined important independent variable.

Content relatedness is also a challenge using conventional methods, and is addressed by systems and methods of the present invention. Marketers may hypothesize that consumers interested in their automobiles might respond to messages about the automobile's performance as well as messages about the automobile's safety features. In accordance embodiments of the present invention, an experiment may be designed that tests the content message "families" of performance and safety independently, but also in relationship to one another. Examples of content could include independent content pieces about each that are 15 seconds in length, a new combined 30 second message that simply adds the two 15 second messages, or any number of "hybrid" messages that emphasize one component over the other, vary the order of the components, etc.

Systems and methods described herein would treat these "families" of messages as a single piece of content, tagging each of the many versions to ensure that, as it determines time-slot samples, constrained randomization requirements, etc. to ensure that every content version is played the appropriate number of times, in the appropriate order, etc. so that results data can be attributed entirely to the content. In contrast, conventional approaches would require analysis of vast amounts of data after-the-fact and assign "weights" to each potential factor that could have influenced results, yet in the end, other variables that were not accounted for could have influenced the result.

Another aspect that a true experiment-based system of the present invention performs well relative to conventional approaches is the ability to allow the user to identify factors of importance, and reallocate experimental and control content assignment to time-slot samples to account for the individual factors, as well as combinations of factors of importance.

For example, a hotel's marketer may wish to understand how communication performs by daypart, by screen location, and by foot traffic level. A system of the present invention is able to allocate experimental and control content to ensure that the system plays messages an equal numbers of times within each factor of interest condition at the property, and in appropriate combinations of these factors of interest. This allows the marketer to understand which messages perform best, for example, in the early morning daypart, when the message is played in the lobby, and when there are many guests within the lobby. Once again, conventional methods would prevent the marketer from being able to attribute results solely to the content played individually or in combinations. Other unaccounted for factors may have influenced results.

FIGS. 8A-11B illustrate systems and processes for implementing an expert, computerized system for designing a true experiment or various sub-processes having constraints of a true experiment based on input from a user in accordance with embodiments of the present invention. The systems and processes illustrated in FIGS. 8A-11B may be implemented to design and implement true experiments or sub-processes having constraints of a true experiment that may be implemented to assess the effectiveness of digital signage communication content communication content or content delivered by other means, including those means discussed hereinabove. A computerized system of the present invention may also automatically or semi-automatically aid the user in performing one or more of steps involved with conducting true experiments, including collecting data, statistically analyzing the data, interpreting and reporting the results of the experiments. The user of the expert system need not have knowledge of the underlying theory of experimental design, of statistical/mathematical or algorithmic processes, or deep knowledge of the scientific method.

The expert system, through a series of questions presented to a user, elicits responses from the user that provide the information to design a true experiment or various sub-processes having constraints of a true experiment. In various embodiments, the experimental data could be input manually (into a system-generated form), or gathered semi-automatically or fully automatically. In some embodiments, the system will automatically manipulate the levels of the independent variables and assign samples to the levels of the independent variable, whereas in others, the system will provide the protocol for independent variable manipulation and sample assignment by the user. The user may be unsophisticated in the field of experimental design and does not need to know how to design, conduct, or analyze the results from a true experiment.

The expert system relieves the user of having specific knowledge of the field of experimental design and analysis other than the desire to test a hypothesis, for example. The user provides information to the expert system that allows the system to design the experiment for the user based on the user input. After designing the true experiment, the expert system may also aid in one or more steps in the process of conducting the true experiment, including collecting data, statistically analyzing the data, and interpreting the results of the experiment. In this configuration, the expert system may be capable of automatically conducting the experiment via controlling external systems, e.g., which electronic signs are showing specific content and by automatically parsing data from electronic sources, e.g., manually or automatically organizing sales data according to the experimental conditions.

Knowledge of various concepts integral to the experimental design need not be understood by the user. These concepts are presented to the user so that the terminology and mathematical units correspond to the knowledge base of the user. The expert system is capable of transforming abstract, domain general statistical concepts into semantically meaningful language and data in the domain that the user knows and understands. For example, the expert system could conduct a statistical power analysis in order to calculate sample size requirements for the experiment, but instead of simply reporting the output of the power analysis in terms of sample size (e.g., 680 samples), the system could report the results of the power analysis as the amount of time it would take to conduct the experiment given the specific sample size requirements (e.g., 8 business days). The expert system is capable of automatically transforming data from statistical outputs into business information and/or metrics with the goal of presenting the data in a way that the unsophisticated user can make there decisions, e.g., transforming Z scores into dollars or time, sample size requirements and/or carry-over effect elimination into time required to execute the experiment.

The terminology and mathematical units used by the system may correspond to selectable levels of user sophistication. For example, in one selectable configuration, the user can be relatively sophisticated regarding the concepts addressed by the expert system and these concepts may be expressed in terminology and mathematics corresponding to the user's level of knowledge. For example, in this configuration, the user would be asked questions such as "is this variable continuous or discrete?" In another selectable configuration, the user may be unfamiliar with the concepts addressed by the expert system. For the unsophisticated user, the expert system is capable of leading the user through a series of question to determine the information without using technical terminology that the user is unfamiliar with. In this configuration, the user is not required to have knowledge or understanding of how to use of the following examples of concepts that are addressed by the expert system:

Independent variable—The variable manipulated by the experimenter.

Dependent variable—The variable measured by the experimenter.

Confound—Any factor that could vary systematically with the level of the independent variable.

Randomization—The process of randomizing test sample selection and the sample assignment to levels of the independent variable.

Purpose of random selection: Random selection is critical to the external validity of the experiment. Due to the fact that the results of the experiment can only be generalized to the population from which samples are collected, random selection ensures that the results of the experiment can be generalized to the entire population from which the samples were collected rather than some sub-set of the population that is sampled from in a biased (i.e., non-random) fashion. For example, if all of the subjects in a blood-pressure drug experiment were males between the ages of 35 and 40 who were selected because they were easy to include in the experiment because they were already hospitalized for depression, we would not be able to generalize the results of the experiment to the rest of the population (e.g., women over the age of 65). Such an experiment would have lower external validity than an experiment that randomly selected from all people in the United States.

Purpose of random assignment: Random assignment is critical to the internal validity of the experiment. Random assignment guarantees that any effect that is found in the value of the dependent variable is not due to systematic variation in which samples were assigned to the levels of the independent variables. For example, a blood-pressure drug experiment in which samples are randomly assigned to take either the placebo or the drug pill would be more internally valid than one in which all the subjects who were from New York were given the placebo and all subjects from San Francisco were given the drug. Note that one major purpose of random assignment is that if there are no confounds, then the P-value reveals the probability that any effect found is due to the levels of the independent variable vs. random variation. This is not the case in a quasi-experiment or correlational design, where the P-value simply reveals the probability that you are sampling from one or more than one underlying distribution. That is, in a true experiment, the P-value reveals the probability that two means, X and Y are different, and reveals that they are different because of Z (that is, caused by Z) whereas in a correlational study, the P-value just provides information that the means X and Y are different but does not provide information about why they are different (i.e. the P-value does not reveal whether Z caused the difference between X and Y).

Replication—random repeating of experimental conditions in an experiment so that the inherent or experimental variability associated with the design can be estimated. This allows for p-value calculation to assess statistical significance.

Blocking—the arranging of experimental units in groups (blocks) which are similar to one another.

Scales of measurement—Whether a variable is variable is nominal, ordinal, or interval.

Power analysis—Methods of determining sample size requirements for finding an effect of a given size, the width of confidence intervals, and the probability of committing a Type II error (probability of failing to reject the null hypothesis when the null hypothesis is false).

Balancing—Methods of ensuring that each of the IVs and corresponding interaction are independent of each other.

Counterbalancing—A method of controlling for order effects in a repeated measures design by either including all orders of treatment presentation or randomly determining the order for each subject.

Descriptive statistics—Methods of organizing and summarizing data.

Inferential statistics—Procedures for determining the reliability and generalizability of a particular experimental finding.

According to various embodiments described below, methods and devices are described that guide the user to the appropriate use of the above concepts.

Figure 8A:
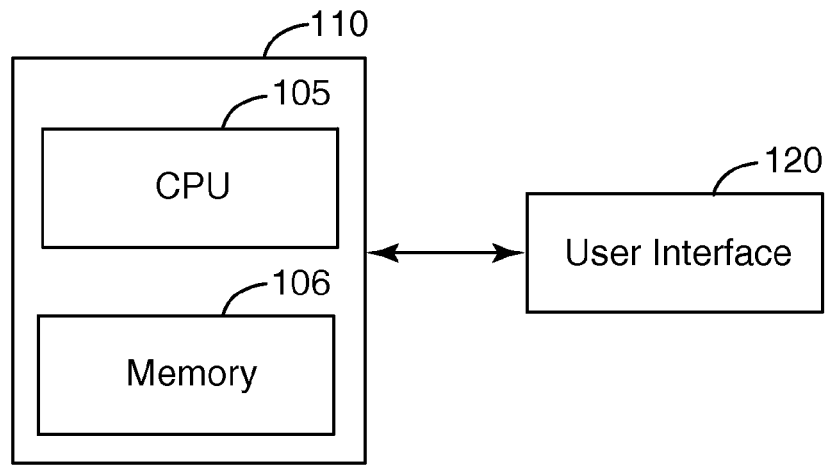
FIG. 8A illustrates components of a system, which may be an expert system, that may be configured to implement various methodologies in accordance with embodiments of the invention, including facilitating designing of a true experiment or various sub-processes that have constraints of a true experiment.

Components of an expert system in accordance with one embodiment are illustrated in FIG. 8A. The expert system includes a design processor 110 having various hardware components including a central processing unit (CPU) 105 and memory 106, among other components. The memory 106 stores computer instructions that control the processes for designing the experiment and stores information acquired from the user that are needed for the experimental design. Under control of the software, the CPU 105 algorithmically selects or generates questions to elicit information from a user. The questions are presented to the user via an output device of a user interface 120 that is coupled to the design processor 110.

For example, the user interface 120 typically includes a display device, such as a liquid crystal display (LCD) or other type of display device for presenting the questions to the user. The user interface 120 also includes one or more input devices, such as a touch screen responsive to a finger or stylus touch, a mouse, keyboard, voice recognition, or other type of input device. The user enters responses to the questions via one or more input devices(s) of the user interface. The design processor 110 can determine the appropriate descriptive and inferential statistics for the experiment based on the experimental design and the characteristics of the independent and dependent variables.

The system components shown in FIG. 8A may also be used to implement a true experiment or portions thereof, such as shown in FIGS. 2A-5, without some or all of the expert system features described herein (e.g., as in the case where a system is developed by one skilled in the art of experimental design). The system components shown in FIG. 8A may also be used to implement various sub-processes having constraints of a true experiment, such as those previously described in FIGS. 5-7B. In such implementations, the components shown in FIG. 8A may be located at the same site (e.g., within a developer's office or a common chassis) or be located at geographically distant sites (e.g., distributed components of systems or devices communicatively coupled together via a network or the Internet).

Figure 8B:
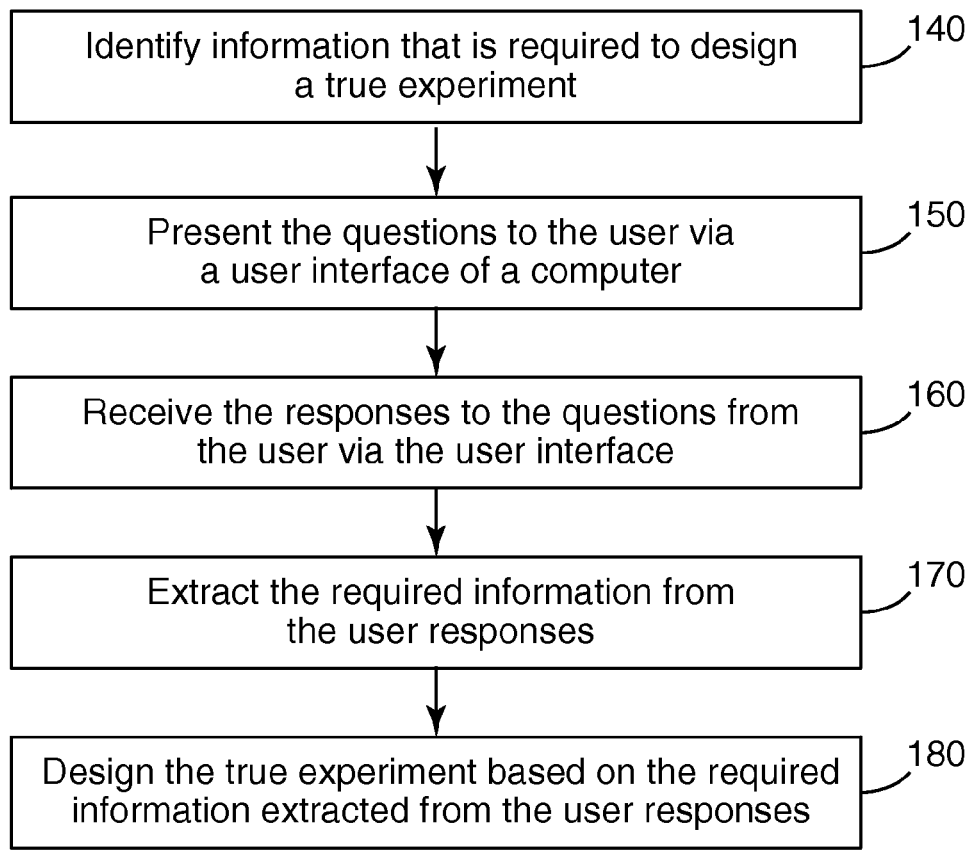
FIG. 8B is a diagram that illustrates processes implemented by a design processor and a user interface to design a true experiment or various sub-processes that have constraints of a true experiment in accordance with embodiments of the invention.

The diagram of FIG. 8B illustrates processes implemented by the design processor and user interface to design a true experiment in accordance with embodiments of the invention. Although the processes described in FIG. 8B and other figures that follow are directed to designing a true experiment, it is understood that such processes may be implemented to design various sub-processes that have constraints of a true experiment, including those previously described in FIGS. 5-7B.

The design processor identifies 140 the information required to design a true experiment and selects or generates a series of questions that elicit responses from the user providing the required information. The questions are presented 150 to the user via a user interface. User responses to the questions are received 160 via the user interface and are transferred to the design processor. The design processor extracts 170 information from the user responses and designs 180 a true experiment based on the information. The expert system has the capability to collect information at specific steps that is relevant to other steps.

For example, knowledge that the dependent variable is continuous in step X means a particular type of statistical analysis should be used in step Y. The system uses data from previous steps to complete later steps. For example, if the data has already been acquired, the system would not ask the user for the same information again. The user would not need to know that the information was relevant to both steps. If the data were not available from previous steps, the system would ask the user for the needed data.

Figure 8C:
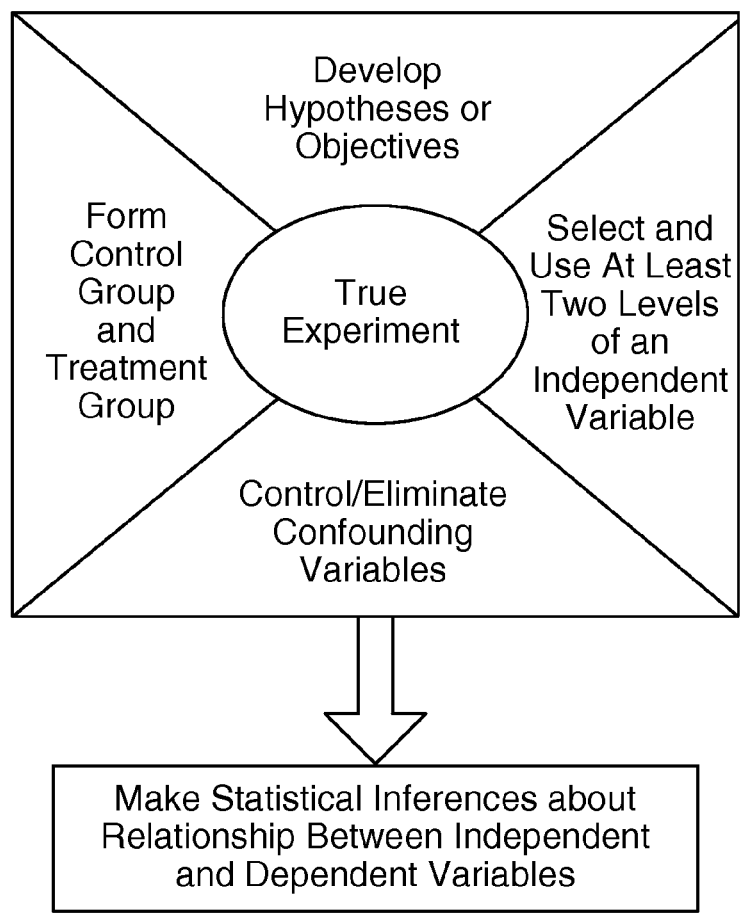
FIG. 8C illustrates elements of a true experiment.

Elements of a true experiment are illustrated in FIG. 8C. A true experiment includes development of a hypothesis or objective. Dependent and independent variables are identified, and at least two levels of one or more independent variable are used. A control group and treatment groups are formed and samples are randomly assigned to levels of the independent variable. There is also a process for controlling for or eliminating confounding variables.

For example, in a digital signage experiment, the system would guide the user through the process of controlling for carryover effects by 1) balancing and counterbalancing the order with which pieces of content are shown at locations across the network; and or 2) ensuring that two pieces of experimental content are not shown within a block of time in which viewers could see both pieces of content while in the store; and or 3) ensuring that sufficient time has elapsed before data are collected between when the content switches from one version of experimental content and another version of experimental content such that at least 95% of possible viewers who were in the store at the time of the content change would have left the store. If all of these elements are appropriately applied, the experiment produces results that can be used to make statistical inferences about the relationship between the dependent and independent variables.

The expert system described herein allows a user who is unsophisticated in the complexities of true experimental design to design an experiment that produces substantially confound-free results and can be used to determine and quantify any causal relationship between independent and dependent variables. It is understood that features and functionality of the described system may be modified in accordance with the sophistication of the user, which may range from unsophisticated to highly sophisticated. For example, in the case of a highly sophisticated user, rudimentary features useful to less sophisticated users may be simplified or eliminated.

Embodiments of the invention are directed to an expert system that has the capability of designing a true experiment based on user input. As previously mentioned, the use of the expert system relieves the user of having any foundation in the theory or practice of experimental design. A true experiment has at least two levels of an independent variable. The expert system elicits information from a user required to choose independent and dependent variables for the experiment. For example, in a digital signage experiment, the expert system might ask the user questions such as: "If content X (where X is any piece of content in which the user wants to experimentally evaluate) is effective, what are the changes in the word that you would expect to happen as a result of showing content X? The system would provide a number of possible changes such as: sales of a particular product will increase; foot traffic in a particular location in the store will increase; consumers will inquire with staff regarding the features of a particular product; consumers will pick a particular product off the shelf; and other, where other is any other change that is not included in the system's stored set of possible changes.

Those skilled in the art will appreciate that each of these possible "changes in the world" correspond to a possible dependent variable that could be measured in an experiment designed to test the effectiveness of content X. Likewise, the expert system could guide the user through the process of picking control content analogues to a placebo in a drug study. For example, the expert system would ask the user to identify content that would not be related in any way to the goal of content X.

With respect to threats to internal validity, the expert system, via the sequence of questions and user responses, identifies threats to internal validity, and may initiate processes for controlling these threats, such as through balancing, counterbalancing and/or blocking, and/or randomization.

The expert system, based on user input, is capable of implementing processes for assigning samples randomly to groups so that each sample in an experiment is equally likely to be assigned to levels of the independent variable. The expert system is also capable of designing an experiment that includes randomization, counterbalancing and/or blocking. The system may assist the user in selecting independent variables or levels of independent variables, and assists the user in selecting dependent variables based on factors associated with internal and/or external validity of the experiment. For example, the system could obtain the necessary information to conduct power analyses on various combinations of independent and dependent variables, provide the user with the results of the various power analyses the domain specific terms and values that the user understands ("Using sales data to measure the effectiveness of this piece of content would take 8 weeks and cost $1400 whereas using sensor data would take 2 weeks and cost $800).

Figure 8D:
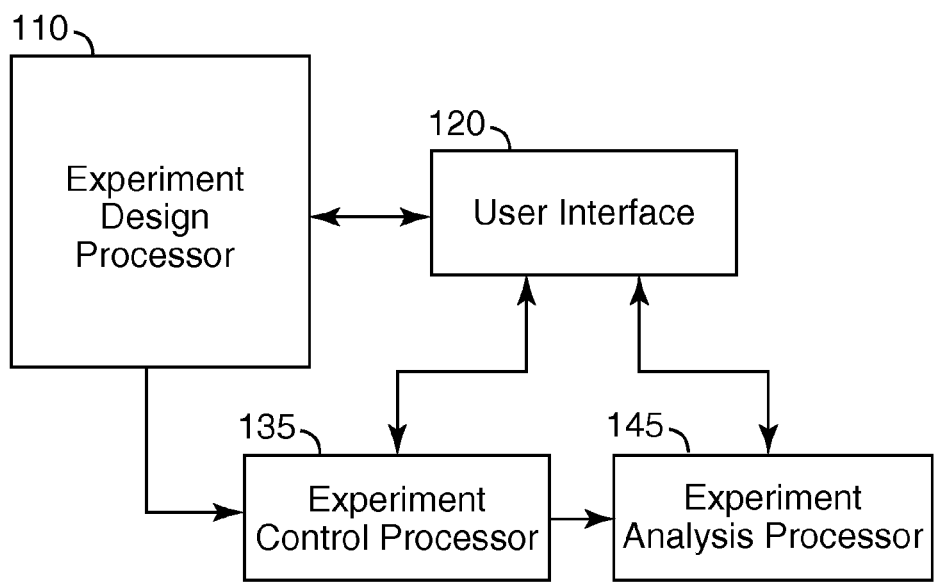
FIG. 8D is a block diagram illustrating a system configured to design a true experiment or various sub-processes that have constraints of a true experiment, conduct the experiment or implement such sub-processes, analyze experimental data and/or interpret the results of the true experiment or sub-processes that have constraints of a true experiment in accordance with embodiments of the invention.

In some configurations, in addition to designing the true experiment, the expert system may aid the user in performing one or more of conducting true experiments, collecting data, statistically analyzing the data, and interpreting the results of the experiments. An embodiment of the expert system that includes the capability for conducting, analyzing and interpreting experiments or various sub-processes having constraints of a true experiment is illustrated in FIG. 8D. In addition to the experiment design processor 110 and user interface 120 previously described, the expert system may also include an experiment control processor 135 configured to automatically or semi-automatically control the execution of the experiment. An experiment analysis processor 145 may also be included that is configured to analyze the experimental data and/or interpret the results of the experiment. The functions of the control processor 135 and the analysis processor 145 are enhanced through knowledge of how the experiment was designed by the design processor 110.

For example, because the analysis processor 145 will have received information regarding the independent and independent variables (e.g., whether the independent variables (IVs) and dependent variables (DVs) are continuous or discrete), the analysis processor 145 would have much of the necessary information to choose the appropriate statistical test to apply to the data from the experiment. For example, if there is one IV with two discrete levels and one continuous DV, then a T-Test may be selected by the analysis processor 145 for the inferential statistical test whereas if there is one IV with two discrete levels and one DV with two discrete levels, then a Chi-Squared test may be used for the inferential statistical test. Likewise, because the analysis processor 145 will have access to information from the design processor 110 regarding which experimental conditions are diagnostic of particular hypotheses, the analysis processor 145 would have most or all of the information needed to determine which experimental and control conditions should be statistically compared and reported to the user.

The computer-based approaches to experimental design in accordance with various embodiments described herein involve a computerized digital signage information system. The present invention is not limited, however, to the fields of communications systems or to digital signage. The approaches of the present invention may be applied to design a true experiment regardless of the field of interest. For example, the methods and systems described herein may be applied to the design of experiments for any number of subject areas, including, but not limited to, any sort of digitally delivered messaging, such as print media, digital signage, and/or Internet delivered advertisements, as well as experiments related to biology, chemistry, linguistics, medicine, cognitive sciences, social sciences, education, economics, and/or other scientific fields.

The examples are described in the context of an expert system configured to design experiments to evaluate digital signage content. As will be appreciated, the expert system may alternatively or additionally be programmed to evaluate other types of content, or may be programmed to design experiments other than content evaluation experiments. The expert system example described below allows the reader to develop an understanding of the principles of the invention which generally span all fields of scientific endeavor.

The flow diagram illustrated in FIGS. 9A-9E provides an overview of processes that may be implemented by the design processor 110 (FIGS. 8A and 8D) in accordance with embodiments of the invention. The flow diagram illustrates steps in the design of a true experiment that, in accordance with various embodiments of the present invention, may be implemented by the expert system by prompting the user to provide needed information. The expert system prompts the user to supply information by presenting questions to the user. The expert system receives the user responses, and extracts information needed for the experiment from the user responses. FIGS. 10A-10P are screen shots of a display screen illustrating questions that may be presented to the user for some of the processes indicated in the flow diagram of FIGS. 9A-9E. The illustrative screen shots present questions corresponding to an experiment, or sub-processes thereof, to test for and measure causal relations between digital signage content and sales in a coffee shop in a hotel. Various advertisements are presented on digital displays positioned in various locations. This example is used to illustrate processes that may be implemented by the expert system in designing a true experiment. Those skilled in the art will recognize that this exemplary process for designing the coffee shop experiment may be extrapolated to any experiment by presenting questions to the user to acquire the needed information to design the particular experiment of interest.

Figure 9A:
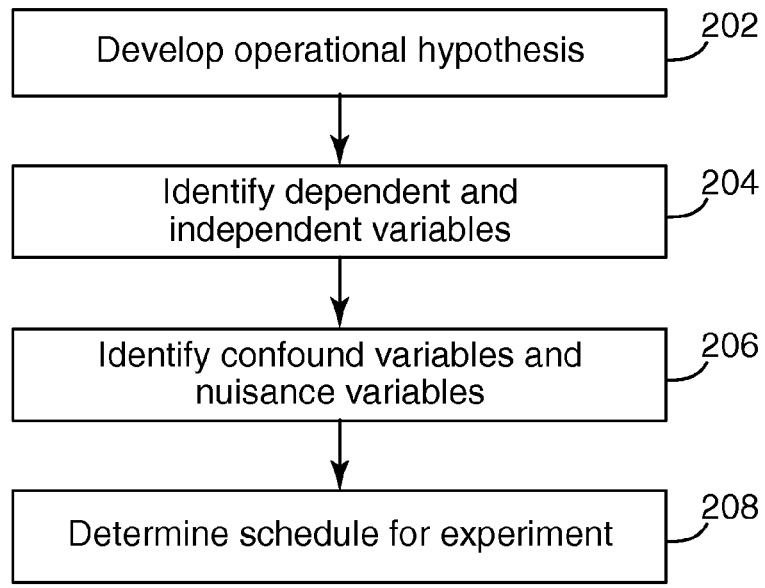
FIGS. 9A-9E show a diagram that provides an overview of processes that may be implemented by an experiment design processor in accordance with embodiments of the invention.
Figure 10A:
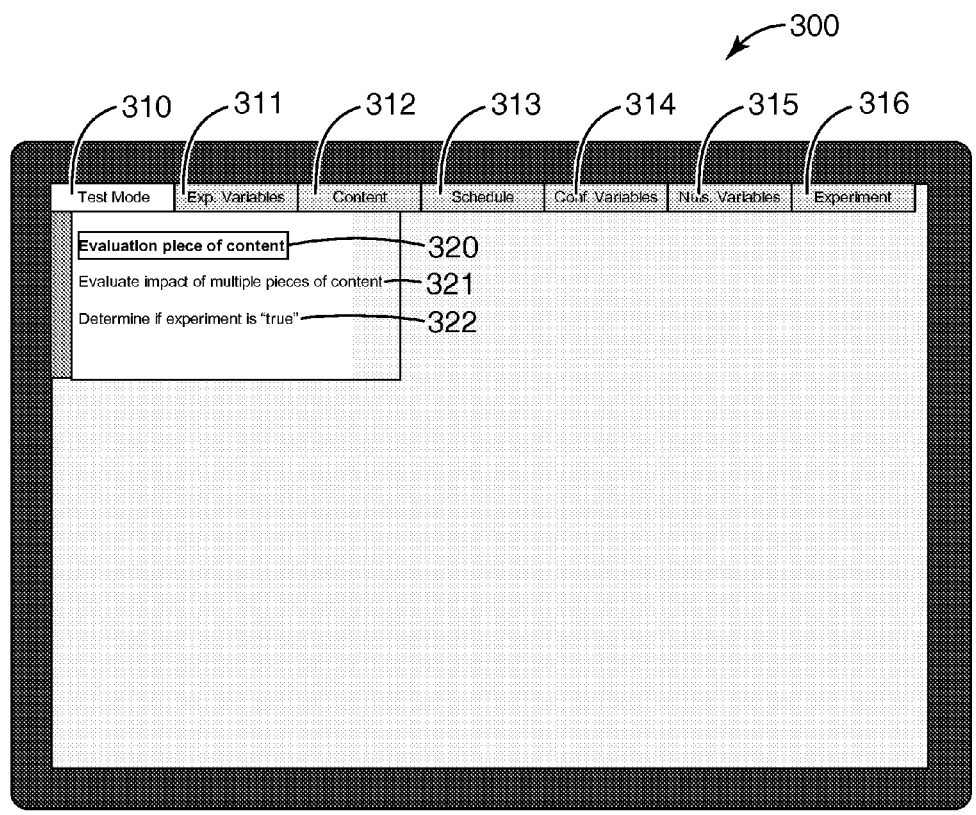
FIGS. 10A-10P are screen shots of a display screen illustrating questions that may be presented to the user for some of the processes used for designing true experiments or sub-processes that have constraints of a true experiment in accordance with embodiments of the invention.

As illustrated in FIG. 9A, the process used by the expert system for designing the true experiment includes developing 202 an operational hypothesis and identifying 204 the independent and dependent variables of the experiment including whether the variables are discrete or continuous and what IV levels should be tested. With input from the user, the expert system identifies 206 confound and nuisance variables and determines 208 the schedule for which experimental and control content are shown across the digital displays in order to execute the experiment.

Figure 9B:
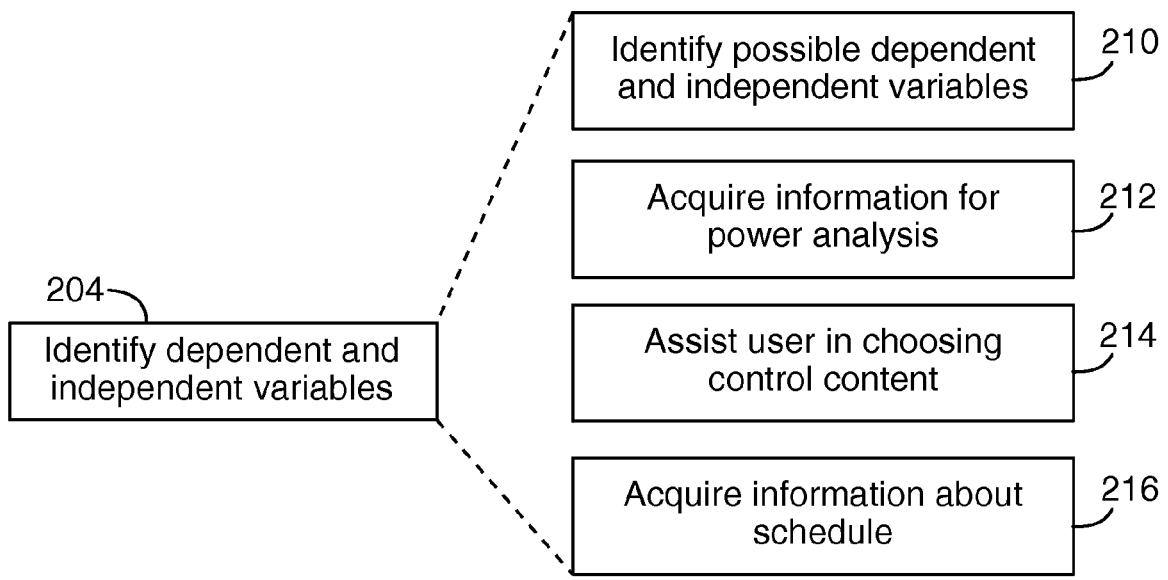

FIG. 9B illustrates in more detail several optional processes associated with identifying 204 the experimental variables. The expert system may obtain information for identifying 210 possible dependent and independent variables and acquire 212 information from the user so that power analyses can be performed. The expert system may assist 214 the user through a process for choosing control content and may acquire 216 information from the user about the experimental protocol, which in the context of digital signage involves the schedule for displaying content across the digital signage network. The schedule includes the locations and times that content is played across the digital signage network.

Figure 9C:
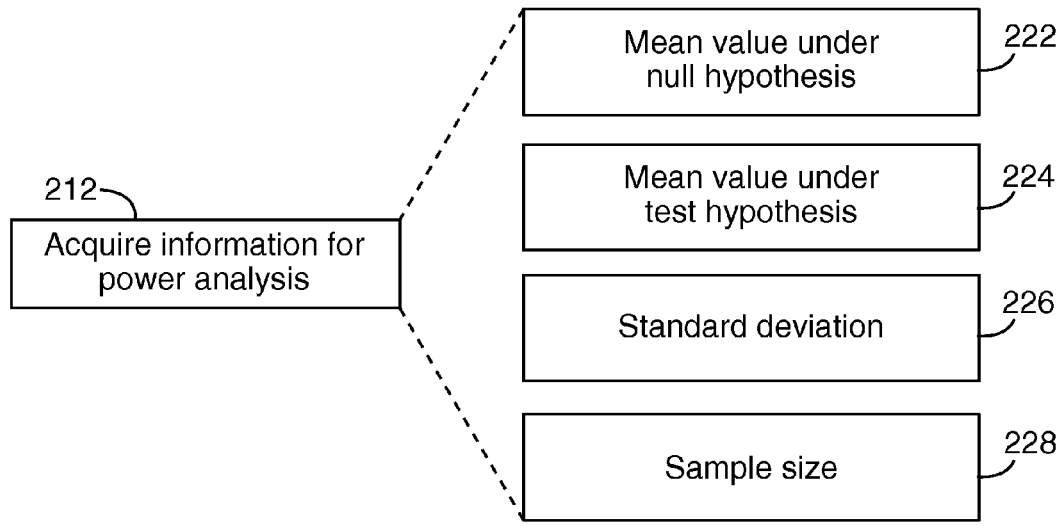

FIG. 9C illustrates in more detail processes for acquiring 212 information to perform a power analysis. The power analysis allows the expert system to determine the probability that the experiment will detect an effect of a given magnitude. The information acquired during this stage may also be used to determine the sample size needed for the experiment to have a pre-specified amount of statistical power. Power analysis solves for one of three parameters that is not provided from two others that are. The parameters for power analysis are: sample size, power, effect size. The expert system may walk the user through choosing which of these they care the most about, and help optimize the experimental design. For example, if the user says they are not interested in an effect unless it is larger than X, the power analysis would be conducted such that the experiment has sufficient power to find an effect at least as large as X.

A power analysis requires the following information to be estimated: the mean value under the null hypothesis 222, mean value under the test hypothesis 224, standard deviation 226, and the sample size 228. These parameters are estimated via a series of simple questions presented to the user as illustrated in more detail in FIGS. 10A-10P. When the standard deviation is unknown, historical data might provide the basis for the estimate. When there are no historical data, a reasonably good approximation would be to use the largest value that the dependent variable could be minus the smallest value that it could be and divide this difference by 4 (this provides a conservative estimate of the standard deviation)

Figure 9D:
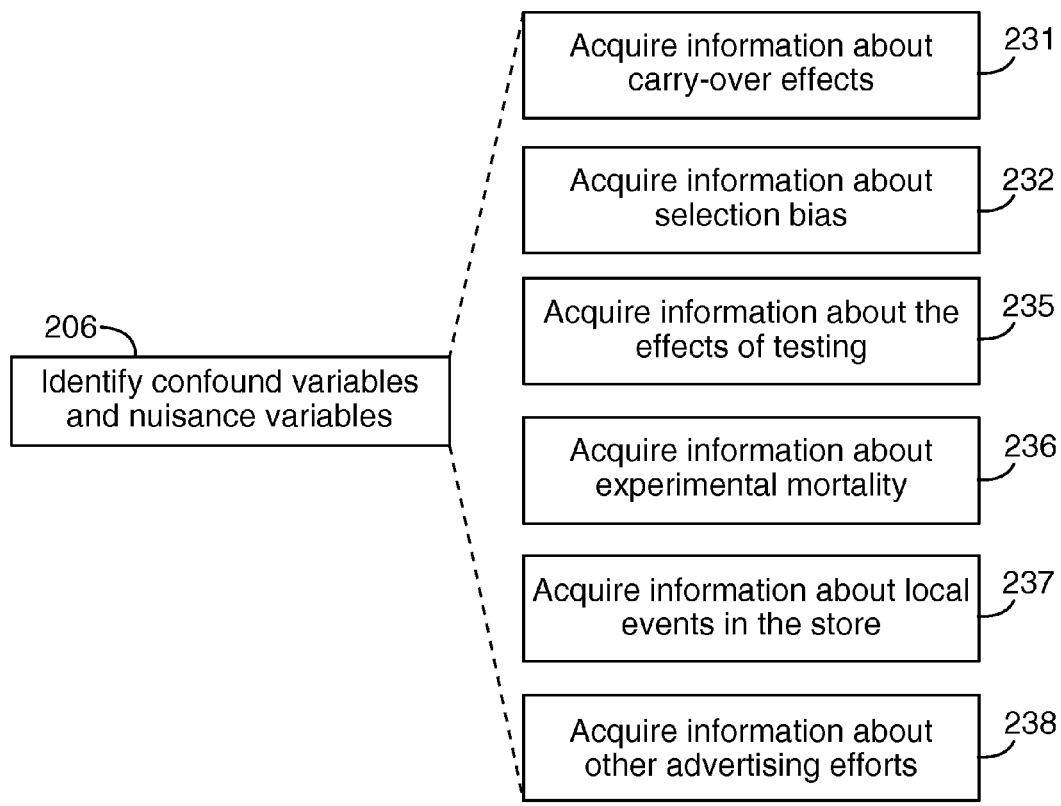

FIG. 9D illustrates in more detail several optional processes for identifying 206 confound and nuisance values. Confound variables are any variable that varies systematically with the levels of the independent variable. For example, if a piece of control content is always followed by a piece of content that warns of increased terror threat level whereas a piece of experimental content is always followed by an advertisement for sleep comfort beds, any difference in sales in the coffee shop when the control or experimental content is playing could be due to the difference in the control vs. experimental content or it could be due to the content that followed each piece of experimental and control content. Examples of confounds include: regression to the mean, order effects, carryover effects, floor-effects, ceiling effects, Hawthorne effects, and demand characteristics.

Nuisance variables are variables that do not vary systematically with the levels of the IV but that can reduce statistical power for the coffee shop experiment. For example, provided correct randomization, hotel occupancy rate would be a nuisance variable. In two experiments where one hotel has more variability in occupancy rates and another has less variability, if all else is equal (e.g., same sample size) the statistical power would be greater in the hotel with less occupancy variability. Examples of nuisance variables in a digital signage experiment include: other promotional activities, weather, day of week, economic conditions. The expert system preferably acquires information about possible confound and nuisance variables by presenting a series of questions that elicit user responses that contain information about these variables.

As illustrated in FIG. 9D, the expert system may present a series of questions designed to acquire information about carryover effects 231, selection bias 232, the effects of testing 235 which involves any difference in outcomes that is due to samples being treated, in any way differently, than they would if they weren't being subjected to the levels of the IV in a controlled experiment (e.g., being watched by someone with a clip board might change how you would normally respond to seeing a piece of content), experimental mortality 236, local events that may effect the experiment 237, and information about other advertising or promotional efforts 238, for example.

Figure 9E:
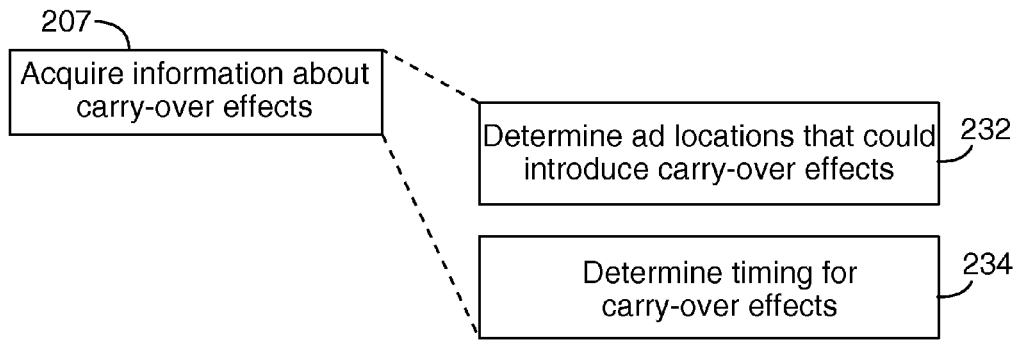

FIG. 9E illustrates in more detail several optional processes that may be performed by the expert system to acquire information 231 about carryover effects. The expert system presents a series of questions to the user for obtaining 232 information about content shown at other locations. Another series of questions elicits 234 responses from the user including information about the timing of content that could produce carryover effects.

The expert system leads the user through any or all of the processes described above to acquire the information needed to perform a true experiment. FIG. 10A illustrates an exemplary display 300 that may be used to present questions to the user and receive user responses. The display 300 illustrated in FIG. 10A is a touch sensitive display, although any type of input and output devices suitable for presenting questions to a user and receiving user responses, such as a non-touch sensitive display, may be used. The touch sensitivity of the display allows for user responses to be input via touches to the display screen. It will be apparent that any type of input device suitable for receiving responses from a user, including mouse, keyboard, and/or microphone with voice recognition circuitry may be used.

In this example, the display 300 includes a question/response viewing area 305 and various pull down menus 310-316 that may be activated by a touch from the user to facilitate gathering information. Each pull down menu 310-316 corresponds to a different area of questioning and/or a different aspect of the experimental design which is indicated by the title of the menu. The menus 310-316 exemplify the highest level in a hierarchical menu structure. When selected, a pull down menu 310 may reveal one or more sub-menus 320-322 which correspond to the next highest hierarchical level in the menu structure. Selection of a sub-menu 320-322 may cause additional menus to be presented. Presentation of sub-menus in the hierarchical structure may continue as needed to achieve the level of specificity required by the area of questioning or experimental design operations associated with the menu structure. A touch screen allows menus and/or sub-menus to be pulled down and/or a menu item activated by touching the menu title or menu item.

It will be appreciated that the menus illustrated in FIGS. 10A-10P represent a subset of possible menus that may be used for the expert system. For example, other menus that could be used include menus directed to acquiring additional information for designing the experiment, or menus directed to acquiring information used in conducting or analyzing the experiment.

The expert system may operate in various modes, for example, the activation of a menu item is typically performed by the expert system as the system leads the user through the experimental design process. In some embodiments, the user may interact with the control processor and/or analysis processor to provide input regarding the performance of the experiment, analysis of the experimental data, and/or interpretation of the experimental results.

Menu items may also be accessed by the user, if desired. For example, the expert system may initially step through a process of obtaining information by activating operations associated with various menu or sub-menu items. The user may, if desired, return to various stages of the process, by re-activating the menu item. For example, the user may desire to return to a menu item to change a previously entered input and may conveniently do so through use of the pull down menus 310-316.

The screen 300 illustrated in FIG. 10A illustrates a menu 310 titled "Test Mode." If the user activates the Test Mode item, then the screen displays one or more questions related to determining the independent variables of the experiment. As previously discussed, in this example, the expert system is configured to design experiments to analyze digital signage content, such as graphics or video clips displayed on a digital display, although the system could be configured to design experiments for other types of applications. When the menu item 310 "Test Mode" is activated, the user has the option of choosing between sub-menu items 320-322. The user may choose either "Evaluate an individual piece of content" indicating the user would evaluate a piece of content relative to no content or placebo content or "Evaluate the relative impact of multiple pieces of content" indicating the user has two advertisements that he/she could like to compare or "Determine if an experiment is 'true'."

FIG. 10A depicts the scenario where the user has selected to evaluate an individual piece of content as indicated by the highlighted sub-menu item 320. Selection of this option initiates a process controlled by the expert system to acquire information from the user that is required to design an experiment to evaluate an individual piece of content. The expert system proceeds to the next step in the process involving determining the experimental hypothesis and dependent variables for the experiment by activating another menu item, as illustrated in FIG. 10B.

Figure 10B:
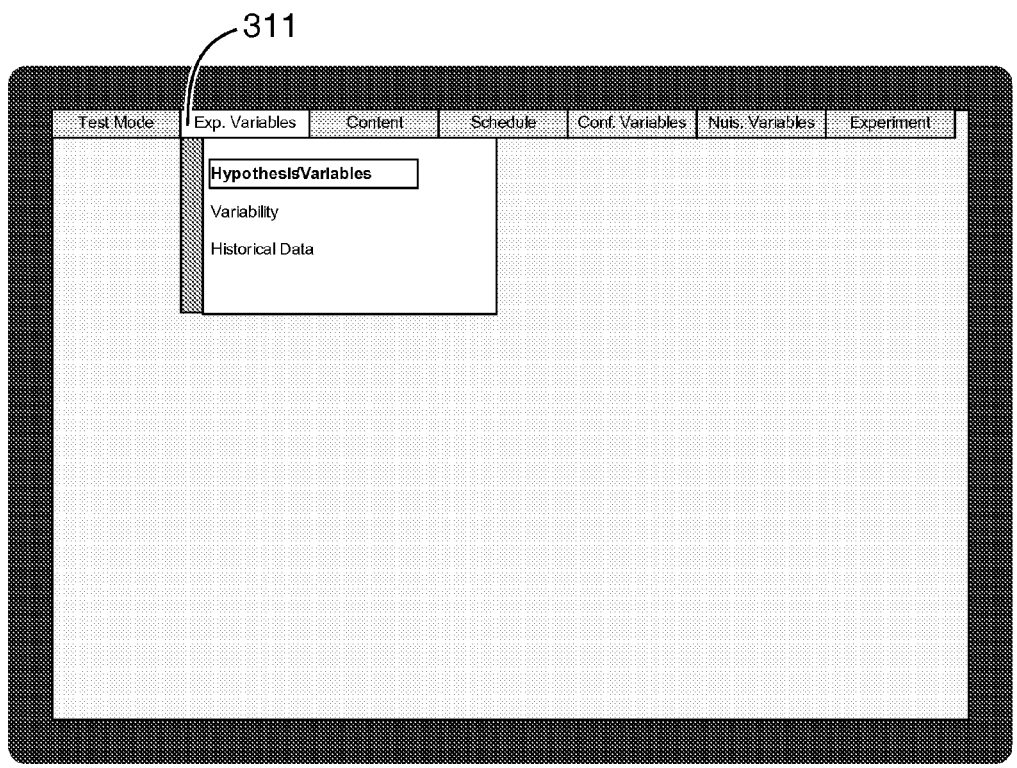
Figure 10C:
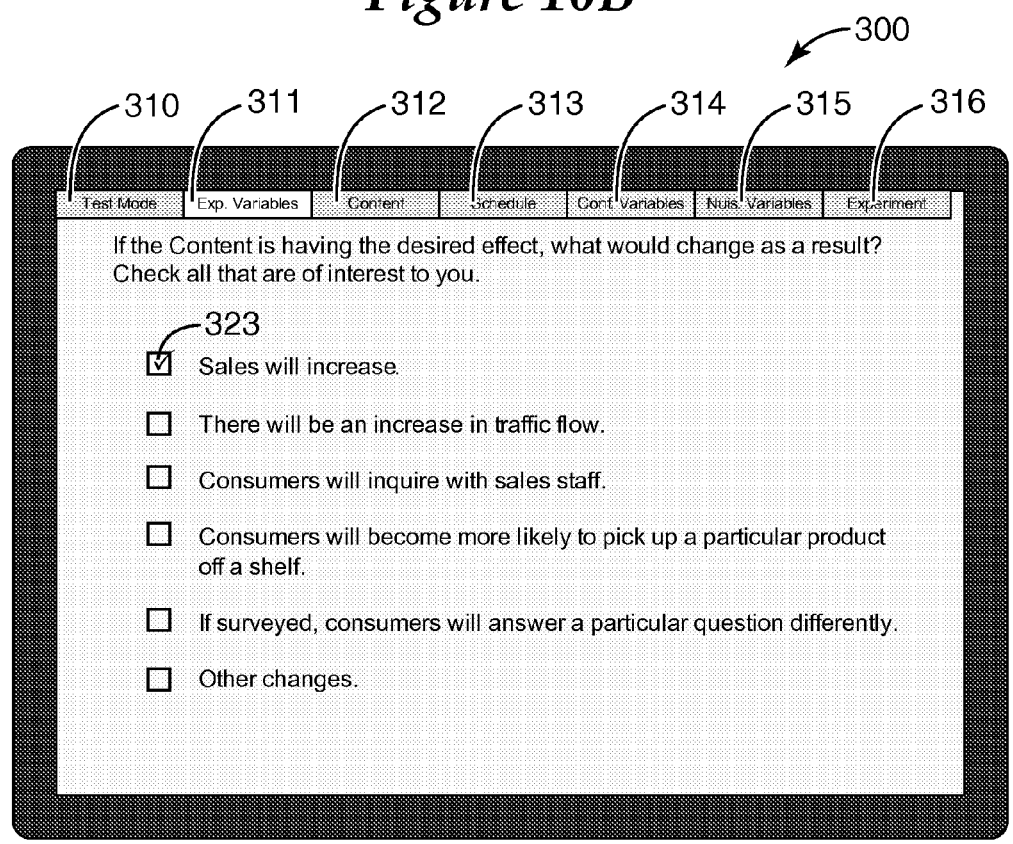

FIG. 10B shows the selection of the menu item 311 entitled "Exp. Variables." (abbreviating Experimental Variables). When pulled down, the menu 311 reveals list of sub-menu items titled "Hypothesis/Variables," "Variability," and "Historical Data." Activation of a sub-menu item causes a series of questions and/or choices to be presented to the user. For example, if the menu item hypothesis/variables is activated, the screen may display a number of choices as indicated in FIG. 10C to develop the hypothesis or hypotheses of the experiment and to determine possible dependent variables for the experiment. In one scenario, as illustrated in FIG. 10C, the following question is presented to the user: "If the content is having the desired effect, what would change as a result? Check all that are of interest to you." The user may choose one or more of the following responses: "Sales will increase," "There will be an increase in traffic flow," "Consumers will inquire with the sales staff," "Consumers will be more likely to pick up a particular product from the shelf," "If surveyed, consumers will answer a particular questions differently," "Other changes." In the particular example of FIG. 10C, the user has selected "Sales will increase." This selection provides information to the expert system that identifies the experimental hypothesis as follows: If the digital signage content is shown to customers, sales will increase. The information also provides a dependent variable in the experiment, i.e., a change in sales caused by displaying the content.

Figure 10D:
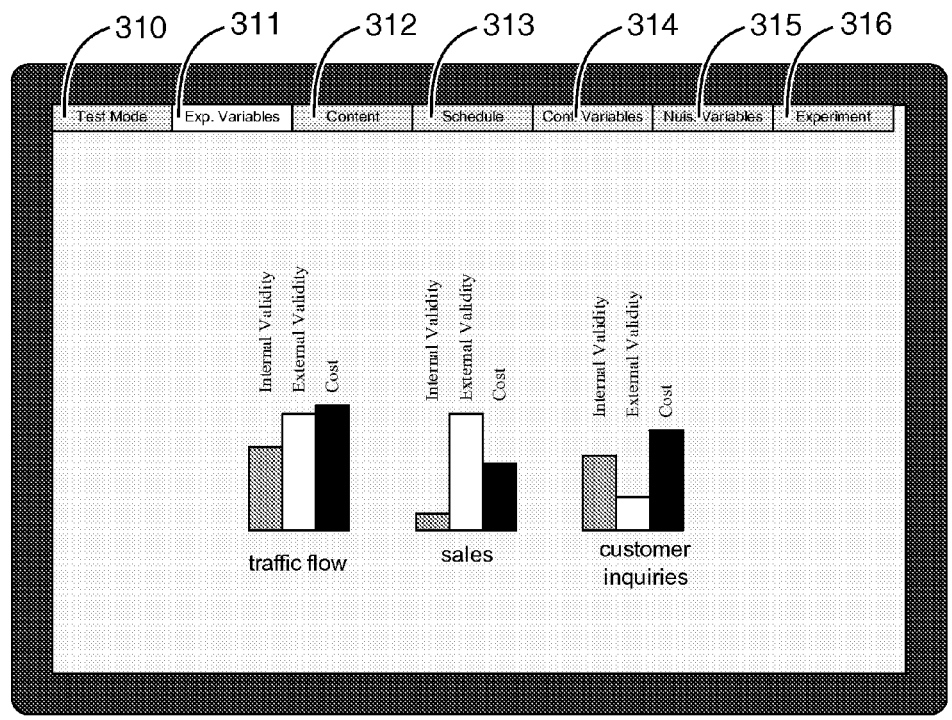

In other scenarios, one or more additional possible dependent variables, e.g., traffic flow, consumer inquiries, consumers picking up product, and/or answers to survey questions may be selected by the user. If multiple dependent variables are indicated, the expert system will calculate the cost of the experiment, estimate the internal and external validity of the experiment for each dependent variable and lead the user through the process of selecting appropriate dependent variables. FIG. 10D illustrates one portion of the process that the expert system may use to lead the user through selecting one or more dependent variables when multiple selections are made in the process step illustrated by FIG. 10C.

In some scenarios, none of the offered choices illustrated in FIG. 10C corresponds to a change expected by a user and the user may select "Other." If so, the expert system leads the user through an additional series of questions to identify and characterize the possible dependent variable(s) for the experiment. For example, if the user selected "Other," some of the questions may be directed towards determining if the possible dependent variable is continuous or discrete. The user could have discrete data which is categorical or nominal (for example, male and female). Discrete variables could be ordered categories called ordinal data (for example, age categories 20-29, 30-39, etc.). Continuous data come from a variety of measurement techniques, where there is an underlying continuum. As an example, scale ratings on a survey on a liking scale ranging from totally dislike to totally like (7 categories, 1-7 scale) or on a purchase intent scale from definitely would not purchase to definitely would purchase. Another example would be the more traditional continuous variable where are there are a large number of possible values (temperature, income, sales, weight, etc.).

For example in eliciting information if the "Other" category is selected by the user, the expert system may present one or more additional questions to determine the dependent variable and/or whether the dependent variable is continuous or discrete.

Figure 10E:
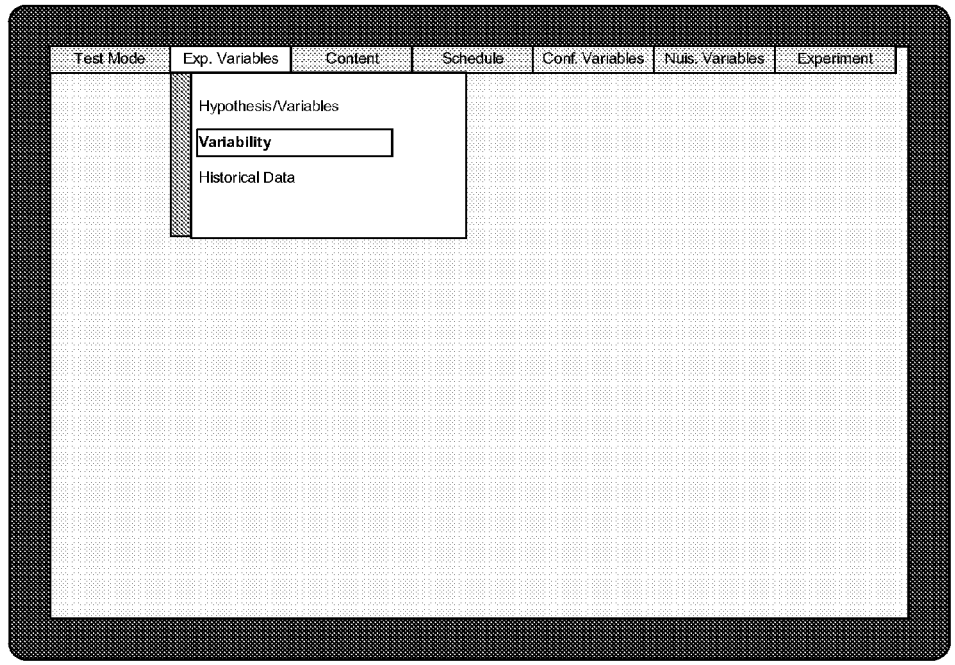

The expert system may lead the user through a series of questions to obtain information needed to perform a power analysis. Parameters that are used for the power analysis include the mean under the null hypothesis, standard deviation, mean under the test hypothesis, significance level, power, and sample size. Information about some of these parameters is obtained from the user while others are standard values programmed into the expert system. After determining possible dependent variables, the expert system may activate processes associated with the sub-menu item titled "Variability" as indicated in FIG. 10E. In these processes, the expert system leads the user through a series of questions designed to determine the variability of the possible dependent variables.

Determination of the variability of the possible dependent variables provides information for use by the expert system to evaluate the statistical power of the experiment. For example, the expert system may pose questions to collect information about the granularity of available data such as those indicated in FIGS. 10F and 10G. In FIG. 10F, the expert system presents a question to obtain information about the lower bound of the granularity of the available data. As indicated in FIG. 10F, the question "What is the smallest increment of time that sales can possibly be measured" provides the following choices: hourly, after each shift, daily, weekly, monthly, or other. In this particular case, the user has indicated that the smallest unit of time that sales can be measured is hourly. On the screen shot depicted in FIG. 10F, the expert system also prompts the user to input the cost associated with measuring data at the smallest time increment.

As depicted in FIG. 10G, the expert system also obtains information about a convenient increment of time for obtaining data. In the screen shot illustrated in FIG. 10G, the expert system inquires about a convenient increment of time that sales can be measured. Again, the user is prompted to choose between hourly, after each shift, daily, weekly, monthly, or other. The cost associated with obtaining data at the convenient increment is also requested as indicated in FIG. 10G.

Figure 10H:
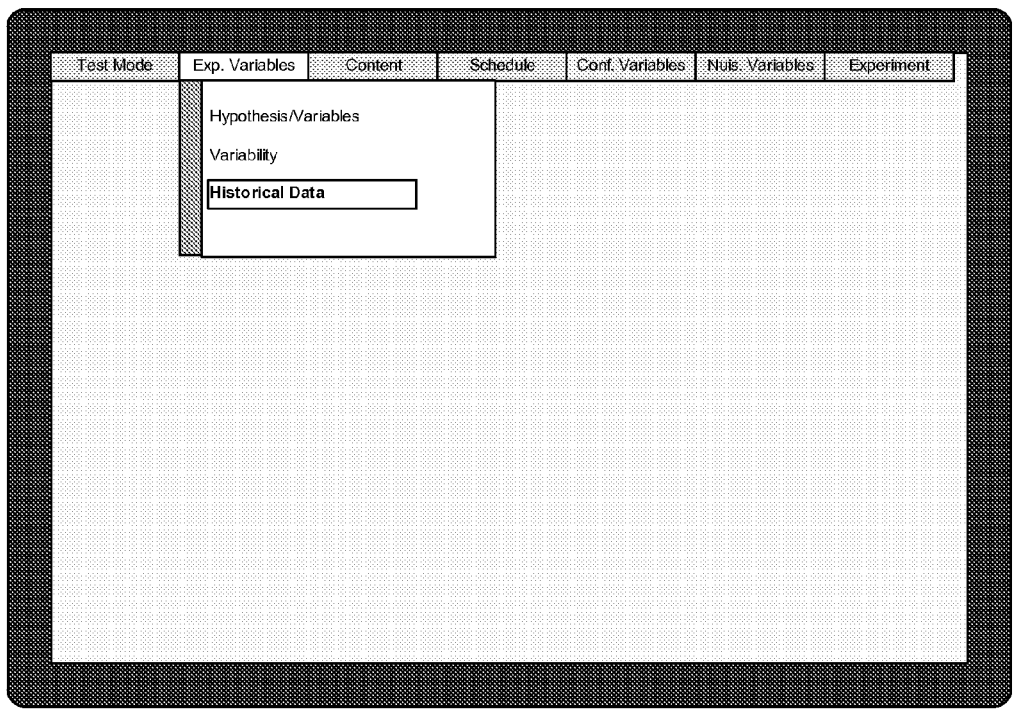
Figure 10I:
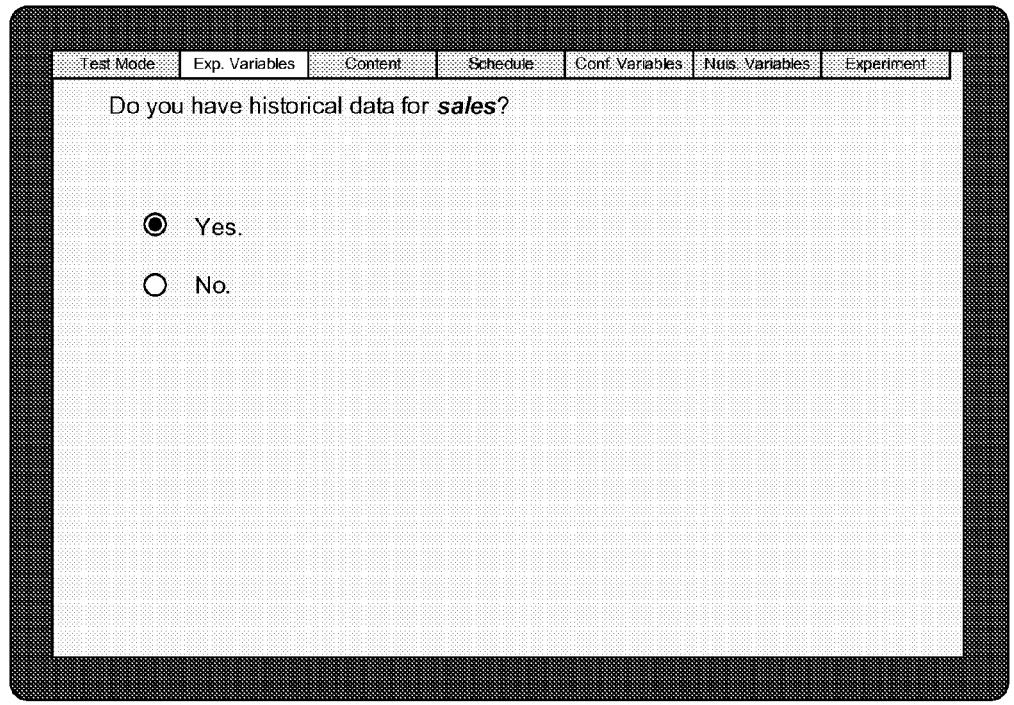
Figures 10N, 10O:
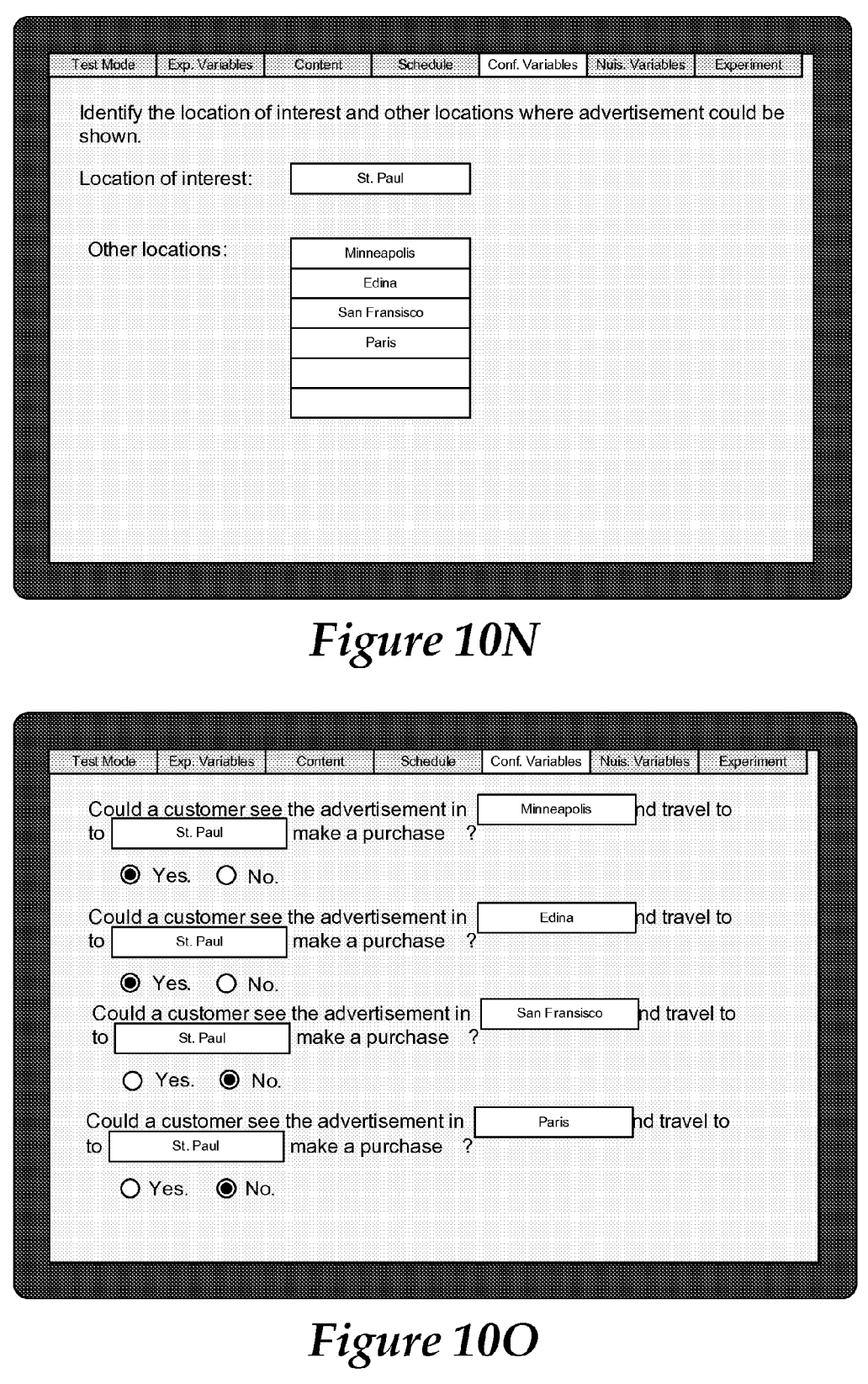
Figure 10P:
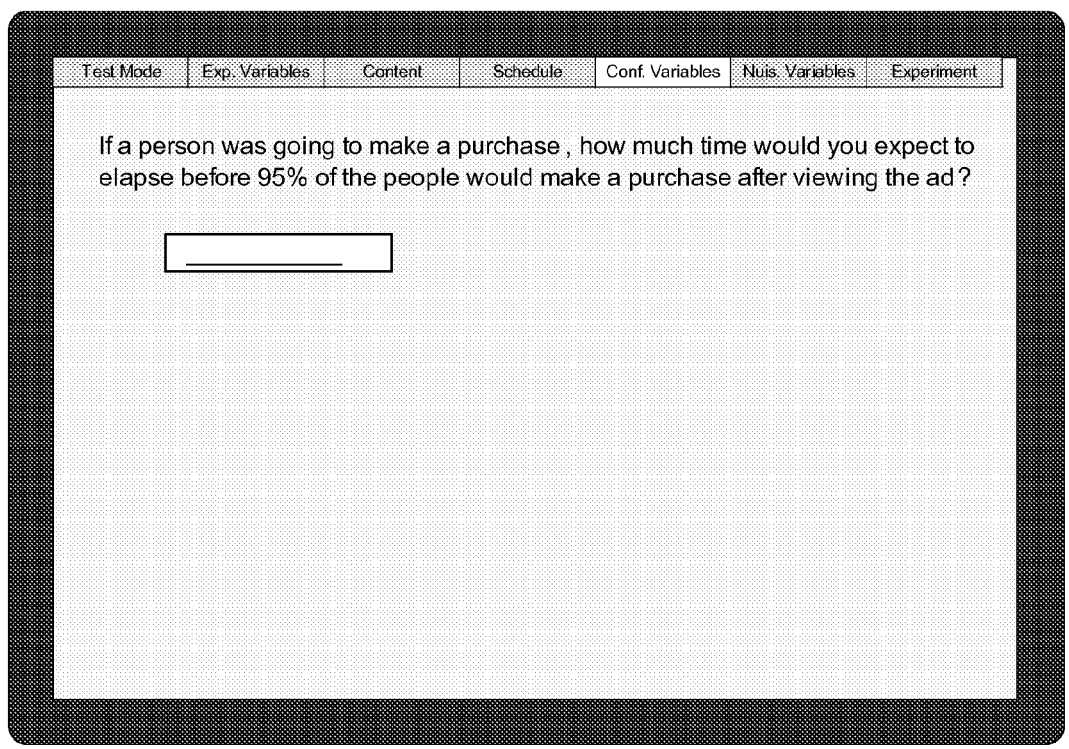

The expert system may activate processes associated with the sub-menu item titled "Historical Data" as indicated in FIG. 10H. The user is prompted to indicate whether or not historical sales data is available (FIG. 10I). A positive response triggers the screens depicted in FIGS. 10J and 10K which allow the user to enter sales data for the smallest increment of time and the convenient increment of time, respectively. The historical sales data may be used, for example, to estimate the standard deviation for the dependent variable (sales in this example) for use in a power analysis to determine the statistical power of the experiment. The number of entries elicited by the screens shown in FIGS. 10J and 10K is determined by the computer, based on a desired confidence level and the standard deviation. For example, the computer may prompt the user to provide information for a certain number of entries that are needed to estimate the standard deviation so as to achieve a particular level of confidence that the standard deviation will fall within a particular range.

The level of confidence used for the standard deviation, e.g., 90% or 95%, is typically transparent to the user, although it may be a programmable value of the expert system. Certain values used by the expert system, such as the confidence level for the standard deviation of the dependent variable described above, and the significance level of the experiment, may be programmable at the time a system is configured. These configuration values may be later changed, for example, by an administrator familiar with the expert system software.

The expert system may present questions to the user to obtain information related to the effects of the experiment. FIG. 10L is a screen shot illustrating a question that may be presented to the user to determine the minimum effect size. In this example, the expert system requests that the user enter the increase in sales that would make the content valuable.

To design a true experiment, the expert system acquires information about possible confound and/or nuisance variables that may affect the experiment. For example, confound variables may be associated with carryover effects, selection bias, testing effects and experimental mortality. As indicated in the screen of FIG. 10M, a menu item for each of these factors may be activated leading to a series of questions presented to the user to acquire information about these factors. In FIG. 10M, the menu item carryover effects is highlighted. Activation of the carryover effects menu item leads to the question presented in FIGS. 10N-10P. In FIG. 10N, the expert system presents a question that leads the user to reveal information about other locations that the content could be shown. In FIGS. 10O and 10P, the expert system presents questions that lead the user to reveal information about the timing of carryover effects.

Figure 11A:
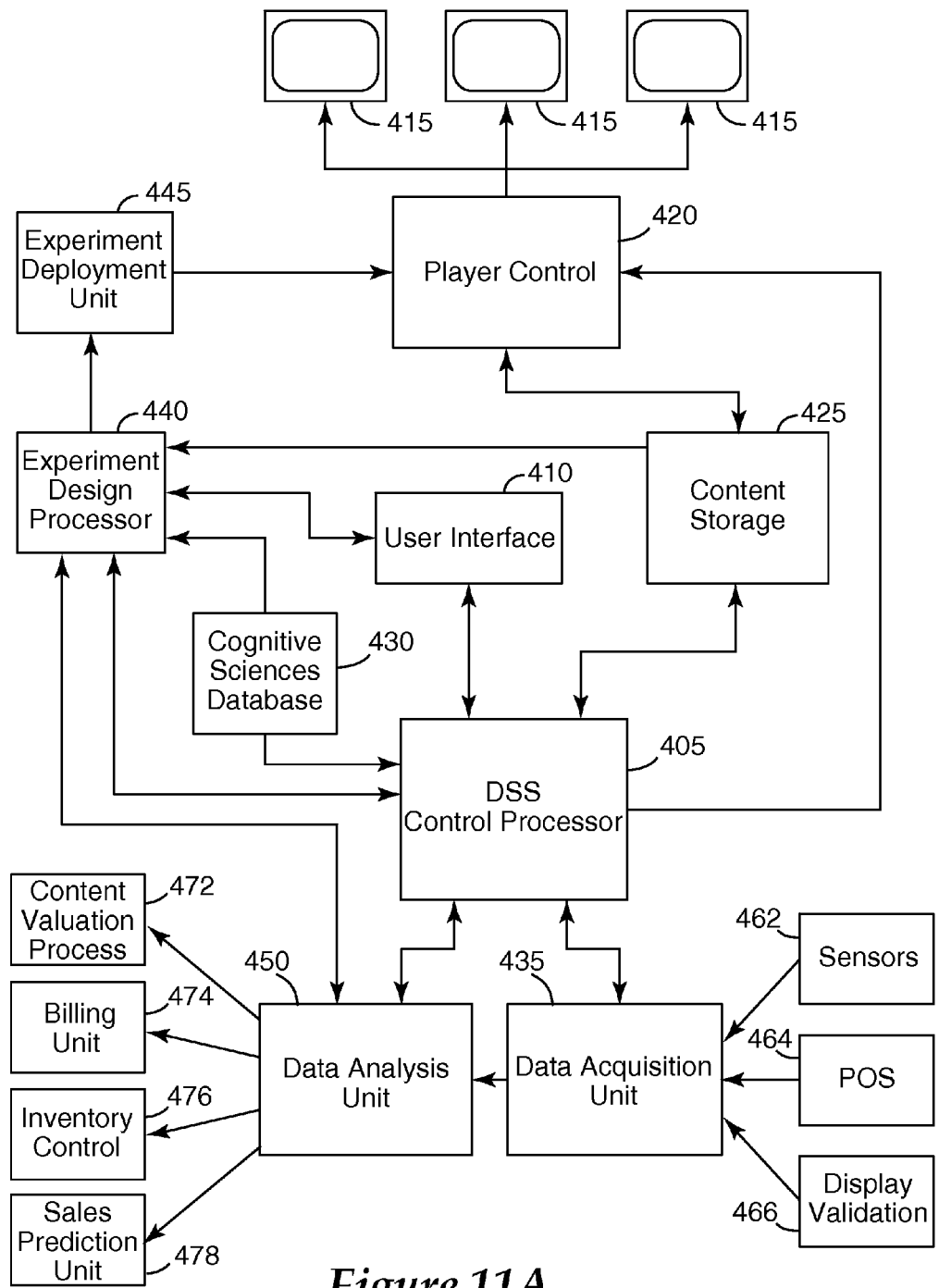
FIG. 11A is a block diagram of a digital signage system that may incorporate the capability for designing true experiments or sub-processes that have constraints of a true experiment to test the effectiveness of digital signage communication content in accordance with embodiments of the invention.

FIG. 11A is a block diagram of a digital signage system (DSS) that may incorporate the capability for designing true experiments or sub-processes that have constraints of a true experiment (e.g., such as those depicted in FIGS. 5-7B) to test the effectiveness of digital signage content in accordance with embodiments of the invention. For example, the DSS shown in FIG. 11A (and FIG. 11B) may be configured to implement the methodologies described hereinabove with regard to FIGS. 1-8. The block diagram of FIG. 11A illustrates one configuration of a DSS divided into functional blocks. Those skilled in the art will appreciate that the DSS may be alternatively illustrated using different function blocks and that various components of the DSS may be implemented as hardware, software, firmware, or any combination of hardware, software and firmware.

A system according to the present invention may include one or more of the features, structures, methods, or combinations thereof described herein. For example, a system may be implemented to include one or more of the advantageous features and/or processes illustrated in FIG. 11A. It is intended that such a system need not include all of the features described herein, but may be implemented to include selected features that provide for useful structures and/or functionality.

The DSS illustrated in FIG. 11A is a computerized system configured to present informational content via audio, visual, and/or other media formats. The DSS may include functionality to automatically or semi-automatically generate playlists, which provide a list of the information content to be presented, and schedules, which define an order for the presentation of the content. In a semi-automatic mode, a user may access a DSS control processor 405 via an interactive user interface 410. Assisted by the DSS control processor 405, the user may identify content to be presented and generate playlists and schedules that control the timing and order of presentations on one or more DSS players 415. Each player 415 presents content to recipients according to a playlist and schedule developed for the player. The informational content may comprise graphics, text, video clips, still images, audio clips, web pages, and/or any combination of video and/or audio content, for example.

In some implementations, after a playlist and schedule are developed, the DSS control processor 405 determines the content required for the playlist, downloads the content from a content server, and transfers the content along with the playlist and schedule to a player controller 420 that distributes content to the players 415. Although FIG. 11A shows only one player controller 420, multiple player controllers may be coupled to a single DSS control processor 405. Each player controller 420 may control a single player or multiple players 415. The content and/or the playlists and schedules may be transferred from the DSS control processor 405 to the one or more player controllers 420 in a compressed format with appropriate addressing providing information identifying the player 415 for which the content/playlist/schedule is intended. In some applications, the players 415 may be distributed in stores and the content presented on the players 415 may be advertisements.

In other implementations, the DSS control processor 405 may transfer only the playlists and schedules to the player controller 420. If the content is not resident on the player controller 420, the player controller 420 may access content storage 425 to acquire the content to be presented. In some scenarios, one or more of the various components of the DSS system, including the content storage 425, may be accessible via a network connection, such as an intranet or Internet connection. The player controller 420 may assemble the desired content, or otherwise facilitate display of the desired content on the players according to the playlist and schedule. The playlists, schedules, and/or content presented on the players 415 can be modified periodically or as desired by the user through the player controller 420, or through the DSS control processor 405, for example.

In some implementations, the DSS control processor 405 facilitates the development and/or formatting of a program of content to be played on a player. For example, the DSS control processor 405 may facilitate formatting of an audiovisual program through the use of a template. The template includes formatting constraints and/or rules that are applied in the development of an audiovisual program to be presented. For example, the template may include rules associated with the portions of the screen used for certain types of content, what type of content can be played in each segment, and in what sequence, font size, and/or other constraints or rules applicable to the display of the program. A separate set of rules and/or constraints may be desirable for each display configuration. In some embodiments, formatting a program for different displays may be performed automatically by the DSS control processor 405.

In some embodiments, the DSS may create templates, generate content, select content, assemble programs, and/or format programs to be displayed based on information acquired through research and experimentation in the area of cognitive sciences. Cognitive science seeks to understand the mechanisms of human perception. The disciplines of cognitive and vision sciences have generated a vast knowledge base regarding how human perceptual systems process information, the mechanisms that underlie attention, how the human brain stores and represents information in memory, and the cognitive basis of language and problem solving.

Application of the cognitive sciences to content design, layout, formatting, and/or content presentation yields information that is easily processed by human perceptual systems, is easy to understand, and is easily stored in human memory. Knowledge acquired from the cognitive sciences and stored in a cognitive sciences database 430 may be used automatically or semi-automatically to inform one or more processes of the DSS including creation of templates, content design, selection of content, distribution of content, assembly of programs, and/or formatting of programs for display. The cognitive sciences database 430 used in conjunction with the programming of the DSS yields advertisements or other digital signage programs that are enhanced by the teachings of cognitive science, while relieving the system user from needing specific training in the field.

For example, cognitive sciences database 430 may store cognitive and vision science information that is utilized during the content design, distribution, and/or adjustment processes in order to provide content that is easily processed by human perceptual systems, easily comprehended, and easily stored in memory. Cognitive sciences database 430 may include design rules and templates that may be implemented by a computer to develop and modify content in conformance with principles of cognitive and vision sciences. Cognitive sciences database 430 may also include computer implementable models of principles of cognitive and vision sciences, such as models of visual attention, text readability, and memory principles.

In development of a digital signage program, e.g., ad campaign or the like, the DSS control processor 405 may guide a user through various processes that are enhanced using knowledge acquired through the cognitive sciences. For example, information stored in the cognitive sciences database 430 may be applied to the choice of templates to produce an optimal program layout and/or to the selection of content, such as whether content elements should be graphical, text, involve movement, color, size, and/or to the implementation of other aspects of program development Computer assisted methods and systems of the present invention may be implemented to allow content designers, who typically do not have the training required to apply principles from cognitive science and vision science, to increase the effectiveness of content design and distribution. Systems and methods of the present invention may incorporate features and functionality involving cognitive sciences database 430 in manners more fully described in co-pending U.S. patent application Ser. No. 12/159,106, filed on Dec. 29, 2006 as International Application US2006/049662 designating the United States and entitled "Content Development and Distribution Using Cognitive Sciences Database," which is incorporated herein by reference.

The DSS may include the capability for designing alternative versions of a digital signage program to accommodate diverse display types and viewing conditions. Display technology is diverse and there are large differences in the types of displays used to present content on a digital signage network. For example, the size, shape, brightness, and viewing conditions will vary greatly across a digital signage network (e.g., some displays may be small, flexible and non-rectilinear, whereas others may be standard large format Liquid Crystal Display (LCD) and plasma displays). The variation in display types and viewing conditions means that any single version of a piece of content may not be optimal for all the displays across a network.

In order to overcome this problem, it may be necessary to generate versions of each piece of content for each display type and viewing environment, and to selectively distribute these versions of content to their corresponding screens in the network. However, it is not realistic to expect content designers to have such detailed knowledge of the display types and viewing conditions across a large DSS network. Furthermore, even if such content designers had such detailed knowledge, it would be time-consuming to manually create versions of content for each display and to manually schedule the content to play on each corresponding display at the appropriate time.

The DSS may include a data acquisition unit 435 for collecting data used to improve the effectiveness of deployed content. The data acquisition unit 435 allows distribution factors that underlie the effectiveness of digital signage networks to be continuously gathered in real-time during deployment of content. The information acquired can facilitate continuous improvement in content effectiveness of the DSS as well as improvement of individual versions of content pieces. Previously acquired data may be used to learn what sensor or sales events should trigger the display of specific types of content, for example.

Individual pieces of content in any content program each have a specific goal (e.g., to sell a specific product). It is usually the case that there is variability in the value of each goal to the user of the digital signage network. For example, there may be variability in the profit margin and inventory level for each product which factor into the value of the goal for the product. The value of achieving each goal continuously changes during the time a digital signage program is deployed. For example, the inventory level of a product may change, thus affecting the goal for sales of the product.

Enhancing the effectiveness of a DSS as a whole, involves 1) accurate prediction of the impact of deploying a digital signage program on the goal associated with the digital signage program, and 2) continuously changing the distribution patterns (timing, frequency, and location) of individual pieces of content as the value of each individual goal corresponding to the pieces of content change. In many cases, it is unfeasible for users of the DSS to predict the impact of deploying content and to manually change content distribution patterns based on continuously changing values of goals associated with each piece of content. The DSS provides the functionality to predict the impact of digital signage programs and to alter the distribution of content based on the predictions.

As previously stated, content is displayed on the players 415 with the goal of affecting human behavior (e.g., to impact purchasing behavior). However, prior digital signage systems are unable to demonstrate a cause-and-effect relationship between signage content and human behavior or to measure the strength of the cause and effect relationship. This difficulty arises because the methods by which content is delivered across current digital signage networks does not support the determination of whether any measured change in human behavior was caused by signage content or the result of some confounding factors (e.g., change in weather, change in general demand for the product, change in price of the product).

The only way to decisively determine cause-and-effect relationships between signage content and human behavior is to conduct a true experiment during which signage content is systematically manipulated using complex experimental designs, and the effects of those manipulations on human behavior are carefully measured. Manually conducting such experiments is time consuming and requires significant knowledge and training in the scientific method of how to design true experiments. The users of digital signage systems may not have sufficient training to understand how to design a true experiment to acquire confound-free results. The DSS illustrated in FIG. 11A includes a experiment design processor 440 and user interface 410 that provide the capability to design true experiments.

Figure 11B:
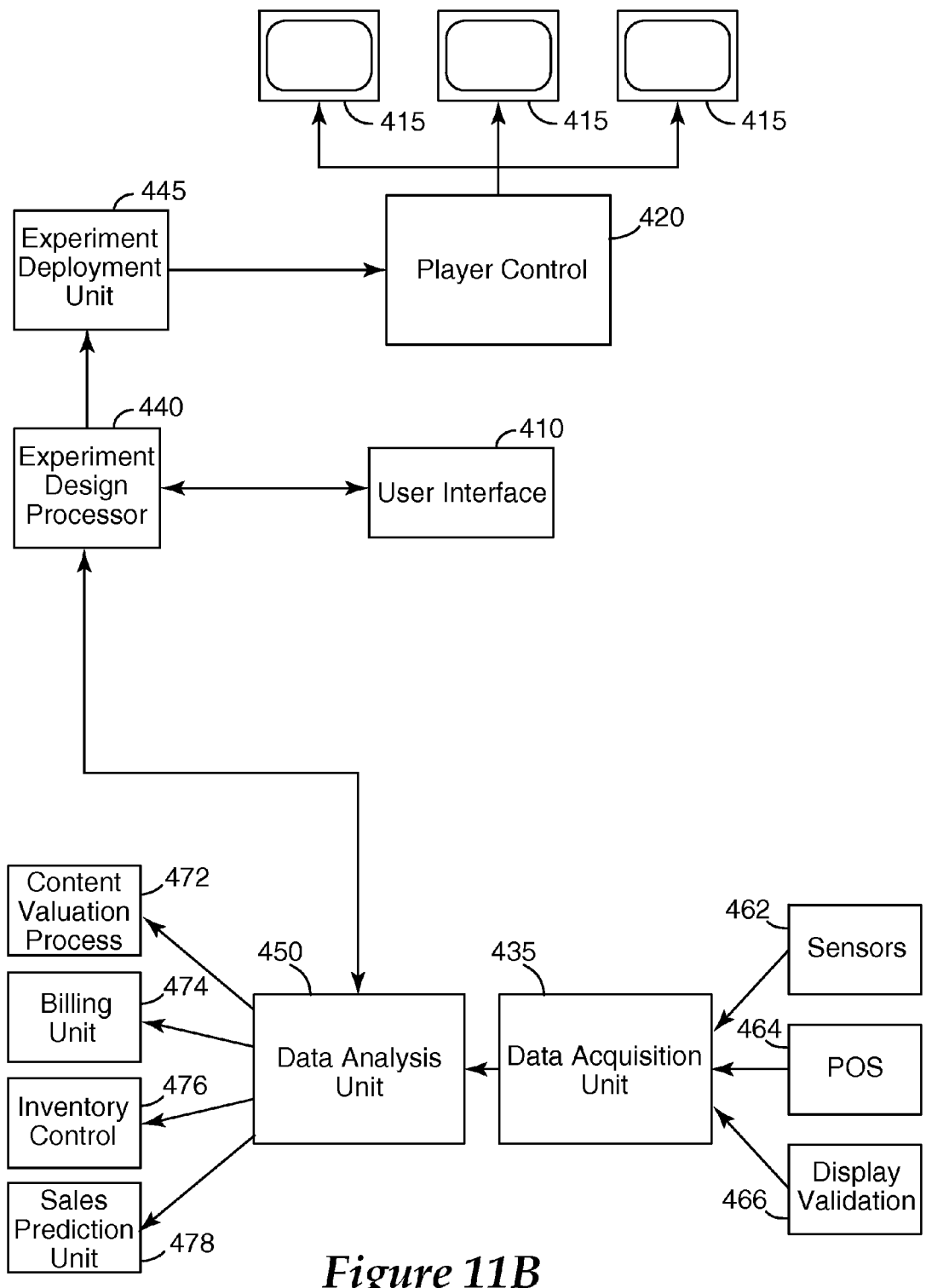
FIG. 11B illustrates a system including that is configured to design, conduct and analyze a true experiment or sub-processes that have constraints of a true experiment to evaluate digital signage content in accordance with embodiments of the invention.

FIG. 11B illustrates an expert system including experiment design processor that is configured to design a true experiment or sub-processes that have constraints of a true experiment (e.g., such as those depicted in FIGS. 5-7B). As previously discussed, the experiment design processor 440 may be configured to operate fully automatically or semi-automatically with user interaction. In semi-automatic mode, the experiment design processor 440 may lead a user through various interactive sessions conducted via the user interface 410 to design a true experiment. In such a process, the experiment design processor 440 ensures the design of a true experiment that produces confound-free data. Thus, a user is able to rely on the programming of the experiment design processor 440 and is not required to have knowledge or experience in designing true experiments. The DSS may comprise only an experiment design processor 440, or may include additional elements such as an experiment deployment unit 445, a data acquisition unit 435, and data analysis unit 450.

The experiment design processor 440 may, automatically or semi-automatically, develop an objective or hypothesis for the experiment, identify independent and dependent variables of the experiment, form control and treatment groups applying appropriate randomization, balancing, counterbalancing and/or blocking. In the context of a DSS, for example, the experimental objective may be to evaluate the effectiveness of a content element in an ad campaign promoting sales of a certain product. The independent variable(s) may be associated with some aspect of the display of the content element. The dependent variable(s) may be associated with an increase in sales of the product.

The experiment design processor 440 may form appropriate treatment and control groups including the selection of various venues of the DSS where the experimental content and control content is to be displayed. Presentation of the experimental content, including content format, schedule, presentation location, and/or other factors that may produce confounds into the experimental process, are controlled by the experiment design processor 440. The experiment design processor 440 may ensure adequate randomization, counterbalancing, and blocking of the control and treatment groups to achieve experimental results that are substantially confound-free. Design of the experiment in the context of the DSS system may involve, for example, generating appropriate playlists and schedules for the presentation of content to be tested via the experiment, and may also involve generating playlists and schedules for presentation of control content.

In some configurations, the expert system may further include an experiment deployment unit 445. The experiment deployment unit 445 is configured to facilitate deployment of the experiment. In the context of the exemplary DSS system, the experiment deployment unit 445 formats the experimental content and the control group content for various player configurations and facilitates the transfer of the experimental content and the control content to the player controller 420 for presentation on players 415 as specified by the playlists and schedules.

The data acquisition unit 435 may be configured to collect experimental data from the control and treatment groups. The data acquisition unit 435 may perform or facilitate acquisition of data associated with the experiment via any means. For example, in the context of the exemplary DSS, the data acquisition unit 435 may be coupled to various sensor or data acquisition devices 462, 464, 466 that gather information including product movement, product sales, customer actions or reactions, and/or other information. Sensors 462 may be used to detect, for example, if a customer picks up the product, or if a customer is in the vicinity of the display when the content is displayed. Sales may be determined based on information acquired by a point of sales (POS) system 464. One or more devices 466 that validate the display of content may also be used. Changes in inventory levels of a product may be available via an inventory control system. Customer reactions may be acquired via questionnaires. If the conducted experiment is a true experiment, the data acquired by the data acquisition unit 435 is substantially confound-free.

The data acquisition unit 435 may be coupled to a data analysis unit 450 that is configured to analyze the experimental data collected by the data acquisition unit 435. The data analysis unit 450 may determine and/or quantify cause and effect relationships between the independent and dependent variables of the experiment. For the illustrated DSS, the results of the analysis may be used to determine if the content is effective at influencing product sales.

Because the analysis unit 450 will have received information regarding the independent and independent variables (e.g., whether the IVs and DVs are continuous or discrete), the analysis unit 450 would have much of the necessary information to choose the appropriate statistical test to apply to the data from the experiment. For example, if there is one IV with two discrete levels and one continuous DV, then a T-Test would be used for the inferential statistical test whereas if there is one IV with two discrete levels and one DV with two discrete levels, then a Chi-Squared test would be used for the inferential statistical test. Likewise, because analysis unit will access to information from the design processor 440 regarding which experimental conditions are diagnostic of particular hypotheses, the analysis unit 450 would have most or all of the information needed to determine which experimental and control conditions should be statistically compared.

The results of the analysis may be additionally or alternatively used to implement or modify various processes. For example, if the content was effective at influencing product sales, an advertisement campaign may be developed incorporating the content. A value may be assigned to the content by a content valuation process 472 based on the effectiveness of increasing sales. An advertiser using the content may be invoiced by a billing unit 474 according the value of the content. The data analysis unit 450 may also provide information to inventory control 476. Additionally, the data analysis unit 450 may provide information to a sales prediction unit 478 that generates a prediction of sales when the advertising campaign is deployed. The sales prediction unit 478 may additionally or alternatively predict the product inventory needed to support the sales generated by the advertisement campaign.

Implementation of a digital signage system, including capabilities for generating digital signage content, deploying experiments designed by the expert system, and collecting experimental data are further described in co-pending U.S. patent application Ser. No. 11/321,340 filed Dec. 29, 2005 and in U.S. patent application Ser. No. 12/159,107 filed on Dec. 29, 2006 as International Application US2006/049657, and entitled "Expert System for Designing Experiments," which are incorporated herein by reference.

The systems and methods described herein may form the basis of a consulting business according to embodiments of the present invention. Services offered could include, but not be limited to, working with customers to characterize their time-slot samples as appropriate for certain communication objective and certain consumer audiences, determining which variables a study would address, determining levels of independent variables for testing, determining factors that could be used for blocking and randomizing, and conducting a power analysis, among others. A measurement algorithm as previously described may be used to specify time-slot allocation requirements for cross-optimization and blocking factors.

Another application in accordance with the present invention is directed to systems and method for maximizing overall profitability. Following basic processes described in the Power & Money (Allison & Allison) article previously cited, for example, a system of the present invention may be used to optimize allocation of all available time-slot samples for two objectives: (1) content effectiveness testing as described in detail hereinabove, and (2) content that is not being tested but meant to address any number of business goals, such as increasing sales, promoting consumer satisfaction, informing employees, etc.

A system implemented according to the present invention as described herein may provide the data to "balance" the total inventory of time-slot samples, allowing the user to determine optimal levels of testing versus non-testing time-slot samples, and allocations within those groups to more efficiently test content using the minimal number of time-slot samples, freeing more time-slot samples for non-testing content. Results data could inform users as they seek to continuously monitor and adjust content distribution to maximize profitability, satisfaction, etc. and could aid users in determining when content is "worn-out," defined as the point in time when previously effective content ceases to be sufficiently effective due to over-exposure to the consumer or employee audience.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards, DVDs, CD, or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

The foregoing description of the various embodiments of the invention has been presented for the purposes of illustration and description. It is not intended to be exhaustive or to limit the invention to the precise form disclosed. Many modifications and variations are possible in light of the above teaching. For example, embodiments of the present invention may be implemented in a wide variety of applications. It is intended that the scope of the invention be limited not by this detailed description, but rather by the claims appended hereto.

What is claimed is:

1. A computer-implemented method for assigning pieces of content to time slots for measuring effects of the assigned content, comprising:
   receiving a first piece of experimental content and a second piece of experimental content, the first and second pieces of experimental content associated with a common effect that is to be measured;
   algorithmically assigning the first piece of experimental content to a first time slot;
   algorithmically assigning the second piece of experimental content to a second time slot; and
   algorithmically assigning a plurality of further content pieces to the first and second time slots, wherein the plurality of further content pieces assigned to the first time slot do not include the second piece of experimental content, and the plurality of further content pieces assigned to the second time slot do not include the first piece of experimental content.

2. The computer-implemented method of claim 1, further comprising:
   receiving data indicative of the effectiveness of the first piece of experimental content versus the second piece of experimental content, with respect to the common effect that is to be measured.

3. The computer-implemented method of claim 2, further comprising:
   outputting, from a computing device, signals indicative of the first and second time slots, including their assigned content pieces.

4. The computer-implemented method of claim 3, further comprising:
   receiving, by one or more player controllers, the signals indicative of the first and second time slots,
   generating, by one of the one or more player controllers, a display rendering of the content pieces comprising the assigned content pieces to the first time slot,
   generating, by one of the one or more player controllers, a display rendering of the content pieces comprising the assigned content pieces to the second time slot.

5. The computer-implemented method of claim 1, further comprising:
   receiving one or more pieces of control content that are not associated with the common effect,
   wherein the plurality of further content pieces assigned to the first time slot include at least one of the one or more pieces of control content, and
   wherein plurality of further content pieces assigned to the second time slot include at least one of the one or more pieces of control content.

6. The computer-implemented method of claim 1, wherein the first and the second pieces of experimental content are counterbalanced across the time slots.

7. The computer-implemented method of claim 1, wherein each piece of content defines an individual piece of content or a combination of content pieces.

8. The computer-implemented method of claim 1, wherein each of the time slots is associated with a plurality of factors that influence content effectiveness, and a number of required time slots is determined at least in part by a number of combinations of the time slot factors.

9. The computer-implemented method of claim 8, wherein algorithmically assigning a plurality of further content pieces comprises one or both of blocking by the time slot factors and blocking by noise factors.

10. The computer-implemented method of claim 1, further comprising:
    receiving content duration data for each piece of content that is being tested for effectiveness, wherein algorithmically assigning a plurality of further content pieces comprises assigning the plurality of further content pieces to fill the first and second time slots based on the content duration data.

11. A system for assigning pieces of content to time slots for measuring effects of the assigned content, comprising:
    a memory configured to store a first piece of experimental content and a second piece of experimental content, the first and second pieces of experimental content associated with a common effect that is to be measured; and
    a processor coupled to the memory, the processor configured to execute program instructions for:
      algorithmically assigning the first piece of experimental content to a first time slot;
      algorithmically assigning the second piece of experimental content to a second time slot;
      algorithmically assigning a plurality of further content pieces to the first and second time slots, wherein the plurality of further content pieces assigned to the first time slot do not include the second piece of experimental content, and the plurality of further content pieces assigned to the second time slot do not include the first piece of experimental content.

12. The system of claim 11, wherein the processor is further configured to output signals indicative of the first and second time slots, including their assigned content pieces.

13. The system of claim 12, further comprising:
    one or more player controllers configured to receive the signals indicative of the first and second time slots, the one or more player controllers further configured to generate a display rendering of the content pieces comprising the assigned content pieces to the first time slot and a display rendering of the content pieces comprising the assigned content pieces to the second time slot.

14. The system of claim 11, wherein the memory is further configured to store one or more pieces of control content that are not associated with the common effect,
    wherein the plurality of further content pieces assigned to the first time slot include at least one of the one or more pieces of control content, and
    wherein the plurality of further content pieces assigned to the second time slot include at least one of the one or more pieces of control content.

15. The system of claim 11, wherein the processor is further configured to assign the first and the second pieces of experimental content an equal number of time slots.

16. The system of claim 11, wherein each piece of content defines an individual piece of content or a combination of content pieces.

17. The system of claim 11, wherein each of the time slots is associated with a plurality of factors that influence content effectiveness, and a number of required time slots is determined by the processor at least in part by a number of combinations of the time slot factors.

18. The system of claim 17, wherein the processor is configured to implement one or both of blocking by the time slot factors and blocking by noise factors.

19. The system of claim 11, wherein the memory is configured to store content duration data for each piece of content that is being tested for effectiveness, and the processor is configured to assign the plurality of further content pieces to fill the first and the second time slots based on the content duration data.

20. A computer-readable storage medium having instructions stored thereon which are executable by a processor for performing processes for assigning pieces of content to time slots for measuring effects of the assigned content, comprising:
- receiving a first piece of experimental content and a second piece of experimental content, the first and second pieces of experimental content associated with a common effect that is to be measured;
- algorithmically assigning the first piece of experimental content to a first time slot;
- algorithmically assigning the second piece of experimental content to a second time slot; and
- algorithmically assigning a plurality of further content pieces to the first and second time slots, wherein the plurality of further content pieces assigned to the first time slot do not include the second piece of experimental content, and the plurality of further content pieces assigned to the second time slot do not include the first piece of experimental content.

* * * * *